(12) United States Patent
Prost et al.

(10) Patent No.: US 10,343,691 B2
(45) Date of Patent: Jul. 9, 2019

(54) DUAL-SHAFT CLUTCHLESS HYBRID TRANSMISSION

(71) Applicants: Victor Prost, Saint Didier (FR); Sahil Rajesh Shah, Edmonton (CA); Zackary Ryan Eubanks, Little Rock, AR (US); Daria Bondarchuk, Moscow (RU); Paige L. Reiter, Tulsa, OK (US); Yu Hua, Huai'An (CN); Daniel Scott Dorsch, Cambridge, MA (US); Amos G. Winter, Somerville, MA (US)

(72) Inventors: Victor Prost, Saint Didier (FR); Sahil Rajesh Shah, Edmonton (CA); Zackary Ryan Eubanks, Little Rock, AR (US); Daria Bondarchuk, Moscow (RU); Paige L. Reiter, Tulsa, OK (US); Yu Hua, Huai'An (CN); Daniel Scott Dorsch, Cambridge, MA (US); Amos G. Winter, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/791,910

(22) Filed: Oct. 24, 2017

(65) Prior Publication Data
US 2018/0043899 A1 Feb. 15, 2018

Related U.S. Application Data

(63) Continuation of application No. PCT/US2017/031157, filed on May 4, 2017.
(Continued)

(51) Int. Cl.
*B60W 30/19* (2012.01)
*B60K 6/20* (2007.10)
(Continued)

(52) U.S. Cl.
CPC .............. *B60W 30/19* (2013.01); *B60K 6/20* (2013.01); *B60K 6/36* (2013.01); *B60K 6/365* (2013.01);
(Continued)

(58) Field of Classification Search
None
See application file for complete search history.

(56) References Cited

U.S. PATENT DOCUMENTS

| 4,497,221 A | 2/1985 | Koser |
| 5,411,450 A | 5/1995 | Gratton et al. |

(Continued)

FOREIGN PATENT DOCUMENTS

| CN | 1272203 | 8/2006 |
| JP | 3750166 B2 | 3/2006 |

(Continued)

OTHER PUBLICATIONS

International Search Report and Written Opinion dated Jul. 20, 2017 from International Application No. PCT/US2017/031157, 18 pages.
(Continued)

*Primary Examiner* — Justin Holmes
(74) *Attorney, Agent, or Firm* — Smith Baluch LLP

(57) ABSTRACT

An apparatus includes a drive shaft, a transmission, a motor shaft, and an engine shaft. The drive shaft includes several drive gears and is used to transmit power to a wheel of a vehicle. The transmission includes a first transmission subassembly and a second transmission subassembly, each subassembly having a transmission shaft, an input gear, and several output gears. Each transmission shaft includes a shifting element to select an output gear. Each transmission subassembly transmits power to the drive shaft when the shifting element of each respective subassembly is engaged. The motor shaft is coupled to a motor and is also directly
(Continued)

coupled to the first transmission subassembly via a first motor gear. The motor shaft is also coupled to the engine shaft via a second motor gear. The engine shaft includes several engine gears to couple the engine shaft to the first and second transmission subassemblies.

44 Claims, 47 Drawing Sheets

Related U.S. Application Data

(60) Provisional application No. 62/376,980, filed on Aug. 19, 2016, provisional application No. 62/331,742, filed on May 4, 2016.

(51) Int. Cl.

| | | |
|---|---|---|
| *B60K 6/36* | (2007.10) | |
| *B60K 6/365* | (2007.10) | |
| *B60K 6/38* | (2007.10) | |
| *B60K 6/387* | (2007.10) | |
| *B60K 6/50* | (2007.10) | |
| *B60K 6/543* | (2007.10) | |
| *B60K 6/547* | (2007.10) | |
| *B60W 10/06* | (2006.01) | |
| *B60W 10/08* | (2006.01) | |
| *B60W 10/113* | (2012.01) | |
| *B60W 20/40* | (2016.01) | |
| *B60W 40/105* | (2012.01) | |
| *F16H 3/00* | (2006.01) | |
| *F16H 3/093* | (2006.01) | |
| *B60K 6/48* | (2007.10) | |
| *B60K 6/54* | (2007.10) | |
| *F16H 3/08* | (2006.01) | |

(52) U.S. Cl.
CPC ............... *B60K 6/38* (2013.01); *B60K 6/387* (2013.01); *B60K 6/48* (2013.01); *B60K 6/50* (2013.01); *B60K 6/54* (2013.01); *B60K 6/543* (2013.01); *B60K 6/547* (2013.01); *B60W 10/06* (2013.01); *B60W 10/08* (2013.01); *B60W 10/113* (2013.01); *B60W 20/40* (2013.01); *B60W 40/105* (2013.01); *F16H 3/006* (2013.01); *F16H 3/093* (2013.01); *B60K 2006/4816* (2013.01); *B60W 2510/1005* (2013.01); *B60W 2520/04* (2013.01); *B60W 2520/10* (2013.01); *B60W 2520/28* (2013.01); *B60W 2710/0644* (2013.01); *B60W 2710/081* (2013.01); *B60W 2710/1005* (2013.01); *B60Y 2200/92* (2013.01); *F16H 2003/008* (2013.01); *F16H 2003/0818* (2013.01); *F16H 2200/0052* (2013.01); *Y02T 10/6286* (2013.01); *Y10S 903/909* (2013.01); *Y10S 903/919* (2013.01)

(56) References Cited

U.S. PATENT DOCUMENTS

| | | | |
|---|---|---|---|
| 5,445,044 A | | 8/1995 | Lee |
| 6,332,257 B1* | | 12/2001 | Reed, Jr. ............... B60K 6/26 29/401.1 |
| 6,374,688 B1 | | 4/2002 | Böckmann et al. |
| 7,252,020 B2 | | 8/2007 | Gray, Jr. et al. |
| 8,028,779 B2 | | 10/2011 | Morishita et al. |
| 8,346,446 B2 | | 1/2013 | Liu et al. |
| 8,738,254 B2 | | 5/2014 | Lee et al. |
| 9,394,972 B1* | | 7/2016 | Reilley ............... F16H 3/006 |
| 2002/0189397 A1 | | 12/2002 | Sakamoto et al. |
| 2004/0089258 A1 | | 5/2004 | Buglione et al. |
| 2004/0251064 A1 | | 12/2004 | Imai |
| 2005/0209036 A1 | | 9/2005 | Cole |
| 2009/0107270 A1 | | 4/2009 | Krieger et al. |
| 2010/0113202 A1 | | 5/2010 | Treichel et al. |
| 2010/0320016 A1 | | 12/2010 | Wang et al. |
| 2011/0177900 A1 | | 7/2011 | Simon |
| 2011/0263379 A1 | | 10/2011 | Liang et al. |
| 2012/0329593 A1 | | 12/2012 | Larrabee et al. |
| 2014/0000412 A1 | | 1/2014 | Kaltenach |
| 2014/0283646 A1 | | 9/2014 | Moore et al. |
| 2014/0349810 A1* | | 11/2014 | Kaltenbach ............ B60K 6/48 477/5 |
| 2015/0210262 A1 | | 7/2015 | Mitchell et al. |
| 2015/0258973 A1 | | 9/2015 | Hawkins et al. |
| 2016/0069425 A1 | | 3/2016 | Yang et al. |
| 2016/0167503 A1* | | 6/2016 | Lee .................. B60K 6/365 475/5 |
| 2016/0207392 A1* | | 7/2016 | Zhang ................ F16H 3/006 |
| 2018/0148065 A1 | | 5/2018 | Jacoby et al. |

FOREIGN PATENT DOCUMENTS

| | | |
|---|---|---|
| KR | 101294090 B1 | 8/2013 |
| WO | 2011088876 A1 | 7/2011 |

OTHER PUBLICATIONS

Alternative Fuels Data Center:Maps and Data. U.S. Department of Energy. Accessed at https://www.afdc.energy.gov/data/ on Nov. 7, 2018. 23 pages.
Barlow et al., A reference book of driving cycles for use in the measurement of road vehicle emissions. Nov. 27, 2009.
Brusa Elektronik AG HSM1—Hybrid Synchronous Motor. Accessed at https://www.brusa.biz/fileadmin/template/Support-Center/Datenbl%C3%A4tter/BRUSA_DB_EN_HSM1.pdf on Dec. 12, 2018. 2 pages.
Chen et al., Design and Analysis of an Electrical Variable Transmission for a Series—Parallel Hybrid Electric Vehicle. IEEE Transactions on Vehicular Technology, vol. 60(5), Jun. 2011. 10 pages.
Corporate Average Fuel Economy (CAFE) Standards. U.S. Department of Transportation. Updated Aug. 27, 2014. Accessed at https://www.transportation.gov/mission/sustainability/corporate-average-fuel-economy-cafe-standards. 3 pages.
DriverSide Technical Specifications 2012 Ferrari 458 Italia Base 2dr Coupe. Accessed at https://www.driverside.com/specs/ferrri-458_italit-2012-30960-54122-0. 2 pages.
Edenhofer et al., Climate Change 2014: Mitigation of Climate Change, Working Group III Contribution to the Fifth Assessment Report of the Intergovernmental Panel on Climate Change. IPCC 2014. 1454 pages.
Ehsani et al., Modern Electric, Hybrid Electric, and Fuel Cell Vehicles: Fundamentals, theory, and design. CRC Press 2010. 419 pages.
Fabspeed Motorsport, Dynojet Research 2010 Ferrari 458 Stock. Accessed at https://mbworld.org/forums/off-topic/438761-torque-vs-rpm.html on Nov. 7, 2018. 7 pages.
Fan et al., Map-Based Power-Split Strategy Design with Predictive Performance Optimization for Parallel Hybrid Electric Vehicles. Energies 2015, 8(9), 9946-9968.
International Search Report and Written Opinion dated Oct. 14, 2016 for International Application No. PCT/US2016/045011, 19 pages.
Kim et al., Analysis of the shifting behavior of a novel clutchless geared smart transmission. International Journal of Automotive Technology, vol. 15(1), pp. 125-134. Feb. 2014.
Lee et al., Advanced gear shifting and clutching strategy for parallel hybrid vehicle with automated manual transmission. IAS Annual Meeting (IEEE Industry Applications Society), 1709-1713 vol. 3. Nov. 1998. 6 pages.
Mashadi et al., Dual-Mode Power-Split Transmission for Hybrid Electric Vehicles. IEEE Transactions on Vehicular Technology, vol. 59(7), Sep. 2010. 10 pages.
Panasonic, Lithium ion NCR18650A Data Sheet. Accessed at http://www.omnitron.cz/download/datasheet/NCR-18650a.pdf on Dec. 12, 2018.

(56) References Cited

OTHER PUBLICATIONS

Pratte, Drivetrain Power Loss—The 15% "Rule." 2010. Accessed at http://www.superstreetonline.com/how-to/engine/modp-1005-drivetrain-power-loss/. 15 pages.
Reducing CO2 emissions from passenger cars. European Commission. Accessed Nov. 7, 2018 at https://ec.europa.eu/clima/policies/transport/vehicles/cars_en. 6 pages.
Solberg, The Magic of Tesla Roadster Regenerative Braking, Tesla Motors. Jun. 29, 2007.
Tan, VW phases out automatics; makes way for DSG. Jun. 2006. Available at https://paultan.org/2006/06/26/vw-phases-out-automatics-makes-way-for-dsg/. 5 pages.
US EPA, C.C.D, "Causes of Climate Change." 2017. Accessed at https://19january2017snapshot.epa.gov/climate-change-science/causes-climate-change_.html on Dec. 11, 2018. 14 pages.
Wu et al., Powertrain architectures of electrified vehicles: Review, classification and comparison. Journal of the Franklin Institute 352(2), Jan. 2014. 25 pages.
Yoon et al., Conceptual design of economic hybrid vehicle system using clutchless geared smart transmission. International Journal of Automotive Technology vol. 14(5), pp. 779-784, Oct. 2013. 6 pages.
Zulkifli et al., Impact of Motor Size & Efficiency on Acceleration, Fuel Consumption & Emissions of Split-Axle Through-the-Road Parallel Hybrid Electric Vehicle. Applied Mechanics and Materials 663:498-503. Oct. 2014. 6 pages.

\* cited by examiner

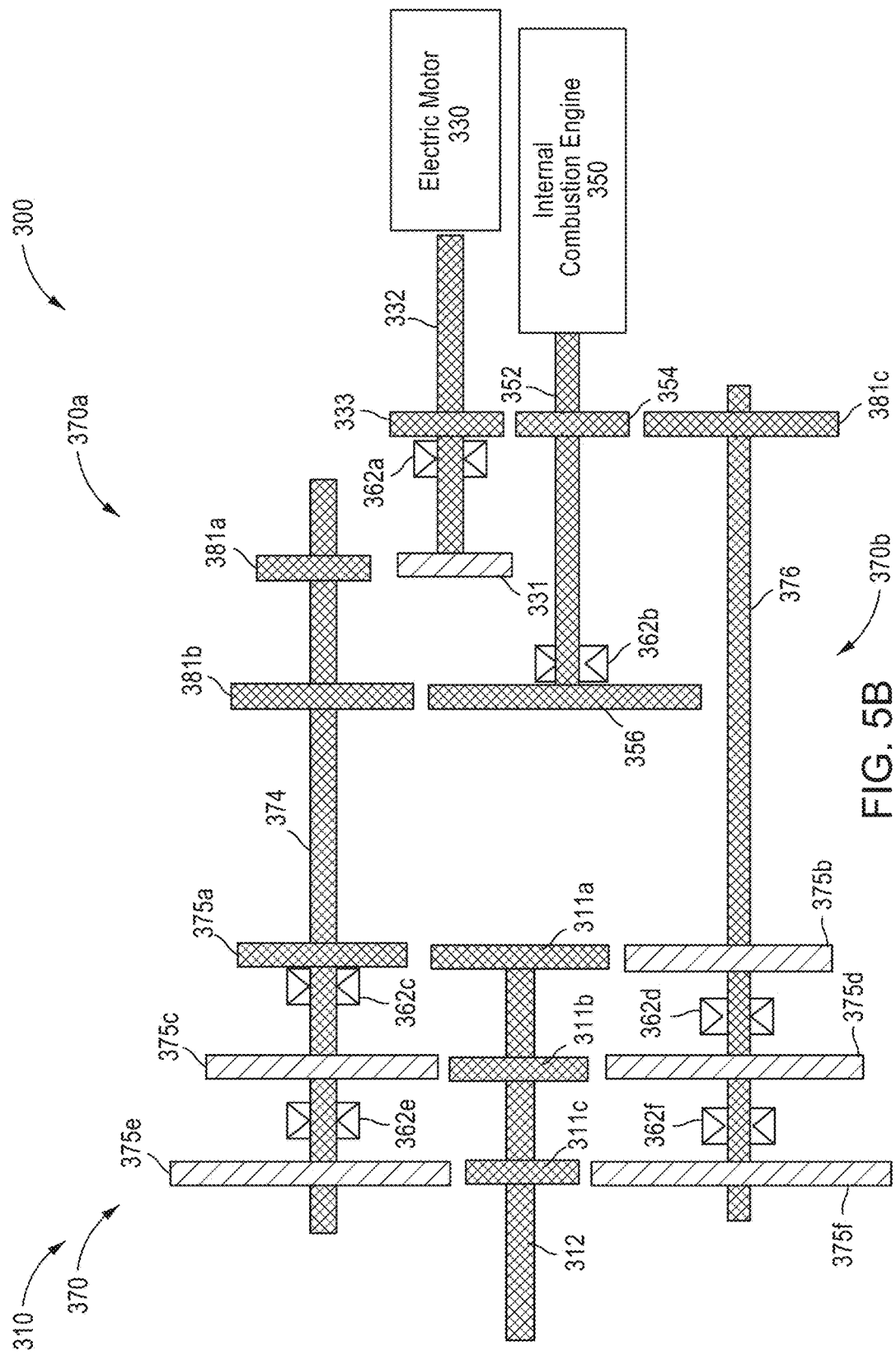

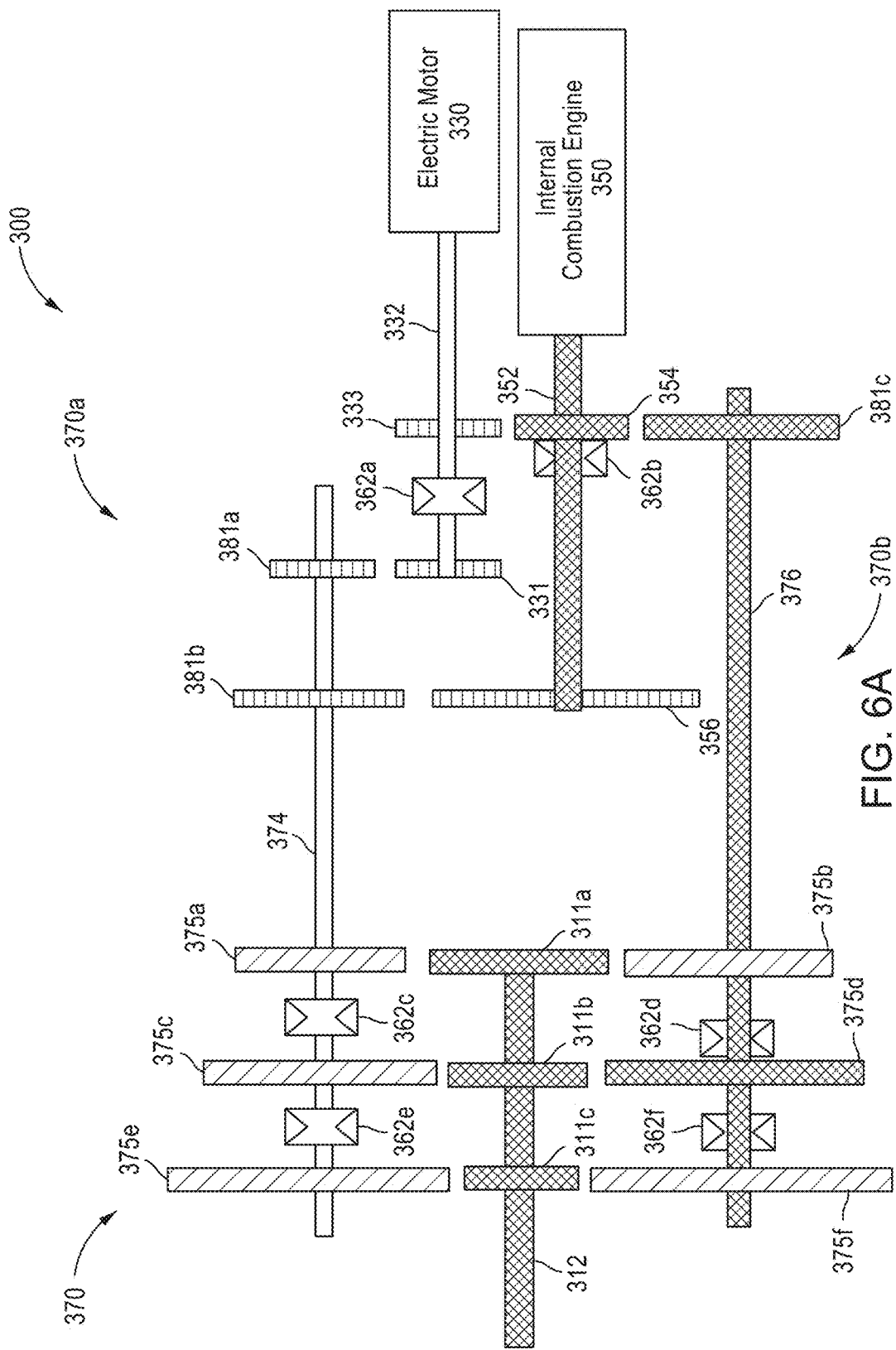

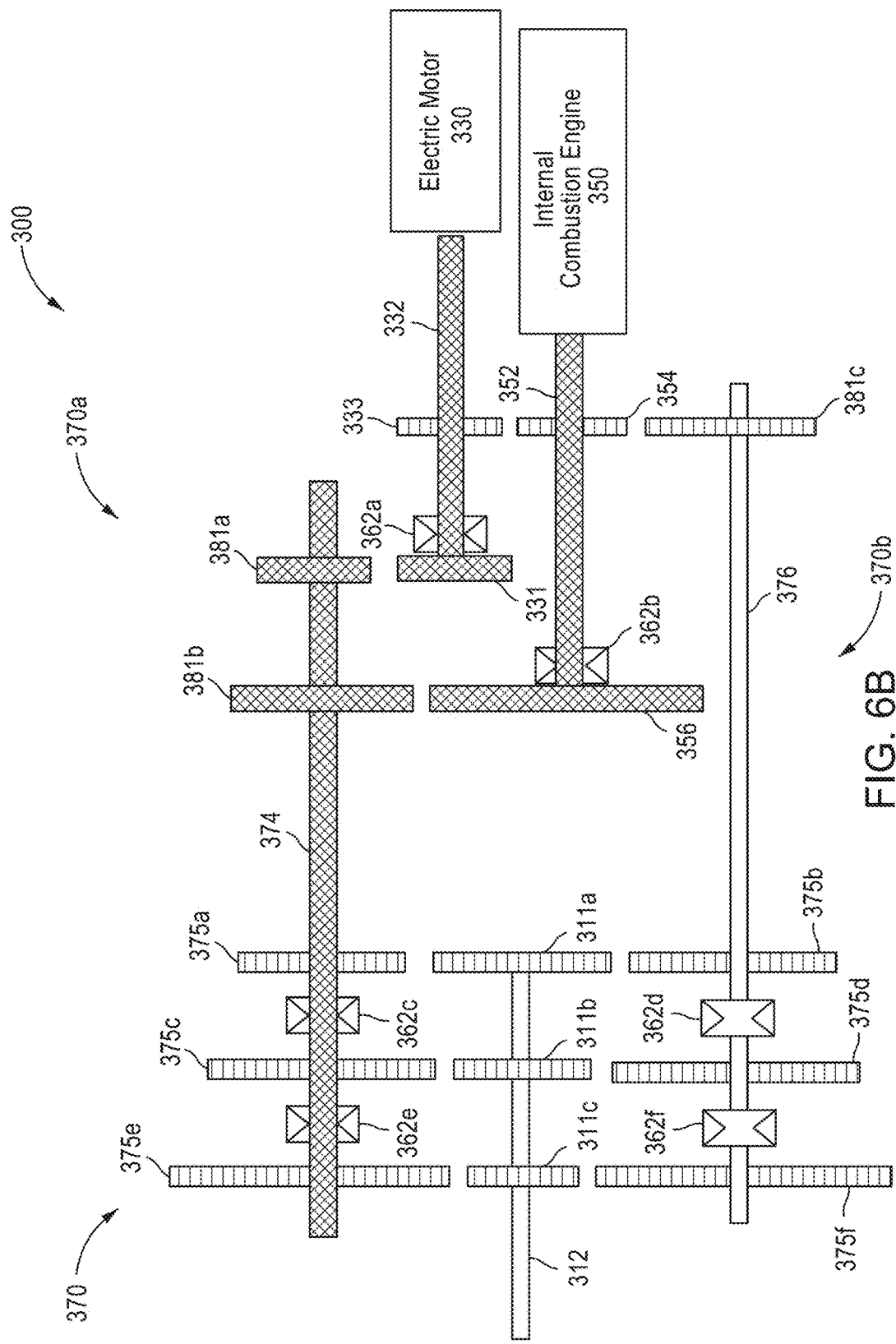

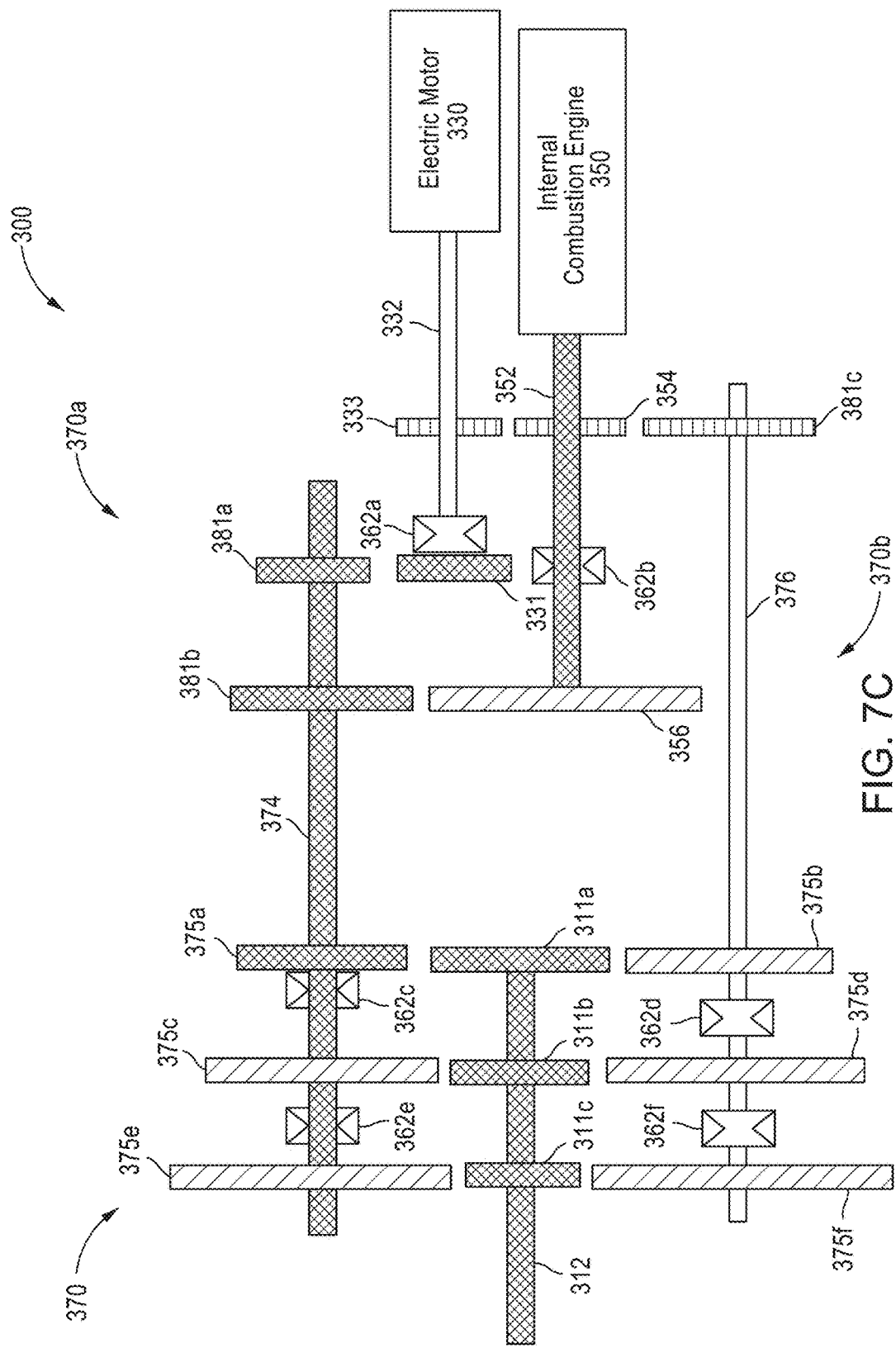

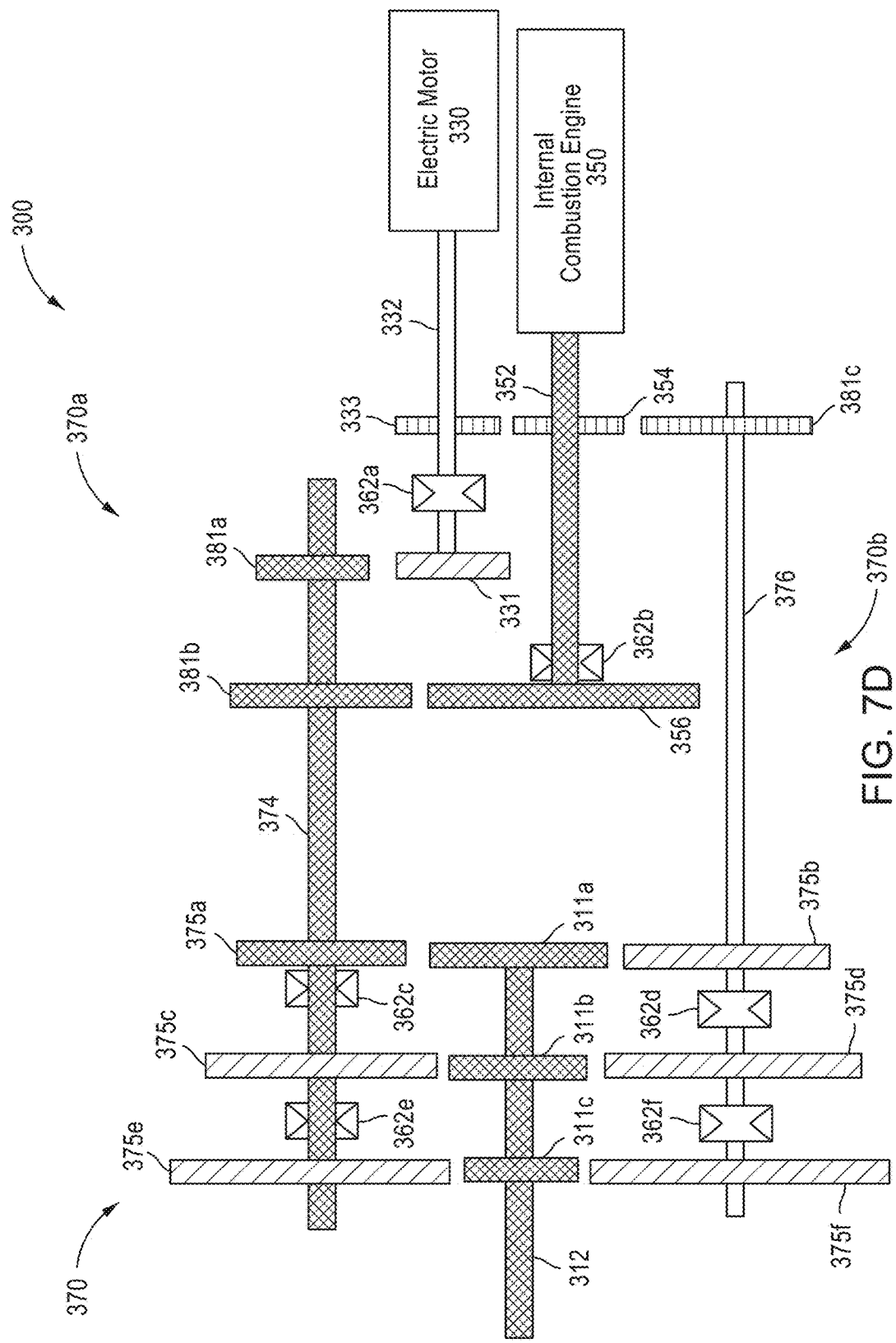

DUAL-SHAFT CLUTCHLESS HYBRID TRANSMISSION

CROSS-REFERENCE TO RELATED APPLICATION

This application is a continuation application of International Application No. PCT/US2017/031157, entitled "Dual-Shaft Clutchless Hybrid Transmission," filed May 4, 2017.

International Application No. PCT/US2017/031157 in turn claims priority to and the benefit of U.S. Provisional Patent Application Ser. No. 62/331,742, entitled "Dual-Shaft Clutchless Hybrid Transmission," filed May 4, 2016, and U.S. Provisional Patent Application Ser. No. 62/376,980, entitled "Dual-Shaft Clutchless Hybrid Transmission," filed Aug. 19, 2016.

Each of the foregoing applications is hereby incorporated by reference in its entirety.

BACKGROUND

The embodiments described herein relate generally to the field of transmissions for hybrid vehicles, and more particularly to powertrain systems including a dual-shaft clutchless hybrid transmission for improving powertrain performance in high-performance vehicles.

Automotive transmissions are used to transfer power from an engine to the wheels of a vehicle. In particular, known transmissions allow the selection of multiple gear ratios to modulate the power and speed that are applied to the wheels. Known manual transmission and powertrain systems include a clutch to selectively disengage the engine from the transmission to facilitate selection of different gears (i.e., "shifting" of gears). In use, known clutches equalize the speed of the engine and the shafts and/or gears within the transmission during shifting of gears. Known clutches, however, increase the complexity of the powertrain (e.g., by including additional parts) and decrease the overall efficiency of the transmission. For example, the efficiency of known transmissions is generally in the approximate range of 84-92 percent. Moreover, as much as 25 percent of the overall power losses in known transmissions can be attributed to the clutch. As one example, for known wet clutches, some power losses come from the fluid within the case, which form an internal resistance. During operation, the fluid produces a shearing force that generates a drag torque, which becomes a drag loss.

Moreover, although transmissions have been studied and used for decades, there remains a need for improved powertrain systems for gas-electric hybrid vehicles. The development of hybrid vehicles has increased as the impact of anthropogenic climate change has become a global concern. For example, European and American regulators have instituted yearly targets for fuel economy and carbon emissions. Car manufacturers that do not meet these targets face heavy fines. Of additional concern to automobile manufacturers is Corporate Average Fuel Economy (CAFE). CAFE targets in the U.S., and in similar programs around the world, incentivize fuel efficiency and penalize manufacturers that fail to meet emissions goals.

Known hybrid gas-electric vehicles are one solution to meet the demand for greater fuel efficiency and reduced emissions. Specifically, known hybrid gas-electric vehicles can increase fuel economy by leveraging the electric motor when the internal combustion engine (ICE) is not operating efficiently. For example, in known "mild hybrid" configurations, a battery and small electric motor (EM) help power the vehicle so the ICE can shut off when the vehicle stops. Known "full hybrid" configurations use larger EMs and batteries that can independently power the car for short times and often at low speeds. Known hybrid gas-electric vehicles include a variety of different transmissions and/or powertrain configurations to facilitate the use of both the ICE and the EM. For example, some known hybrid vehicles are "parallel hybrid" vehicles, which rely on a mechanical linkage between two power sources (the linkage being located either pre- or post-transmission). The linkage allows either or both power sources to accelerate the vehicle, allows an EM to regenerate upon deceleration, and allows the ICE to charge an EM while stationary. Known parallel hybrid powertrain systems, however, are mechanically complex, have increased mass, and do not facilitate operating the ICE at peak efficiency when compared with other hybrid approaches. Other known hybrid vehicles employ a "series hybrid" powertrain system. Series hybrid systems allow an ICE to operate at its most effective speed, and thus have the benefit of reduced ICE sizing, improved ICE efficiency, and a short charge path. The performance of known series hybrid vehicles, however, is limited by the the ability of the batteries and charging circuitry to supply power to the EM. Yet other hybrid vehicles employ a "through the road" (or TTR) powertrain system. Known TTR systems include one driven axle that is motivated by one power source, while the other axle has an alternative power source. In such systems, the road is used as the link between front and rear wheels, thus energy can only be transmitted between axles while the vehicle is moving. Accordingly, one disadvantage of known TTR systems is that the batteries cannot be charged while the vehicle is physically stationary.

Moreover, although there have been advances regarding hybrid gas-electric vehicles, there are concerns about translating conventional hybrid technology to high-performance vehicles. For example, known hybrid systems often include a power-split device (PSD) to allow the ICE and EM to provide power to the wheels simultaneously. One example of a PST is a continuously variable transmission (CVT), which has been used in efficiency-oriented consumer vehicles. However, there are several potential concerns about using PSDs or other CVTs in high-performance applications. For example, in such known systems, it may be difficult to program the controls to maximize power versus torque. Additionally, known systems may produce a poor driver experience due to the loss of the distinct engine scream and gear shifting. Moreover, there may be an increased rate of repair for planetary gears because of the heating and wear of high performance driving and increased frictional losses.

Thus, a need exists for improved systems and methods which can increase fuel economy and improve performance in high-performance vehicles.

SUMMARY

In some embodiments, an apparatus includes a drive shaft, a transmission, a motor shaft, and an engine shaft. The drive shaft includes a plurality of drive gears and is configured to transmit power to a wheel of a vehicle. The transmission includes a first transmission shaft and a second transmission shaft. The first transmission shaft includes a first transmission input gear and a first plurality of output gears. The second transmission shaft includes a second transmission input gear and a second plurality of output gears. The first transmission shaft and the second transmission shaft are aligned such that the first plurality of output gears and the second plurality of output gears mesh with the plurality of drive gears of the drive shaft. The first transmission shaft includes a first shifting element configured to selectively engage an output gear from the first plurality of output gears to adjust a ratio between a shaft rotation speed of the first transmission shaft and a shaft rotation speed of the drive shaft. The second transmission shaft includes a second shifting element configured to selectively engage an output gear from the second plurality of output gears to adjust a ratio between a shaft rotation speed of the second transmission shaft and a shaft rotation speed of the drive shaft. The output gear from the first plurality of output gears is operably coupled to a drive gear from the plurality of drive gears such that power is transmitted between the first transmission shaft and the drive shaft when the output gear from the first plurality of output gears is engaged with the first transmission shaft via the first shifting element. The motor shaft is configured to be coupled to a motor. The motor shaft has a first motor gear and a second motor gear. The first motor gear is operably coupled to the first transmission input gear. The motor shaft includes a third shifting element configured to selectively engage the first motor gear to the motor shaft. The first motor gear is configured to transmit power between the motor shaft and the first transmission shaft when the first motor gear is engaged to the motor shaft via the third shifting element. The engine shaft is configured to be coupled to an engine, the engine shaft having an engine gear. The engine gear is operably coupled to the second transmission input gear and the second motor gear of the motor shaft. The engine shaft includes a fourth shifting element configured to selectively engage the engine gear to the engine shaft. The engine gear is configured to transmit power between the engine shaft and the second transmission shaft when the engine gear is engaged to the engine shaft via the fourth shifting element.

BRIEF DESCRIPTION OF THE DRAWINGS

FIGS. 5A-5D are schematic illustrations of the powertrain system of FIG. 3 in various stages of a low-speed upshift sequence, according to an embodiment.

FIGS. 6A-6C are schematic illustrations of the powertrain system of FIG. 3 in various stages of a high-speed upshift sequence, according to an embodiment.

FIGS. 7A-7D are schematic illustrations of the powertrain system of FIG. 3 in various stages of a downshift sequence at low speeds, according to an embodiment.

DETAILED DESCRIPTION

Figure 1:
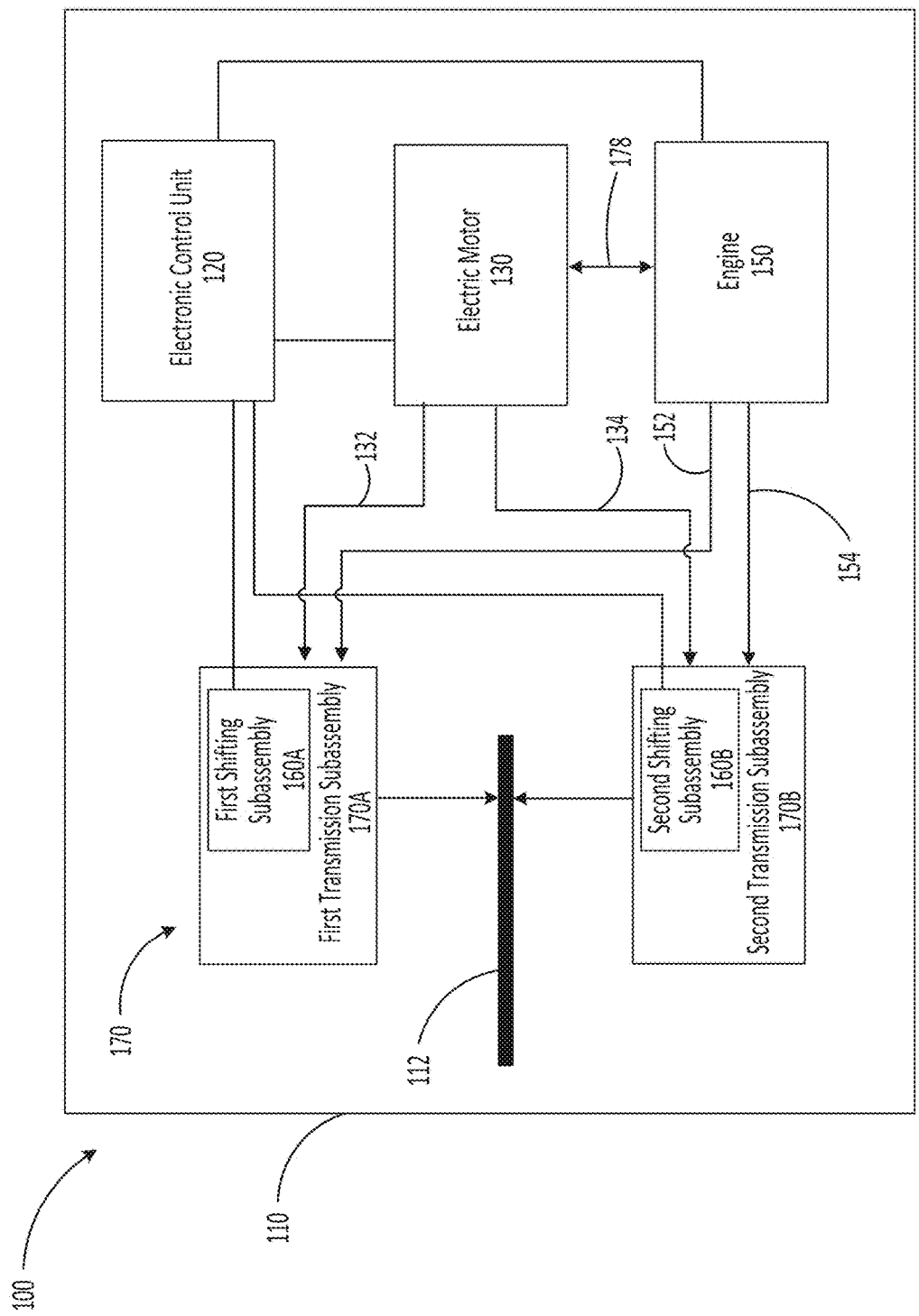
FIG. 1 is a schematic illustration of a powertrain system according to an embodiment.

In some embodiments, an apparatus includes a drive shaft, a transmission, a motor shaft, and an engine shaft. The drive shaft includes a plurality of drive gears and is configured to transmit power to a wheel of a vehicle. The transmission includes a first transmission shaft and a second transmission shaft. The first transmission shaft includes a first transmission input gear and a first plurality of output gears. The second transmission shaft includes a second transmission input gear and a second plurality of output gears. The first transmission shaft and the second transmission shaft are aligned such that the first plurality of output gears and the second plurality of output gears mesh with the plurality of drive gears of the drive shaft. The first transmission shaft includes a first shifting element configured to selectively engage an output gear from the first plurality of output gears to adjust a ratio between a shaft rotation speed of the first transmission shaft and a shaft rotation speed of the drive shaft. The second transmission shaft includes a second shifting element configured to selectively engage an output gear from the second plurality of output gears to adjust a ratio between a shaft rotation speed of the second transmission shaft and a shaft rotation speed of the drive shaft. The output gear from the first plurality of output gears is operably coupled to a drive gear from the plurality of drive gears such that power is transmitted between the first transmission shaft and the drive shaft when the output gear from the first plurality of output gears is engaged with the first transmission shaft via the first shifting element. The motor shaft is configured to be coupled to a motor. The motor shaft has a first motor gear and a second motor gear. The first motor gear is operably coupled to the first transmission input gear. The motor shaft includes a third shifting element configured to selectively engage the first motor gear to the motor shaft. The first motor gear is configured to transmit power between the motor shaft and the first transmission shaft when the first motor gear is engaged to the motor shaft via the third shifting element. The engine shaft is configured to be coupled to an engine, the engine shaft having an engine gear. The engine gear is operably coupled to the second transmission input gear and the second motor gear of the motor shaft. The engine shaft includes a fourth shifting element configured to selectively engage the engine gear to the engine shaft. The engine gear is configured to transmit power between the engine shaft and the second transmission shaft when the engine gear is engaged to the engine shaft via the fourth shifting element.

In some embodiments, an apparatus includes a drive shaft and a transmission. The drive shaft includes a plurality of drive gears, the drive shaft configured to transmit power to a wheel of a vehicle. The transmission includes a first transmission shaft and a second transmission shaft. The first transmission shaft includes a first transmission input gear and a first plurality of output gears. The second transmission shaft includes a second transmission input gear and a second plurality of output gears. The first transmission shaft and the second transmission shaft are aligned such that the first plurality of output gears and the second plurality of output gears mesh with the plurality of drive gears of the drive shaft. The first transmission shaft includes a first shifting element configured to selectively engage an output gear from the first plurality of output gears to adjust a ratio between a shaft rotation speed of the first transmission shaft and a shaft rotation speed of the drive shaft. The second transmission shaft including a second shifting element configured to selectively engage an output gear from the second plurality of output gears to adjust a ratio between a shaft rotation speed of the second transmission shaft and a shaft rotation speed of the drive shaft. The output gear from the first plurality of output gears operably coupled to a drive gear from the plurality of drive gears such that power is transmitted between the first transmission shaft and the drive shaft when the output gear from the first plurality of output gears is engaged with the first transmission shaft via the first shifting element. The output gear from the second plurality of output gears is operably coupled to a drive gear from the plurality of drive gears such that power is transmitted between the second transmission shaft and the drive shaft when the output gear from the second plurality of output gears is engaged with the second transmission shaft via the second shifting element. The first transmission shaft is configured to be selectively coupled to a motor, the motor configured to transmit power to the first transmission shaft such that the first transmission shaft rotates under the control of the motor when the first transmission shaft is operatively coupled to the motor. The second transmission shaft is configured to be selectively coupled to an engine, the engine configured to transmit power to the second transmission shaft such that the second transmission shaft rotates under the control of the motor when the first transmission shaft is operatively coupled to the motor.

In some embodiments, a controller is configured to be operably coupled to a motor, an engine, and a transmission. The transmission includes a first transmission shaft and a second transmission shaft. The first transmission shaft includes a first transmission input gear and a first plurality of output gears. The second transmission shaft includes a second transmission input gear and a second plurality of output gears. The first transmission shaft and the second transmission shaft are aligned such that the first plurality of output gears and the second plurality of output gears mesh with the plurality of drive gears of the drive shaft. The first transmission shaft including a first shifting element configured to selectively engage an output gear from the first plurality of output gears to adjust a ratio between a shaft rotation speed of the first transmission shaft and a shaft rotation speed of the drive shaft. The second transmission shaft including a second shifting element configured to selectively engage an output gear from the second plurality of output gears to adjust a ratio between a shaft rotation speed of the second transmission shaft and a shaft rotation speed of the drive shaft. The output gear from the first plurality of output gears is operably coupled to a drive gear from the plurality of drive gears such that power is transmitted between the first transmission shaft and the drive shaft when the output gear from the first plurality of output gears is engaged with the first transmission shaft via the first shifting element. The output gear from the second plurality of output gears is operably coupled to a drive gear from the plurality of drive gears such that power is transmitted between the second transmission shaft and the drive shaft when the output gear from the second plurality of output gears is engaged with the second transmission shaft via the second shifting element. The motor includes a motor shaft having a first motor gear and a second motor gear. The first motor gear is operably coupled to the first transmission shaft. The motor shaft includes a third shifting element configured to selectively engage the first motor gear to the motor shaft. The first motor gear configured to transmit power between the motor shaft and the first transmission shaft when the first motor gear is engaged to the motor shaft via the third shifting element. The engine includes an engine shaft having an engine gear. The engine gear is operably coupled to the second transmission input gear and the second motor gear of the motor shaft. The engine shaft includes a fourth shifting element configured to selectively engage the engine gear to the engine shaft. The engine gear is configured to transmit power between the engine shaft and the second transmission shaft when the engine gear is engaged to the engine shaft via the fourth shifting element. The controller is implemented in at least one of a memory or a processor. The controller includes a speed matching module configured to produce a control signal to adjust at least one of a speed of the engine shaft or a speed of the motor shaft when the second shifting element is being shifted.

In some embodiments, a method includes shifting a motor synchronizer to engage a motor gear coupled to a motor shaft such that the motor gear transmits power between the motor shaft and a first transmission shaft, the first transmission shaft including a plurality of output gears meshed with a first plurality of drive shaft gears of a drive shaft. Next, a speed of the motor shaft can be adjusted to match a speed of the gear of the first plurality of output gears to a speed of a corresponding gear from the plurality of drive shaft gears. Next, after the adjusting, a second transmission synchronizer can be shifted to engage the gear of the first plurality of output gears to transmit motor power between the first transmission shaft and the drive shaft.

In some embodiments, a non-transitory processor readable medium can store code representing instructions to be executed by a processor. The code can comprise code to cause the processor to: transmit, while engine power is continuously transmitted from an engine shaft to a drive shaft, a first shifting element control signal to cause a motor synchronizer to engage a motor gear coupled to a motor shaft such that the motor gear transmits power between the motor shaft and a first transmission shaft, the drive shaft configured to transmit power to a wheel of a vehicle. The code can also cause the processor to transmit a speed matching signal to match a speed of the output gear from the first plurality of output gears to a speed of the first transmission shaft, the speed being matched while engine power is continuously transmitted from the engine shaft to the drive shaft via the second transmission shaft. The code can also cause the processor to transmit a second shifting element control signal, after the transmission of the speed matching signal and while engine power is continuously transmitted from the engine shaft to the drive shaft, to cause the transmission synchronizer to engage the output gear from the first plurality of output gears such that motor power is transferred via the first transmission shaft and the output gear from the first plurality of output gears to the drive shaft.

As used herein, the singular forms "a," "an", and "the" include plural referents unless the context clearly dictates otherwise. Thus, for example, the term "a member" is intended to mean a single member or a combination of members, "a material" is intended to mean one or more materials, or a combination thereof.

As used herein, a "set" can refer to multiple features or a singular feature with multiple parts. For example, when referring to set of walls, the set of walls can be considered as one wall with distinct portions, or the set of walls can be considered as multiple walls.

As used herein, the terms "about" and "approximately" generally mean plus or minus 10% of the value stated. For example, about 0.5 would include 0.45 and 0.55, about 10 would include 9 to 11, about 1000 would include 900 to 1100.

Figure 26:
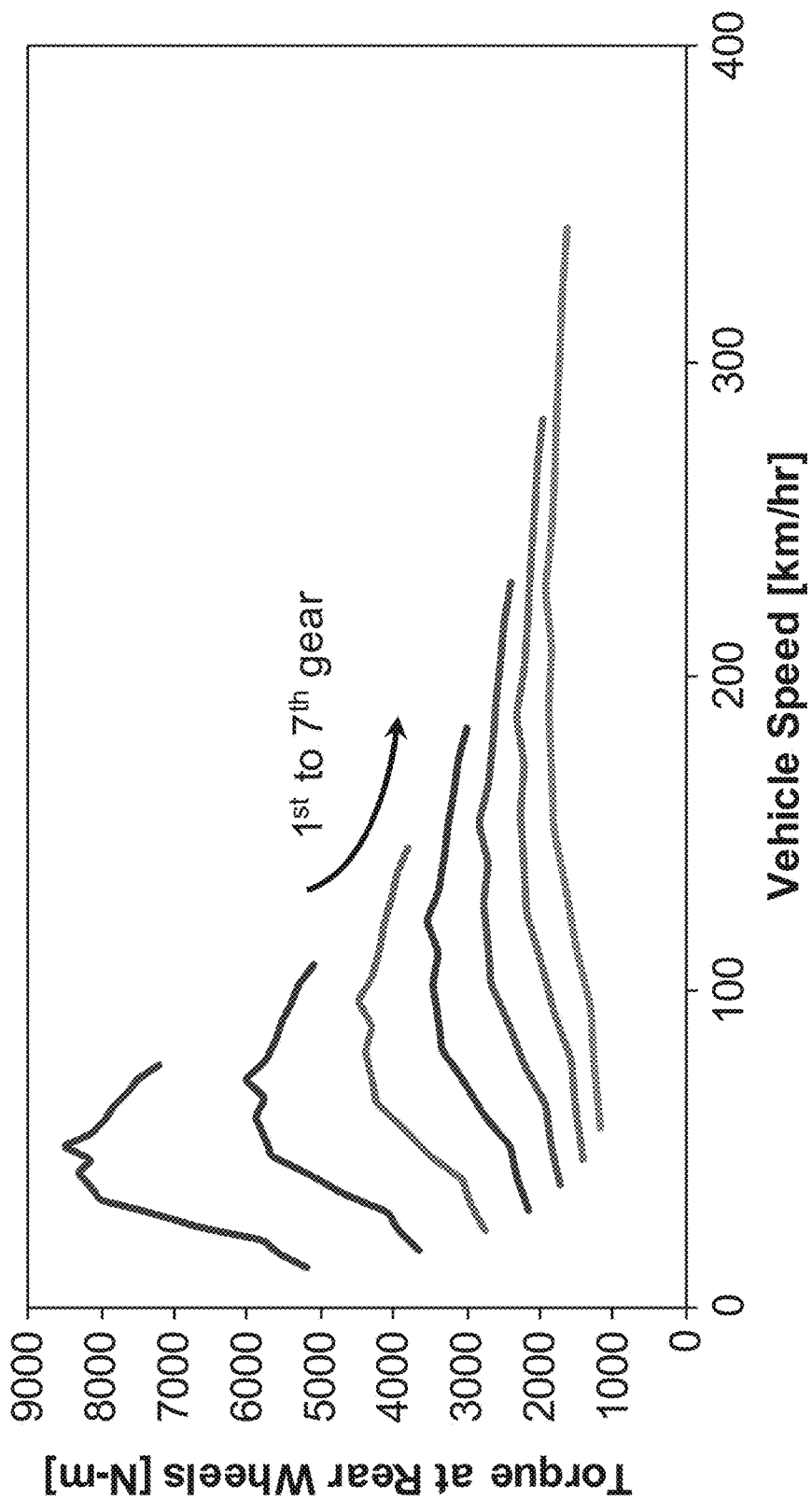
FIG. 26 is an assumed torque curve for a 7-speed rear wheel drive performance car, according to an embodiment.

To analyze the regions of a vehicle speed in which the efficiency and/or performance of a vehicle can be improved via the integration of an electric motor into the vehicle architecture, a torque-speed curve for an internal combustion engine-driven vehicle can be analyzed. For example, FIG. 26 provides an example of an assumed torque curve for a 7-speed rear wheel drive performance car with a 425 kW internal combustion engine. Each curve represents a different gear ratio, with a maximum speed in first gear of 77 km/hr at the engine's redline speed of 9000 RPM.

Additionally, the friction limit of the tires, aerodynamic drag, and rolling resistance can be considered in the efficiency and/or performance analysis. Using these factors, the maximum acceleration (a) that can be achieved at any given velocity (V) is given by $$a = \frac{\frac{\min(T_{fric}, T_{wheel})}{R_{tire}} - F_{rr} - F_{aero}}{m_{eff}}, \quad \text{Equation 1}$$

where $T_{wheel}$ is the driving torque at the rear wheels (as shown, for example, in FIG. 26), $T_{fric}$ is the friction limit of the tires, and $m_{eff}$ is the effective mass of the vehicle accounting for both the rotational inertia of the transmission system and the linear inertia of the vehicle. The friction limit of the tire can be a function of the tire's coefficient of static friction (a) and the weight acting upon it ($m_{car}g+F_{down}$).

$$T_{fric} = \mu(m_{car}g + F_{trans} + F_{down}). \quad \text{Equation 2}$$

The rolling resistance ($F_{rr}$) and the aerodynamic drag ($F_{aero}$) can be calculated using Equations 3 and 4, respectively.

$$F_{rr} = (m_{car}g + F_{down})C_{RR} \quad \text{Equation 3}$$

$$F_{aero} = \frac{1}{2}C_{aero}\rho_{air}A_{front}V^2 \quad \text{Equation 4}$$

As shown, the rolling resistance coefficient ($C_{RR}$), the fraction of the vehicle weight considering weight transfer due to acceleration ($m_{car}g+F_{trans}$), and aerodynamic downforce ($F_{down}$) acting on the tire can govern the rolling resistance of the tire. The coefficient of drag ($C_{aero}$), air density ($\rho_{air}$), and frontal area ($A_{front}$) can be used to calculate aerodynamic drag.

Figure 27:
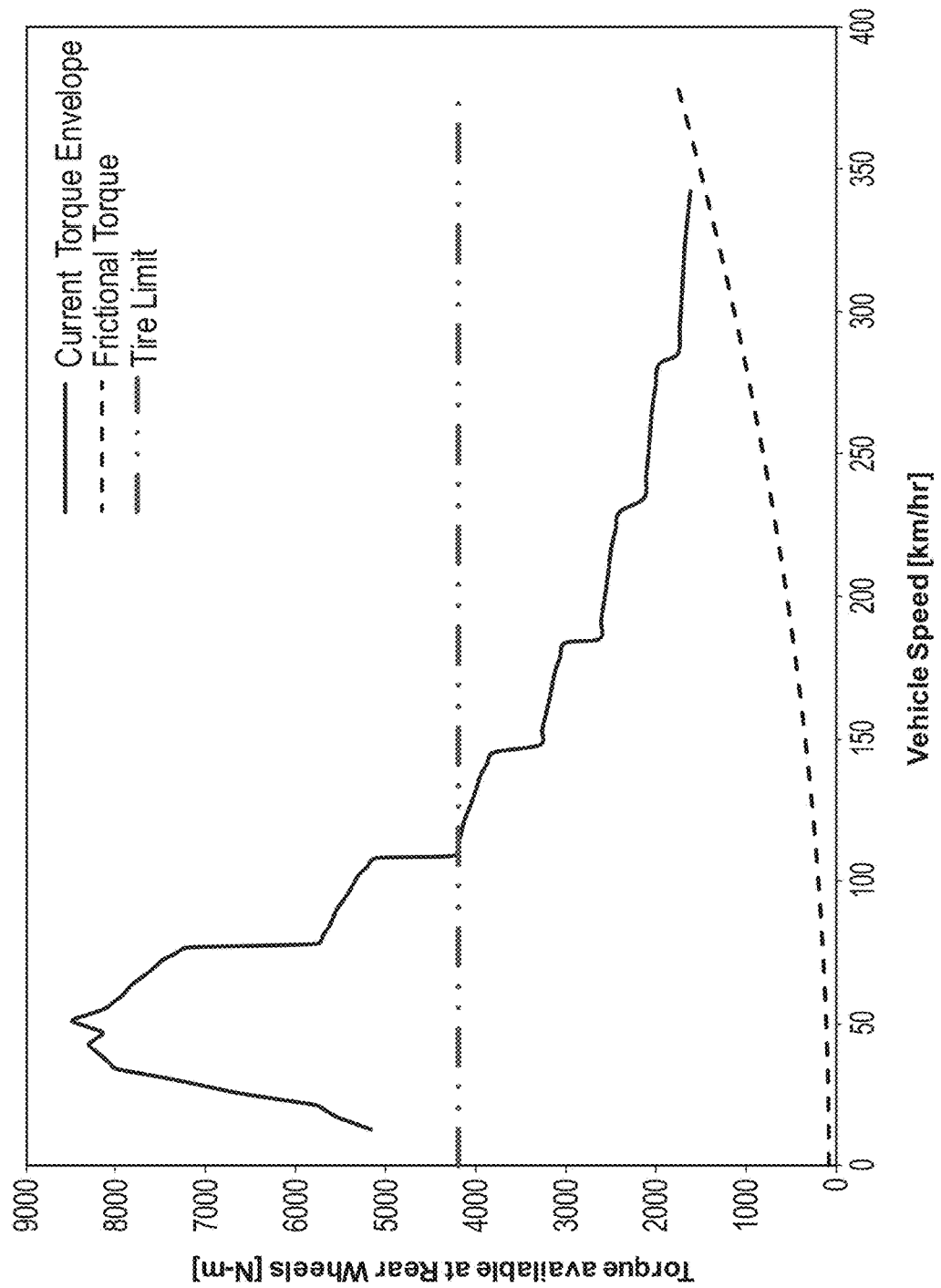
FIG. 27 is a graph plotting the maximum torque at any given vehicle speed, according to an embodiment.

FIG. 27 plots the maximum torque of the vehicle referenced in FIG. 26 at any given vehicle speed. As shown, FIG. 27 is divided into two regions. At speeds below 110 km/hr, the vehicle is friction-limited. In this range, torque exceeding the friction limit of the tires would result in slipping. At higher speeds, the torque from the engine dictates the maximum acceleration, as the available torque does not exceed the friction limit of the tires.

Thus, the capacity to accelerate at high speeds can be improved if an electric motor is used to provide additional torque through the full range of vehicle speeds. While some known architectures implement a planetary gear set and two geared shafts to couple the torque provided by both an internal combustion engine and an electric motor, the time taken to shift between gears of such known architectures is in the range of 0.6 to 1.2 seconds. Thus, such known architectures are too slow for performance applications where current desired shift times are, for example, 0.1 second or less. A shorter shift time is desired to minimize the decrease in vehicle speed during gear shifting sequences.

Alternatively, an electric motor can be used as the primary mover of a vehicle with an internal combustion engine serving as a generator. However, such an architecture results in a driving experience that lacks the engine roar or scream desired by performance vehicle drivers. Furthermore, an electric motor and power system capable of acceleration to 100 km/hr at a rate that is comparable to existing performance cars can weigh approximately 163 kg, or 10% of the baseline vehicle weight of a vehicle. Given the desire for minimal vehicle weight in performance applications, such a system is likely too heavy to incorporate in a performance car to meet performance standards. Thus, in some embodiments described herein, an electric motor is only used as the primary power source at speeds lower than 100 km/hr, allowing the use of an electric motor of reduced weight and reducing the overall vehicle weight.

Figure 28:
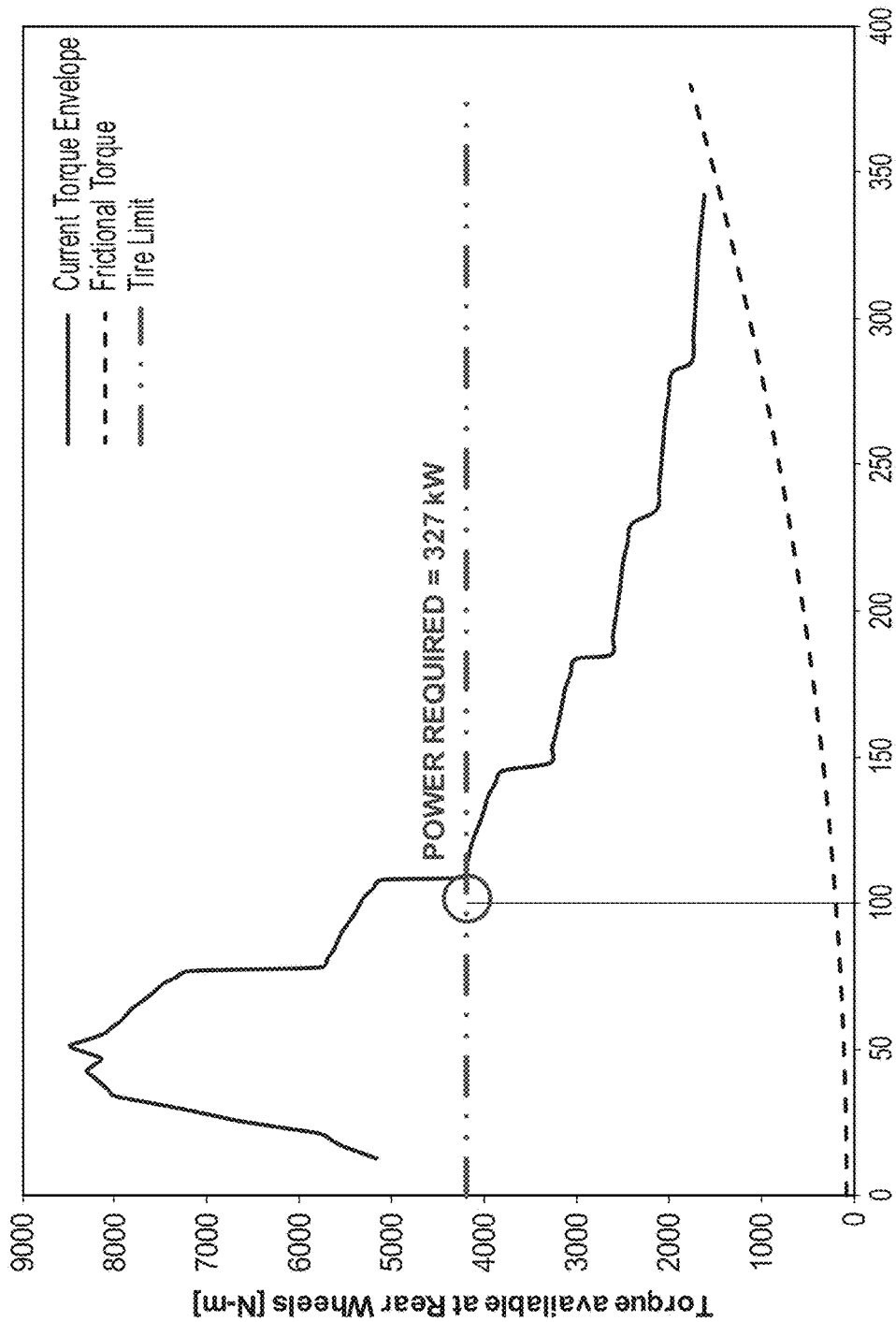
FIG. 28 is a graph plotting the maximum torque at any given vehicle speed and indicating the power required, according to an embodiment.

From the assumed torque-speed curve of FIG. 27, it was determined that maximum acceleration could be obtained if the electric motor is sized and geared to provide sufficient torque to meet the friction limit of the tires from, for example, 0 to 100 km/hr. As shown in FIG. 28, the power required for this function can be, for example, 327 kW. Assuming a power density of 3 kW/kg, the mass of the electric motor can be estimated to be, for example, 109 kg. The weight of batteries required for this application, assuming an energy density of 225 Wh/kg, can be, for example, 54 kg.

Figure 29:
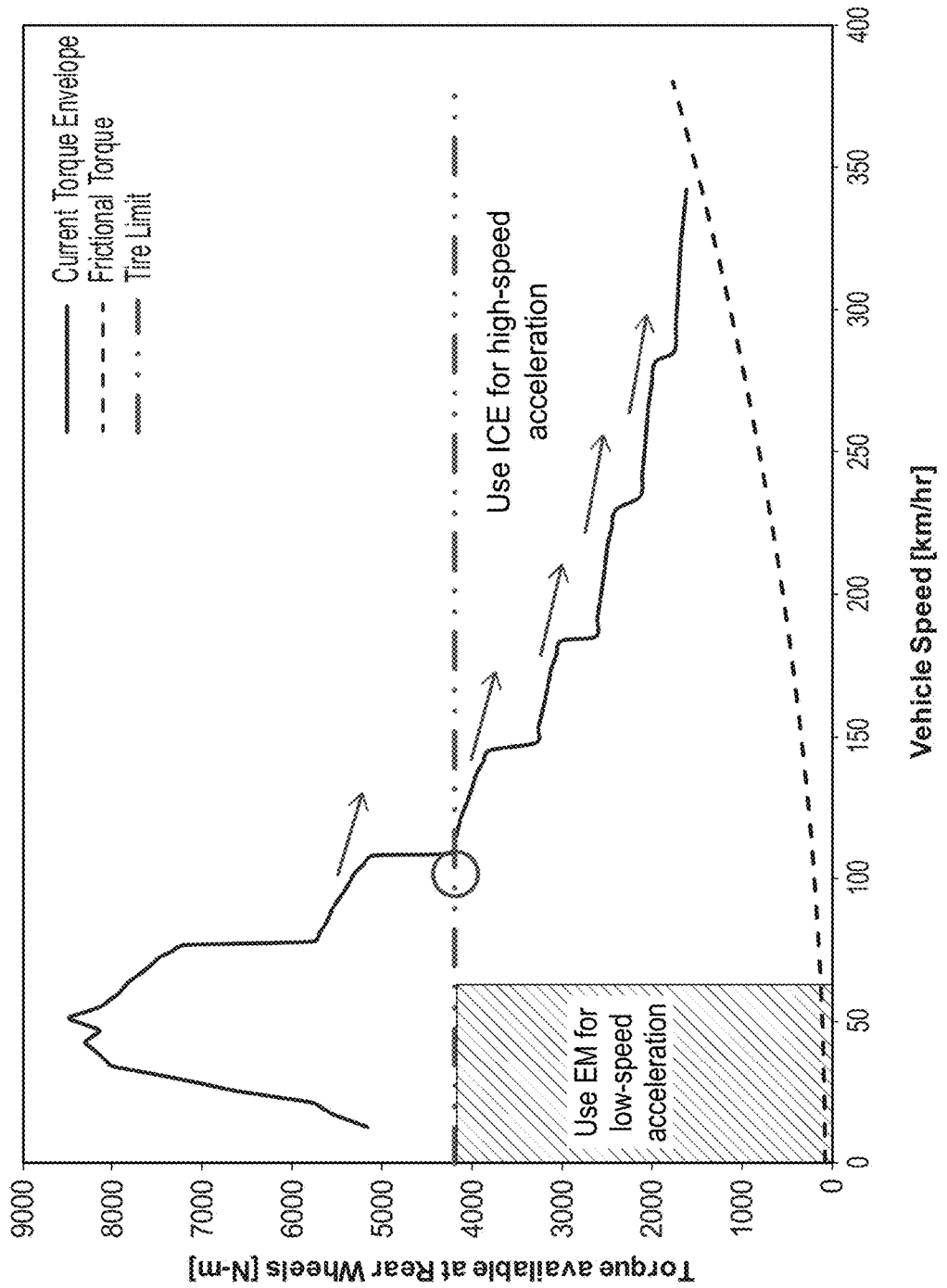
FIG. 29 is a graph plotting the maximum toque at any given vehicle speed including an electric motor for low-speed acceleration, according to an embodiment.

Therefore, in some embodiments described herein, an electric motor can be used to power a vehicle for low-speed acceleration and driving and an internal combustion engine can be engaged for acceleration and driving at higher speeds. Electric motors provide their maximum torque at low speed, thereby making them conducive to this application. Additionally, electric motors can be geared to achieve maximum acceleration at low speeds by ensuring that the torque output meets and/or exceeds the tire friction limit. By implementing an electric motor at low speeds, the gear ratios for the internal combustion engine can then be optimized to improve torque availability at high speeds without exceeding the tire friction limit, as shown in FIG. 29.

Based on Equation 1, acceleration can be improved by reducing the effective inertia of a vehicle. The effective inertia can be reduced through reduction of the number of large rotational elements, such as gears and the clutch, from the transmission system. The removal of the clutch can yield additional efficiency benefits since 20-25% of a single-clutch transmission's losses are incurred due to viscous losses at the clutch. Therefore, in some embodiments described herein, the transmission is clutchless. In some embodiments, an electric motor is included to yield performance benefits without increasing the net weight of the system.

In some embodiments, the removal of a clutch and reverse gear (and associated idler) and the addition of an electric motor and batteries does not reduce the total weight of a transmission compared to a traditional clutched transmission. For example, Table 1 provides a comparison of the estimated weight and inertia of the components of some embodiments against a traditional dual clutch transmission (DCT). DCTs are often used for performance applications. However, the addition of torque at low speeds and the reduction in the rotational inertia of the transmission can provide an acceleration benefit when launching the vehicle.

TABLE 1

|  | DCT | | Proposed Architecture | |
| --- | --- | --- | --- | --- |
|  | Weight [kg] | Inertia [kg-m$^2$] | Weight [kg] | Inertia [kg-m$^2$] |
| Shafts | 9 | 0.001 | 11.3 | 0.001 |
| Synchronizers | 1.3 | 0.001 | 2 | 0.001 |
| Gears | 27.2 | 0.031 | 22.9 | 0.026 |
| Clutch | 33.2 | 0.124 | 0 | 0 |
| ICE | 0 | 0.105 | 0 | 0.105 |
| Motor | 0 | 0 | 51 | 0.065 |
| Batteries | 0 | 0 | 76 | 0 |
| Transmission oil | 3.9 | 0 | 3.3 | 0 |
| Clutch oil | 8 | 0 | 0 | 0 |
| Enclosure | 62.3 | 0 | 66.6 | 0 |
| Total | 144.9 | 0.262 | 233.1 | 0.199 |

FIG. 1 is a schematic illustration of a powertrain system 100 according to an embodiment. The system 100 is included within a vehicle 110, which can be any suitable vehicle. The vehicle 110 can be, for example, a four-wheeled vehicle including a chassis to which the system 100 and any other suitable components can be mounted. As shown, the vehicle 110 includes a drive shaft 112, which can be coupled via a differential (not shown) to an axle (not shown) to transmit power (or torque) to one or more wheels (not shown).

The powertrain system 100 contains an electronic control unit 120, an electric motor 130, an engine 150, and a dual-shaft transmission 170. The transmission 170 includes a first transmission subassembly 170A and a second transmission subassembly 170B. The electric motor 130, and any of the electric motors described herein can be any suitable electric motor that produces power for and/or absorbs power from the wheels of the vehicle and/or the engine 150. For example, in some embodiments, the electric motor 130 (and any of the electric motors described herein) can be a 120 kW electric motor. The electric motor 130 is operatively coupled to the first transmission subassembly 170A and the second transmission subassembly 170B, as shown schematically in FIG. 1 by the arrow 132 and the arrow 134, respectively. In some embodiments, the electric motor 130 can include an input/output shaft that is coupled to the first transmission subassembly 170A and/or the second transmission subassembly 170B via mating gears, a belt drive, a concentric coupling, or the like. In some embodiments, the electric motor 130 can include an input/output shaft that is indirectly coupled to the first transmission subassembly 170A and/or the second transmission subassembly 170B (i.e., the input/output shaft is coupled to the first transmission subassembly 170A and/or the second transmission subassembly 170B via intervening structure). Torque is available at "zero speed" from an electric motor. Accordingly, as described herein, the system 100 (and any of the systems described herein) can use an electric motor to provide power to the vehicle wheels in a clutchless system to move the vehicle from a standstill. Similarly, in some embodiments, the system 100 (and any of the systems described herein) can use an electric motor to provide power to the vehicle wheels in a system that includes one or more clutches to move the vehicle from a standstill.

The engine 150, and any of the engines described herein, can be any suitable engine that produces power for and/or absorbs power from the wheels of the vehicle and/or the motor 130. In some embodiments, the engine 150 can be an internal combustion engine, such as a gasoline engine, a diesel engine, a natural gas-powered engine or the like. The engine 150 is operatively coupled to the first transmission subassembly 170A and the second transmission subassembly 170B, as shown schematically in FIG. 1 by the arrow 152 and the arrow 154, respectively. In some embodiments, the engine 150 can include an input/output shaft that is coupled to the first transmission subassembly 170A and/or the second transmission subassembly 170B via mating gears, a belt drive, a concentric coupling, or the like. Moreover, as shown schematically in FIG. 1 by the arrow 178, the engine 150 is operably coupled to the motor 130 such that power can be transmitted between the motor 130 and the engine 150, as discussed below. In this manner, for example, the engine 150 can supply power to the motor 130 to charge a battery (not shown), the motor 130 can supply power to the engine 150 to start the engine 150, or the like. The engine 150 can be operably coupled to the motor 130 by any suitable mechanism, such as, for example, a selective coupling (e.g., to allow the engine 150 to be disconnected from and/or to operate independently of the motor 130).

Each of the first transmission subassembly 170A and the second transmission subassembly 170B includes multiple mating gears (not shown) disposed on a transmission shaft configured to mate with gears coupled to the drive shaft 112. Specifically, multiple drive gears (not shown) can be coupled to the drive shaft 112. Each of the mating gears disposed on a first transmission shaft of the first transmission subassembly 170A can be coupled to one of the drive gears of the drive shaft 112. Similarly, each of the mating gears disposed on a second transmission shaft of the second transmission subassembly 170B can be coupled to one of the drive gears of the drive shaft 112 at a different angular orientation than the mating gears of the first transmission subassembly 170A are oriented relative to the drive shaft 112. Thus, the mating gears of the first transmission subassembly 170A can form a first set of mating gears with the drive gears of the drive shaft 122, and the mating gears of the second transmission subassembly 170B can form a second set of mating gears with the drive gears of the drive shaft 122.

The transmission 170 also includes a shifting assembly. The shifting assembly includes a first shifting subassembly 160A included in the first transmission subassembly 170A and a second shifting subassembly 160B included in the second transmission subassembly 170B. The transmission 170 can be shifted between the different sets of mating gears to modulate the engine power and speed applied to the drive shaft 112 (and vehicle wheels). The shifting assembly (and thus the first shifting subassembly 160A and the second shifting subassembly 160B) can include any suitable number of shifting elements (not shown). Each shifting element of the shifting assembly can be any suitable mechanism that matches the speed of a free-spinning gear (of the mating gear-set) to the speed of the rotating shaft about which the free spinning gear is rotated. In this manner, the shifting element facilitates shifting into (or the selection of) the gear during a gear shift operation of the transmission. In some embodiments, the shifting element (or any of the shifting elements shown herein) can be a synchronizer that includes a blocker ring and one or more conical-shaped collars, each of which is coupled to and axially movable along a transmission shaft. As the synchronizer is moved axially along the shaft into engagement with the target gear, the blocker ring prevents engagement between the synchronizer and the target gear until the shaft and the target gear have reached a sufficiently similar or substantially identical rotational speed. Said another way, the blocker ring prevents teeth associated with the synchronizer from grinding with teeth associated with the target gear. To reach a sufficiently similar or substantially identical rotational speed, the conical-shaped collar can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear. When the rotational speeds are sufficiently similar or substantially identical, the blocker ring can allow for engagement between the synchronizer and the target gear. Moreover, when the synchronizer is disengaged from the selected gear, the torque or "load" across the synchronizer must be reduced to a magnitude lower than the operating load and/or have a magnitude of zero. In this manner, the dog teeth (or other suitable engaging structures between the synchronizer and the engaged gear) can be "unloaded" to allow disengagement.

In other embodiments, the shifting element (or any of the shifting elements and/or synchronizers described herein) need not include a conical-shaped portion or any other structure that produces friction during the engagement (i.e., a "frictional element"). For example, in some embodiments, a shifting element and/or synchronizer can include any suitable movable coupling that can move relative to a shaft to engage and/or disengage a gear.

As shown schematically by the arrow 152 and the arrow 154, the engine 150 is operatively coupled to the first transmission subassembly 170A and the second transmission subassembly 170B such that engine power can be continuously transmitted from the engine 150 to the transmission 170 when the shifting assembly is being shifted to engage and/or select one of the sets of mating gears. For example, a transmission input gear of the first transmission shaft of the first transmission subassembly 170A can be operably coupled to an engine shaft such that a rotation speed of the first transmission shaft is dependent on a rotation speed of the engine shaft when a synchronizer is being shifted to engage and/or select one of the sets of mating gears of the first transmission subassembly 170A or the second transmission subassembly 170B. Thus, the engine 150 can be operatively coupled to the transmission 170 (i.e., the first transmission subassembly 170A and the second transmission subassembly 170B) by a linkage that is devoid of a clutch (e.g., a friction clutch). By eliminating the clutch, in some embodiments, the powertrain system 100 can operate with improved efficiency and higher performance than a system that includes a clutch. Selecting or "shifting" between gears within the clutchless transmission 170 is facilitated by the electronic control unit 120 that controls (or adjusts) any one of the engine speed, the speed of any of the shafts within the transmission 170 and/or the motor speed to match a speed of the target gear to a speed of a corresponding (or mating) gear or shaft when the synchronizer assembly 160 is being shifted. As described below, in some embodiments, the electronic control unit 120 includes a speed matching module 124 that produces an engine control signal to adjust an engine speed to match a speed of a gear or shaft within the transmission 170 to a speed of a corresponding gear or shaft during shifting. Also as described below, in some embodiments, the electronic control unit 120 includes a speed matching module 124 that produces a motor control signal to adjust a motor speed to match a speed of a gear or shaft within the transmission 170 to a speed of a corresponding gear or shaft during shifting.

Similarly as described with respect to the engine 150, the motor 130 is operatively coupled to the first transmission subassembly 170A and the second transmission subassembly 170B (as shown by arrows 132 and 134) such that motor power can be continuously transmitted from the motor 130 to the transmission 170 when the shifting assembly is being shifted to engage and/or select one of the sets of mating gears. For example, a transmission input gear of the first transmission shaft of the first transmission subassembly 170A can be operably coupled to a motor shaft such that a rotation speed of the first transmission shaft is dependent on a rotation speed of the motor shaft when a synchronizer is being shifted to engage and/or select one of the sets of mating gears of the first transmission subassembly 170A or the second transmission subassembly 170B. Thus, the motor 130 is operatively coupled to the transmission 170 (i.e., the first transmission subassembly 170A and the second transmission subassembly 170B) by a linkage that is devoid of a clutch (e.g., a friction clutch).

While described as being a clutchless transmission, in some embodiments the system 100 can include one or more clutches configured to selectively disengage two or more components of the system 100. For example, the system 100 can include a clutch associated with the engine 150 such that the engine 150 can be disengaged from the first transmission subassembly 170A, the second transmission subassembly 170B, and/or a motor shaft associated with the motor 130 during, for example, a gear shifting operation. In some embodiments, the system 100 can include a clutch associated with the motor 130 such that a motor shaft associated with the motor 130 can be disengaged from the first transmission subassembly 170A, the second transmission subassembly 170B, and/or an engine shaft associated with the engine 150.

Depending on the positions of the synchronizers of the synchronizer assembly 160, the components of the powertrain system 100 can be operatively coupled in various configurations to improve efficiency and/or performance of the vehicle 100. For example, in some embodiments, the electric motor 130 can be configured to rotate the first transmission shaft of the first transmission subassembly 170A and the first shifting subassembly 160A can be configured such that rotation of the first transmission shaft rotates the drive shaft 112. Such a "motor only" configuration enables the clutchless transmission design by allowing the electric motor 130 to move the vehicle 100 from a standstill. In contrast, movement of the vehicle 100 from a standstill would not be possible with the engine 150 coupled to the transmission 170 via a linkage devoid of a clutch because zero RPM is not an operational speed of the engine.

In other embodiments, the electric motor 130 can be configured to crank (or start) the engine 150. In some embodiments, the engine 150 can be configured to drive the the first transmission shaft of the first transmission subassembly 170A or the second transmission shaft of the second transmission subassembly 170B to rotate the drive shaft 112 via one of the sets of mating gears, as described above. Additionally, the engine 150 can be configured to charge an energy storage device (e.g. a battery bank) associated with the electric motor 130. In some configurations, the engine 150 only charges the energy storage device (e.g. "park and charge" mode). In other configurations, the engine 150 charges the energy storage device while simultaneously rotating the drive shaft 112 (e.g. "drive and charge" mode).

Figure 2:
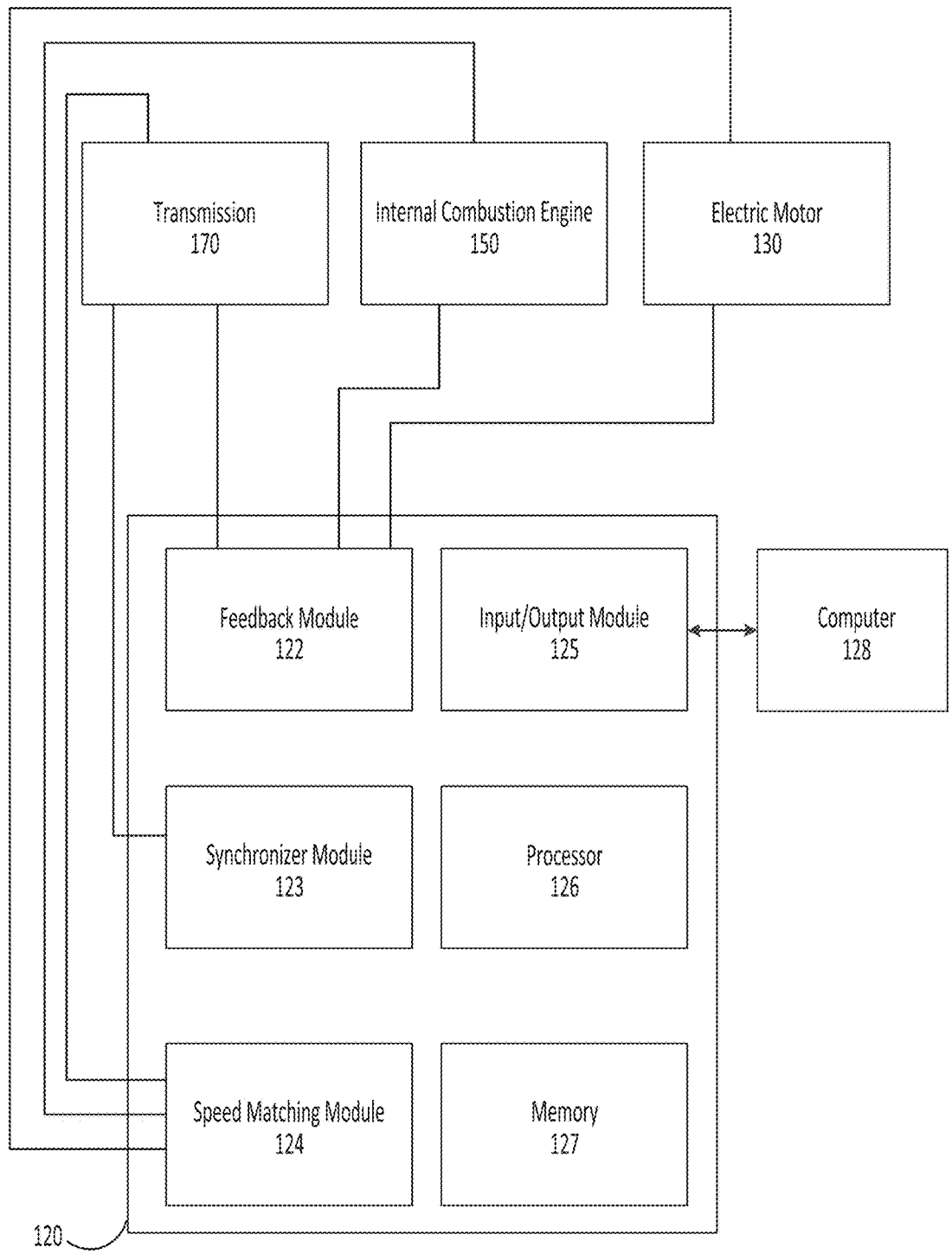
FIG. 2 is a schematic illustration of an electronic control unit of the powertrain system of FIG. 1.

The electronic control unit 120 is configured to control the electric motor 130, the engine 150, and the synchronizer assembly 160 to operate the system 100 as described herein. The electronic control unit 120 (or "controller") can control the speed matching of drivetrain components, selection of gears in the transmission 170, shifting of synchronizers (e.g., within the synchronizer unit), and any other functions as described herein. In some embodiments, the electronic control unit 120 (and any of the controllers described herein) can include one or more modules to perform the functions described herein. For example, FIG. 2 is a schematic illustration of the electronic control unit 120. The electronic control unit 120 is coupled to a computer 128 or other processing device, such as a vehicle control module, a service computer, or the like. As shown above in FIG. 1, the electronic control unit 120 is also coupled to the first transmission subassembly 170A and the second transmission subassembly 170B of the transmission 170, the engine 150 and the motor 130.

The electronic control unit 120 (or any of the controllers described herein) can include a memory 127, a processor 126, and an input/output module (or interface) 125. The electronic control unit 120 can also include a feedback module 122, a synchronizer module 123, and a speed matching module 124. The electronic control unit 120 is coupled to the computer 128 or other input/output device or other input/output device via the input/output module (or interface) 125.

The processor 126 can be any processor configured to, for example, write data into and read data from the memory 127, and execute the instructions and/or methods stored within the memory 127. Furthermore, the processor 126 can be configured to control operation of the other modules within the controller (e.g., the synchronizer module 123, the feedback module 122, and the speed matching module 124). Specifically, the processor 126 can receive a signal including user input, shaft speed data, vehicle speed or the like and determine a value for one or more control signals to control the powertrain based on the signal. In other embodiments, the processor 126 can be, for example, an application-specific integrated circuit (ASIC) or a combination of ASICs, which are designed to perform one or more specific functions. In yet other embodiments, the processor 126 can be an analog or digital circuit, or a combination of multiple circuits.

The memory device 127 can be any suitable device such as, for example, a read only memory (ROM) component, a random access memory (RAM) component, electronically programmable read only memory (EPROM), erasable electronically programmable read only memory (EEPROM), registers, cache memory, and/or flash memory. Any of the modules (the synchronizer module 123, the feedback module 122, and the speed matching module 124) can be implemented by the processor 126 and/or stored within the memory 127.

The speed matching module 124 of the electronic control unit 120 includes circuitry, components and/or code to produce and/or deliver one or more control signals associated with one or more shafts and/or components in the powertrain system 100. The signals (represented as a solid line between the various vehicle components and the electronic control unit 120) can be any signal of the types shown and described herein. In some embodiments, the speed matching module 124 receives input from other portions of the system, and can therefore send the control signals to the appropriate subset of components.

In some embodiments, the speed matching module 124 is configured to produce an engine control signal to adjust an engine speed such that a speed of a transmission shaft is matched to a speed of a drive shaft during a gear shift operation. Such engine control signals can be delivered to an engine control module, and can include signals to adjust the throttle position, fueling, timing or any other aspect of the engine performance that will adjust the engine speed. In some embodiments, the speed matching module 124 is configured to produce a motor control signal to adjust a motor speed such that a speed of a transmission shaft is matched to a speed of a drive shaft during a gear shift operation. Such motor control signals can be delivered to a motor control module, and can include signals to adjust any aspect of the motor performance that will adjust the motor speed.

In some embodiments, the speed matching module 124 is configured to produce a motor control signal to adjust a speed of a motor shaft such that a speed of an engine shaft gear is matched to a speed of a corresponding engine shaft during, for example, a gear shift operation. Similarly, in some embodiments, the speed matching module 124 is configured to produce an engine control signal to adjust a speed of an engine shaft such that a speed of a motor shaft gear is matched to a speed of a corresponding motor shaft during, for example, a gear shift operation.

In other embodiments, the speed matching module 124 is configured to produce a motor control signal to adjust a speed of a motor shaft when the motor is operably coupled to the engine 150 such that the electric motor 130 controls the speed of the engine 150 such that a speed of a transmission shaft is matched to a speed of a drive shaft during a gear shift operation. Specifically, in such a speed matching configuration, the motor 130 can add power to the engine shaft (when the engine speed is lower than desired) and can absorb power from the engine shaft (i.e., acting like a brake; when the engine speed is greater than desired). In this manner, the electric motor 130 provides another and/or an alternative method for controlling the engine 150 (in addition to directly adjusting the fueling, timing, valve events or the like).

The electronic control unit 120 includes the synchronizer module 123. The synchronizer module 123 includes circuitry, components and/or code to produce one or more control signals (identified as the solid lines to the transmission 170) that can be delivered to the synchronizers (not shown) to facilitate shifting, as described herein.

In some embodiments, the electric motor 130 is configured to transmit power between a motor shaft of the electric motor 130 and the drive shaft 112 (via a transmission shaft) to prevent acceleration lag when a synchronizer is being shifted on an engine shaft to transition the engine 150 between engagement with the first transmission shaft and engagement with the second transmission shaft (e.g., during a gear shift from a gear associated with the first transmission shaft to a gear associated with the second transmission shaft). This can be referred to as "torque fill." For example, when no synchronizer is in engagement with either of the gears on the engine shaft, the power from the engine 150 is, at least temporarily, not transmitted from the engine shaft to either of the transmission shafts. As a result, the power from the engine is not transmitted to the drive shaft 112. During this shifting period, the electric motor 130 can apply torque to the drive shaft 112 via a transmission shaft (e.g., the second transmission shaft) to prevent acceleration lag. After a synchronizer on the engine shaft engages with one of the engine shaft gears such that power is transmitted from the engine 150 to the drive shaft 112 via a transmission shaft (e.g., the second transmission shaft), the electric motor 130 can continue to transmit additional power to the drive shaft 112. Alternatively, the electric motor 130 can disengage from the drive shaft 112 until the next gear shifting period.

In some embodiments, the engine 150 is configured to transmit power between an engine shaft of the engine 150 and the drive shaft 112 (via a transmission shaft) to prevent acceleration lag when a synchronizer is being shifted on a motor shaft to transition the motor 130 between engagement with the first transmission shaft and engagement with the second transmission shaft (e.g., during a gear shift from a gear associated with the first transmission shaft to a gear associated with the second transmission shaft or when changing gears from one gear to another gear on the same transmission shaft, such as, for example, from gear 375B to 375D). Similarly as described above, this can also be referred to as "torque fill." For example, when no synchronizer is in engagement with either of the gears on the motor shaft, the power from the motor 130 is, at least temporarily, not transmitted from the motor shaft to either of the transmission shafts. As a result, the power from the motor 130 is not transmitted to the drive shaft 112. During this shifting period, the engine 150 can apply torque to the drive shaft 112 via a transmission shaft (e.g., the second transmission shaft) to prevent acceleration lag. After a synchronizer on the motor shaft engages with one of the motor shaft gears such that power is transmitted from the motor 130 to the drive shaft 112 via a transmission shaft (e.g., the second transmission shaft), the engine 150 can continue to transmit additional power to the drive shaft 112. Alternatively, the engine 150 can disengage from the drive shaft 112 until the next gear shifting period.

While the system 100 is shown and described such that the motor 130 can be operationally coupled to either of the first transmission subassembly 170A and the second transmission subassembly 170B and thus operationally control either of the first transmission shaft and the second transmission shaft, in some embodiments the system 100 can be arranged such that the motor 130 is only operationally engageable to or engaged with the first transmission subassembly 170A such that the motor 130 cannot provide power to the drive shaft 112 via the second transmission subassembly 170B. Similarly, while the system 100 is shown and described such that the engine 150 can be operationally coupled to either of the first transmission subassembly 170A and the second transmission subassembly 170B and thus operationally control either of the first transmission shaft and the second transmission shaft, in some embodiments the system 100 can be arranged such that the engine 150 is only operationally engageable to or engaged with the second transmission subassembly 170B such that the engine 150 cannot provide power to the drive shaft 112 via the first transmission subassembly 170A. Thus, the system 100 can be driven by both the engine 150 and the motor 130 simultaneously, or by one of the engine 150 and the motor 130 independently.

Figure 3:
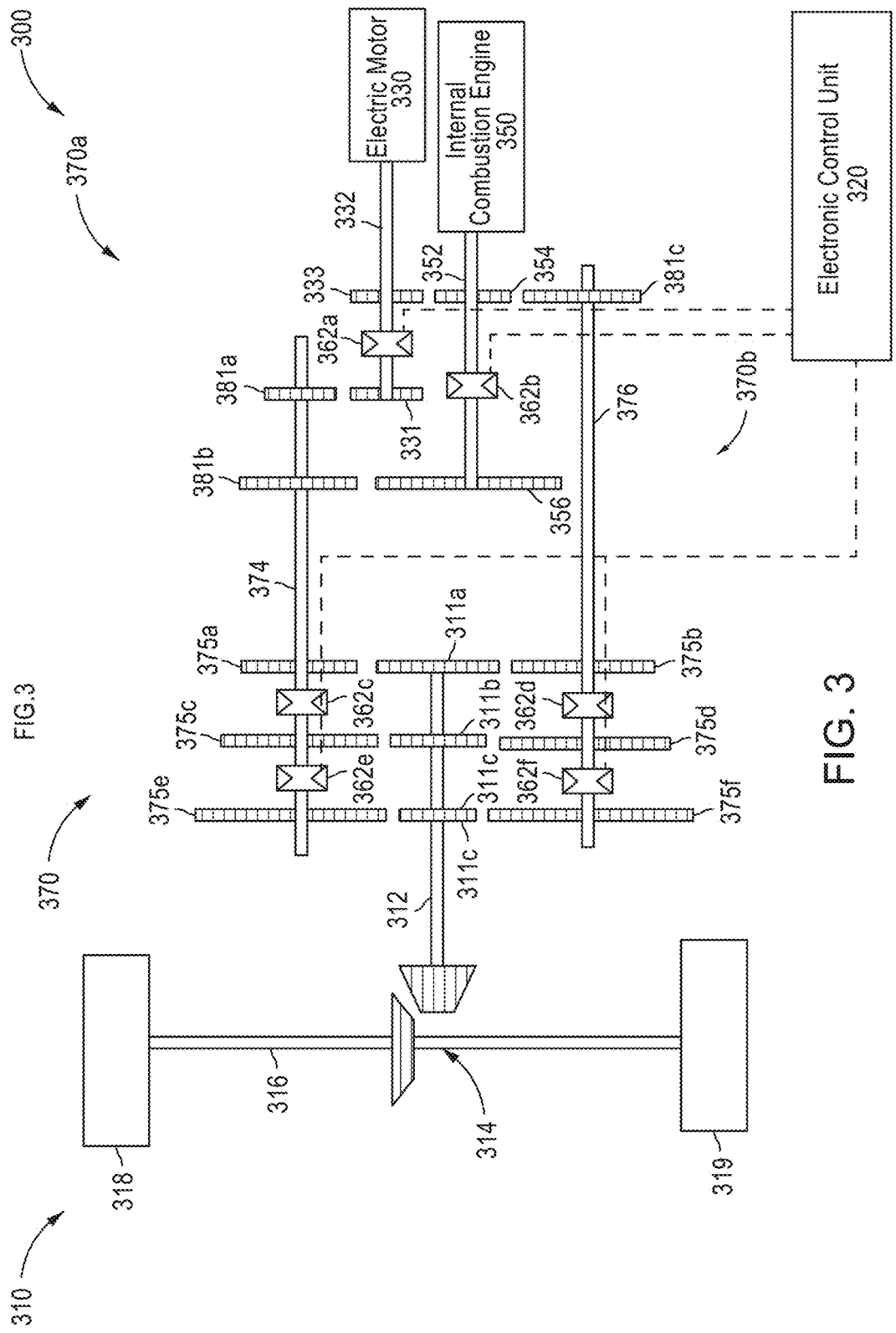
FIG. 3 is a schematic illustration of a powertrain system according to an embodiment.

FIG. 3 is a schematic illustration of a powertrain system 300 including two power sources, dual transmission shafts, and no clutch, according to an embodiment. The system 300 is included in a vehicle 310. The vehicle 310 includes a drive shaft 312. The drive shaft 312 has a first end fixedly coupled to a first drive shaft gear 311A and a second end configured to be coupled via a differential 314 to an axle 316. A second drive shaft gear 311B and a third drive shaft gear 311C are fixedly coupled to the drive shaft 312 between the first end and the second end. Although the drive shaft 312 is shown and described as having the first drive shaft gear 311A adjacent the first end of the drive shaft 312, the first drive shaft gear 311A (along with the second drive shaft gear 311B and the third drive shaft gear 311C) can be positioned in any suitable location along the drive shaft 312. The axle 316 includes a first end coupled to a first wheel 318 and a second end coupled to a second wheel 319. The vehicle 310 can also include a chassis and any other suitable components. Although shown as driving two wheels (i.e., as part of a four-wheeled vehicle), in other embodiments, the vehicle 310 and any of the vehicles described herein can have any number of wheels and drive configurations. Moreover, although shown as including a drive shaft 312 that is substantially perpendicular to the axle 316, in other embodiments, the drive shaft 312 can have any relationship and/or connection to the wheels 318, 319 (e.g., a transverse mounted, front-wheel drive system, a rear-wheel drive system, an all-wheel drive system, or the like).

The powertrain system 300 contains an electronic control unit 320, an electric motor 330, an internal combustion engine 350, and a dual-shaft transmission 370. The electric motor 330 is configured to rotate and/or receive rotation power from an electric motor shaft 332. The electric motor 330, and any of the electric motors described herein, can be any suitable electric motor that produces power for and/or absorbs power from the wheels of the vehicle 310 and/or the engine 350. For example, in some embodiments, the electric motor 330 (and any of the electric motors described herein) can be a 120 kW electric motor.

The transmission 370 includes a first transmission subsystem 370A and a second transmission subsystem 370B. The first transmission subsystem 370A includes a first transmission shaft 374 and the second transmission subsystem 370B includes a second transmission shaft 376. The transmission 370 also includes transmission output gears 375 (e.g., a first gear 375A, a second gear 375B, a third gear 375C, a fourth gear 375D, a fifth gear 375E, and a sixth gear 375F). The odd gears (e.g., the first gear 375A, the third gear 375C, and the fifth gear 375E) are included in the first transmission subsystem 370A and are coupled to the first transmission shaft 374. The even gears (e.g., the second gear 375B, the fourth gear 375D, and the sixth gear 375F) are included in the second transmission subsystem 370B and are coupled to the second transmission shaft 376. As described in more detail below, each of the gears 375 can each be moved between a "free running" configuration about its respective first transmission shaft 374 or second transmission shaft 376, and a fixed configuration in which the gear 375 does not rotate relative to its respective first transmission shaft 374 or second transmission shaft 376. The configuration of the gears 375 is controlled by a synchronizer (or shifting) assembly, as discussed below. Although six gears 375 are shown and described, the system 300 and the transmission 370 can be configured to include any number of gears 375 arranged in any functional way to modulate power and/or speed when rotating the drive shaft 312.

The transmission output gears 375 are operably coupled to, engaged with and/or meshed with the drive shaft gears 311. Specifically, the first gear 375A and the second gear 375B are operatively coupled to, engaged with, and/or meshed with the first drive shaft gear 311A. The third gear 375C and fourth gear 375D are operatively coupled to, engaged with, and/or meshed with the second drive shaft gear 311B. The fifth gear 375E and sixth gear 375F are operatively coupled to, engaged with, and/or meshed with the third drive shaft gear 311C. Because the drive shaft gears 311 are fixedly coupled to (i.e., cannot rotate relative to) the drive shaft 312 and each of the transmission output gears 375 is coupled to a respective drive shaft gear 311, rotation of the wheels 318, 319 and/or the drive shaft 312 produces rotation of the transmission output gears 375, and vice-versa. Although the drive shaft gears 311 (and other drive shaft gears described herein) are shown and described as being fixedly coupled to the drive shaft, in some embodiments the drive shaft gears 311 can be free spinning and engageable with the drive shaft. For example, the drive shaft 312 can include any suitable number of drive shaft synchronizers such that free spinning drive shaft gears can be locked. Alternatively, in some embodiments, a clutch-type element can be included on the shaft 312 to control the selective engagement of the drive shaft gears. Thus, additional power paths could be controlled via the selective engagement of the drive shaft gears such that the system 300 could achieve, for example, torque for engine cranking or for recharging batteries associated with the electric motor 330.

The first transmission subsystem 370A also includes a first transmission input gear 381A and a second transmission input gear 381B fixedly coupled to the first transmission shaft 374. The second transmission subsystem 370B includes a third transmission input gear 381C fixedly coupled to the second transmission shaft 376.

As shown, the electric motor 330 is operatively coupled to the first transmission shaft 374 by the electric motor shaft 332. Specifically, a first electric motor gear 331 and a second electric motor gear 333 are coupled to the electric motor shaft 332. The first electric motor gear 331 is configured to be operatively coupled to, engaged with and/or meshed with the first transmission input gear 381A. The second electric motor gear 333 is configured to be operatively coupled to, engaged with and/or meshed with the first internal combustion engine gear 354 described below. As described in more detail below, the first electric motor gear 331 and the second electric motor gear 333 can each be moved between a "free running" configuration about the electric motor shaft 332 and a fixed configuration, in which the gear does not rotate relative to the electric motor shaft 332. The configuration of the first electric motor gear 331 and the second electric motor gear 333 is controlled by a synchronizer (or shifting element) 362A of the synchronizer (or shifting) assembly, as discussed below. In this manner, the operational configuration (or "mode") of the system can be changed to allow various routes of power transfer between the electric motor 330, the engine 350 and the wheels 318, 319 (via the rotation of the first transmission shaft 370A and/or the second transmission shaft 370B). For example, when the first electric motor gear 331 is in the fixed configuration relative to the electric motor shaft 332, the electric motor 330 can be configured to rotate the first transmission shaft 374 via the electric motor shaft 332, the first electric motor gear 331, and the first transmission input gear 381A. Conversely, when the first electric motor gear 331 is in the free running configuration about the electric motor shaft 332, no power is transferred between the electric motor 330 and the first transmission shaft 374, even though the first electric motor gear 331 remains operably coupled to and/or meshed with the first transmission input gear 381A. Although the second electric motor gear 333 is shown as being similar in size to the first electric motor gear 331, the first electric motor gear 331 and the second electric motor gear 333 can each be any suitable size.

The internal combustion engine 350, and any of the engines described herein, can be any suitable engine that produces power for and/or absorbs power from the wheels 318, 319 and/or the motor 330. The engine 350 is configured to rotate and/or be rotated by an internal combustion engine shaft 352. A first internal combustion engine gear 354, a second internal combustion engine gear 356, and a second synchronizer (or shifting element) 362B are each coupled to the internal combustion engine shaft 352. As shown, the first internal combustion engine gear 354 is operably coupled to, engaged with, and/or meshed with both the second electric motor gear 333 and the third transmission input gear 381C. As described in more detail below, the first internal combustion engine gear 354 can be moved between a "free running" configuration about the shaft 352 and a fixed configuration, in which the first internal combustion engine gear 354 does not rotate relative to the shaft 352. The configuration of the first internal combustion engine gear 354 (and the second internal combustion engine gear 356, described below) is controlled by the second synchronizer 362B of the synchronizer assembly.

The second internal combustion engine gear 356 is operable coupled to, engaged with, and/or meshed with the second transmission input gear 381B. As described in more detail below, the second internal combustion engine gear 356 can be moved between a "free running" configuration about the shaft 352 and a fixed configuration, in which the second internal combustion engine gear 356 does not rotate relative to the engine shaft 352. The configuration of the second internal combustion engine gear 356 (and the first internal combustion engine gear 356, described above) is controlled by the second synchronizer 362B of the synchronizer assembly.

As a result, depending on the configuration of the synchronizer assembly (i.e., the synchronizer 362A and the synchronizer 362B), the electric motor 330 can be configured to crank (or transmit power to) the internal combustion engine 350 through rotation of the internal combustion engine shaft 352. Additionally, when the first internal combustion engine gear 354 and the second electric motor gear 333 are each in the fixed configuration, the internal combustion engine 350 can be configured to charge an energy storage device (not shown) associated with the electric motor 330 through the rotation of the electric motor shaft 332. The energy storage device can include a battery bank. In some embodiments, the energy storage device can be a component of the electric motor 330. In other embodiments, the energy storage device can be a separate component that is electrically coupled to the electric motor 330.

Additionally, as described below, depending on the position of the second synchronizer 362B, the internal combustion engine shaft 352 can be decoupled from the first transmission subsystem 370A and the second transmission subsystem 370B when the powertrain system 300 is in, for example, an "electric motor only" drive configuration, a "charging" configuration, or the like.

As described in more detail below, however, the engine power can be transmitted from the engine 350 and/or the engine shaft 352 to the first transmission shaft 374 or the second transmission shaft 376 when the synchronizer assembly is actuated to shift between the gears 375 within the transmission 370. For example, when the second synchronizer 362B is engaged with the second internal combustion engine gear 356, the rotation speed of the first transmission shaft 374 is dependent on the rotation speed of the engine shaft 352. Thus, the engine 350 can adjust the speed of the first transmission shaft 374 until the speed of the first transmission shaft 374 matches the speed of a target gear, such as the third gear 375C. When the speed of the first transmission shaft 374 matches the speed of the target gear (e.g., the third gear 375C), a synchronizer (the third synchronizer 362C) can shift into engagement with the target gear and lock the target gear to the first transmission shaft 374 such that the target gear and the first transmission shaft 374 are rotationally fixed. Similarly, when the second synchronizer 362B is engaged with the first internal combustion engine gear 354, the engine power can be transmitted from the engine 350 and/or the engine shaft 352 to the second transmission shaft 376 via the third transmission input gear 381C. In such a configuration, the rotation speed of the second transmission shaft 376 is dependent on the rotation speed of the engine shaft 352. Thus, the rotation speed of the transmission 370 (e.g., the first transmission shaft 374 or the second transmission shaft 376) can be dependent on a rotation speed of the engine shaft 352 when a synchronizer (such as the third synchronizer 362C, described below) associated with a gear 375 (such as the first gear 375A, described below) is being shifted into engagement with the gear 375. Thus, the engine 350 and/or the engine shaft 352 is operatively coupled to the first transmission shaft 374 and/or the second transmission shaft 376 by a linkage that is devoid of a clutch (e.g., a friction clutch or a torque converter). Similarly stated, the transmission 370 is a manual transmission that is coupled to the engine 350 via a linkage that is devoid of a clutch or a torque converter. Such a manual transmission can include, for example, a "fully manual" or driver manipulated transmission or an automated manual transmission or "AMT," which has the similar structure and gearing as a manual, but with electronic actuation. Thus, the powertrain 300 is described as including a dual-shaft clutchless transmission 370. By eliminating the clutch, the powertrain system 300 can operate with improved efficiency and higher performance than a system that includes a clutch.

While described as being a clutchless transmission, in some embodiments the system 300 can include one or more clutches configured to selectively disengage two or more components of the system 300. For example, the system 300 can include a clutch on the engine shaft 352 instead of or in addition to the synchronizer 362B and first and second gears 354, 356 such that the engine 350 can be disengaged from the first transmission subassembly 370A, the second transmission subassembly 370B, and/or a motor shaft associated with the motor 330 during, for example, a gear shifting operation. In some embodiments, the system 300 can include a clutch on the motor shaft 332 such that the motor shaft 332 can be disengaged from the first transmission subassembly 370A, the second transmission subassembly 370B, and/or an engine shaft associated with the engine 350.

The synchronizer assembly can include, for example, a first synchronizer (or shifting element) 362A, a second synchronizer (or shifting element) 362B, a third synchronizer (or shifting element) 362C, a fourth synchronizer (or shifting element) 362D, a fifth synchronizer (or shifting element) 362E, and a sixth synchronizer (or shifting element) 362F. As described above, the first synchronizer 362A is located on the electric motor shaft 332, and is capable of moving between engagement with the first electric motor gear 331 and engagement with the second electric motor gear 333. The second synchronizer 362B is located on the internal combustion engine shaft 352, and is capable of moving between engagement with the first internal combustion engine gear 354 and the second internal combustion engine gear 356. The third synchronizer 362C is located on the first transmission shaft 374, and is capable of moving between the first gear 375A and the third gear 375C. The fourth synchronizer 362D is located on the second transmission shaft 376, and is capable of moving between the second gear 375B and the fourth gear 375D. The fifth synchronizer 362E is located on the first transmission shaft 374, and is capable of moving between the third gear 375C and the fifth gear 375E. The sixth synchronizer 362F is located on the second transmission shaft 376, and is capable of moving between the fourth gear 375D and the sixth gear 375F. Alternatively, the synchronizer assembly can be configured to include any number of synchronizers suitable to control any number of gears 375 arranged in the transmission 370.

The synchronizers are operably coupled to the electronic control unit 320 (and any associated actuators, not shown in FIG. 3) so that the electronic control unit 320 can selectively slide the synchronizers along their respective shafts to move a gear between the free running configuration and the fixed configuration. The synchronizers can be any suitable mechanism that matches the speed of a free-spinning gear to the speed of the rotating shaft about which the free spinning gear is rotated. In this manner, the synchronizer facilitates shifting into (or the selection of) the gear during a gear shift operation (e.g., within the transmission 370, the electric motor shaft 332, and/or the engine shaft 352). In some embodiments, each synchronizer includes a conical-shaped collar (or set of collars) that is coupled to and axially movable along the shaft. The synchronizer, however, is coupled to the shaft such that the conical-shaped collar cannot rotate relative to the shaft (e.g., the synchronizer can be coupled to the shaft via a spline coupling). When a synchronizer is positioned on a shaft so that the synchronizer is not in coupled engagement with a target gear, the gear can rotate freely about the shaft (i.e., the gear is in a "free running" configuration). Thus, although the gear (and any gears meshed thereto) are rotating, no power is being transferred between the respective shafts. For example, when the first synchronizer 362A is positioned on the electric motor shaft 332 so that it is not in coupled engagement with the first electric motor gear 331 or the second electric motor gear 333, the electric motor shaft 332 can rotate, but does not rotate either the first electric motor gear 331 or the second electric motor gear 333. When a synchronizer is positioned on a shaft so that the synchronizer is in coupled engagement with a gear (i.e., placing the gear in a locked configuration), the previously freely rotating gear is rotationally fixed relative to the rotating shaft. For example, when the first synchronizer 362A is moved along the electric motor shaft 332 into coupled engagement with the first electric motor gear 331, the first electric motor gear 331 becomes rotationally fixed relative to the electric motor shaft 332. In this configuration, the electric motor shaft 332 is configured to rotate the electric motor gear 331, which rotates (or is rotated by) the first transmission input gear 381A and the first transmission shaft 374.

When the synchronizer is moved axially along the shaft into engagement with the target gear, the conical-shaped portion can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear.

In other embodiments, the synchronizers can be any suitable shifting element as described herein. Such shifting elements need not include a frictional element to match the speeds of the shafts and/or gears.

The electronic control unit 320 is configured to control the electric motor 330, the internal combustion engine 350, and the synchronizer assembly 360 to operate the system 300. The electronic control unit 320 is configured to use speed-matching so that changes in the gear configuration of the transmission 370 can be made in a manner that limits damage and/or excessive wear (e.g., to the dog-teeth). Specifically, changing the gear configuration includes both shifting into gear (i.e., the selection or engagement of a gear) and shifting out of gear (i.e. the deselection or disengagement of a gear). Accordingly, the "speed matching" described herein (for any of the powertrain systems) can be used to enable shifting into gear, and also can be used to "match" the torque between engaged components to allow those components to be disengaged.

For example, in some embodiments, any of the speed matching systems and algorithms described herein can be used during a gear deselection to "zero" the torque across such components. Specifically, in some embodiments, the electronic control unit 320 (or any of the electronic control units or controllers described herein) can modulate the torque within the drivetrain to allow deselection of gears (e.g., via control of the engine or electric motor).

Accordingly, the electronic control unit 320 can be configured to have precise, closed-loop control over the speed of the internal combustion engine 350, the speed of the electric motor 330, and the position of the synchronizers of the synchronizer assembly. This configuration gives the electronic control unit control over the speed of all shafts and gears in the transmission 370. In some embodiments, the electronic control unit 320 (and any of the controllers described herein) can include one or more modules to perform the functions described herein. For example, in some embodiments, the electronic control unit 320 can be similar to the electronic control unit 120 described above.

Although the gear shifting configurations are described below in a sequential manner, it is understood that the system 300 (and any of the systems described herein) can enable shifting in any sequence. For example, in some embodiments, the gears can be shifted between first and third, third and eighth, etc.

Selecting or "shifting" between gears within the powertrain system 300 is facilitated by the electronic control unit 320 that controls (or adjusts) any one of the engine speed, the speed of any of the shafts within the transmission 370 and/or the motor speed to match a speed of the target gear to a speed of a corresponding (or mating) gear or shaft when the synchronizer assembly is being shifted. In some embodiments, the electronic control unit 320 (or controller) can include a speed matching module that produces an engine control signal to adjust an engine speed to match a speed of a gear or shaft within the transmission 370 to a speed of a corresponding gear or shaft during shifting. Specifically, when it is necessary to mesh two gears (and/or shafts) moving at different angular speeds, the electronic control unit 320 can be configured to use either the internal combustion engine 350 or the electric motor 330 to increase the speed of the slower spinning gear and/or shaft to match the speed of the faster spinning gear. Once the two gears are spinning at the same speed, the electronic control unit 320 can produce a signal to shift an associated transmission synchronizer to mate the two gears. For example, when shifting between gears 375 within the transmission 370, the appropriate synchronizer (e.g., synchronizer 362C) is shifted to match the speed of a free running gear (e.g., of gear 375A) to the speed of a transmission shaft (e.g., the first transmission shaft 374).

Because the first transmission shaft 374 and the second transmission shaft 376 are coupled to the drive shaft 312 by a number of gears (e.g., the gears 375), and because the engine shaft 352 can remain coupled to the first transmission shaft 374 or the second transmission shaft 376, differences between the speed of the engine shaft 352 (i.e., the engine speed) and the transmission shaft to be coupled to the engine shaft 352 are undesirable and limit the ability of the shifting to occur. In traditional manual transmissions, a clutch is used to temporarily disengage the engine shaft from the transmission shaft. In the powertrain system 300 described herein, the electronic control unit 320 can adjust or "match" the shaft speeds to facilitate the desired shifting while a rotation speed of the input shaft is dependent on a rotation speed of the engine shaft. For example, with the second synchronizer 362B in a neutral position on the engine shaft 352, the electronic control unit 320 can increase (or decrease) the speed of the internal combustion engine 350 and, thus, the engine shaft 352 to match the speed of, for example, the second internal combustion engine gear 356. Specifically, while the electric motor 330 provides rotation to the first transmission shaft 374 and the transmission 370 is in, for example, third gear (e.g., the third synchronizer 362C is in engagement with the third gear 375C such that power is transmitted to the drive shaft 312 via the third gear 375C), the second transmission input gear 381B rotates the second internal combustion engine gear 356 relative to the engine shaft 352. The electronic control unit 320 can control the electric motor 330 and the internal combustion engine 350 to adjust the speeds of one or both until the engine shaft 352 and the second internal combustion engine gear 356 are rotating at matching speeds. Once the speeds match, the second synchronizer 362B can shift into engagement with the second internal combustion engine gear 356 such that the engine shaft 352 is locked to the second internal combustion engine gear 356 and the engine 350 can provide power to the first transmission shaft 374. Moreover, for any brief period of "zero torque" transmission, which occurs at the instant of gear shifting, the electric motor 330 can supply power (or "torque fill") to the drive shaft 312.

Specifically, the electric motor 330 is configured to transmit power between the electric motor shaft 332 and the drive shaft 312 when a synchronizer is being shifted to engage and/or select one of the sets of mating gears (i.e. torque fill) to prevent acceleration lag. For example, when the second synchronizer 362B is shifting between the first internal combustion engine gear 354 and the second internal combustion engine gear 356 (or vice versa), the power from the engine 350 is not transmitted from the engine shaft 352 to either of the transmission shafts (e.g., 374, 376). As a result, the power from the engine 350 is not transmitted to the drive shaft 312. During this shifting period, the electric motor 330 can apply torque to the drive shaft 312 to prevent acceleration lag. After the second synchronizer 362B engages with either the first internal combustion engine gear 354 or the second internal combustion engine gear 356 power is transmitted from the engine 350 to the drive shaft 312 (via one of the gears 375 in a locked configuration relative to one of the transmission shafts), the electric motor 330 can continue to transmit additional power to the drive shaft 312. Alternatively, the electric motor 330 can disengage from the drive shaft 312 until the next gear shifting period.

Similarly, for any brief period of "zero torque" transmission during gear shifting, the engine 350 can supply power (or "torque fill") to the drive shaft 312. Specifically, the engine 350 can be configured to transmit power between the engine shaft 332 and the drive shaft 312 when a synchronizer is being shifted to engage and/or select one of the sets of mating gears (i.e. torque fill) to prevent acceleration lag. For example, when the first synchronizer 362A is shifting between the first motor gear 331 and the second motor gear 333 (or vice versa), the power from the motor 330 is not transmitted from the motor shaft 352 to either of the transmission shafts (e.g., 374, 376). As a result, the power from the motor 330 is not transmitted to the drive shaft 312. During this shifting period, the engine 350 can apply torque to the drive shaft 312 to prevent acceleration lag. For example, the engine 350 drive shaft 312 can operate under the power and/or rotational control of the engine 350 via the first transmission shaft 374 or the second transmission shaft 376 while the first transmission shaft 374 is speed matched to the electric motor shaft 332. After the first synchronizer 362A engages with either the first motor gear 331 or the second motor gear 333 and power is transmitted from the motor 330 to the drive shaft 312 (via one of the gears 375 in a locked configuration relative to one of the transmission shafts), the engine 350 can continue to transmit additional power to the drive shaft 312. Alternatively, the engine 350 can disengage from the drive shaft 312 until the next gear shifting period.

While the engine 350 provides rotation to one of the transmission shafts (e.g., 374 or 376), the electric motor 330 can provide rotation to the other of the transmission shafts. Thus, for example, if the third synchronizer 362C is engaged with the third gear 375C and the second synchronizer 362B is engaged with the second internal combustion engine gear 356, the rotational speed of the first transmission shaft 374 can depend on the speed of the engine 350. As the vehicle 310 accelerates and the engine 350 increases the rotational speed of the first transmission shaft 374 (and thus the speed of the drive shaft 312), the first synchronizer 362A can shift into engagement with the second electric motor gear 333 such that the speed of the second transmission shaft 376 is dependent on the speed of the electric motor 330. The electric motor 330 can thus increase the speed of the second transmission shaft 376 to match the rotational speed of the fourth gear 375D such that, when the speeds are matched, the third synchronizer 362C can shift out of engagement with the third gear 375C and the fourth synchronizer 362D can shift into engagement with the fourth gear 375C. The second synchronizer 362B can then shift first into a neutral position and then into engagement with the first internal combustion engine gear 354 such that the internal combustion engine 350 can also provide power to the second transmission shaft 376. The electric motor 330 can continue to provide additional power to the second transmission shaft 376, or the first synchronizer 362A can shift to a netural position such that the electric motor 330 is disengaged from either of the transmission shafts.

In some embodiments, the drive shaft 312 (and thus, the vehicle 310) can be driven by both power sources (the motor 330 and the engine 350) simultaneously. In some embodiments, while one of the power sources is being shifted (e.g., synchronizer 362C or 362E is shifting to engage a gear set while the motor drives the first transmission shaft 374), the other power source (e.g., the engine 350) can torque fill to prevent power interruption. In some embodiments, for example, if the motor 330 is powering the drive shaft 312 via the first gear 375A, the engine 350 can shift into or out of this gear (i.e., such that both the motor 330 and the engine 350 provide power to the drive shaft via the first transmission shaft 374 and the first gear 375A). Alternatively, the engine 350 can switch into or out of any of the gears 375 coupled to the shaft 376 (e.g., second gear 375B, fourth gear 375D, or sixth gear 375F) for simultaneous or sequential powering of the drive shaft 312 via the second transmission shaft 376. Said another way, in some embodiments, the vehicle 310 can be driven through a first gear ratio on the engine power (e.g., via the second shaft 376) and a second gear ratio via the motor power (e.g., via the first shaft 374). In some embodiments, the vehicle 310 can be driven through the same ratio by both the motor 330 and the engine 350 simultaneously (via either the first transmission shaft 374 or the second transmission shaft 376).

In some embodiments, the electronic control module 320 can include a feedback module (e.g., similar to the feedback module 122 described above) to receive input from sensors configured to monitor the torque and/or speed of the first transmission shaft 374 and the second transmission shaft 376. The electronic control module 320 and/or the feedback module can also be configured to monitor the torque of the first electric motor shaft 332 and the internal combustion engine shaft 352. The electronic control module 320 is configured to process the torque signals and other input, and produce and/or transmit signals to actuate the appropriate synchronizer combination in order to achieve a particular required function. For example, in some embodiments, the electronic control module 320 can include a speed matching module configured to produce an engine control signal based on the input received by the feedback module. The speed matching module can, for example, adjust an engine speed such that a speed of the engine shaft 352 and/or second internal combustion engine gear 356 is matched to a speed of the first transmission shaft 374 during a gear shift operation. Such engine control signals can be delivered to an engine control module, and can include signals to adjust the throttle position, fueling, timing or any other aspect of the engine performance that will adjust the engine speed. In other embodiments, the electronic control module 320 and/or the speed matching module are configured to produce a motor control signal to adjust a speed of a motor shaft such that a speed of a target gear 375 is matched to a speed of a corresponding transmission shaft (e.g., 374, 376) during a gear shift operation.

In some embodiments, the electronic control module 320 can include a feedback module (e.g., similar to the feedback module 122 described above) to receive input from sensors configured to monitor (or calculate) the torque of any components within the drive train to facilitate deselection of a gear. Specifically, the electronic control module 320 can adjust or "zero" the torque across engaged components. In some embodiments, the feedback module can sense and/or calculate torque based on torque sensor (e.g., strain gauge sensors on a shaft), calculated engine load (e.g., from a fueling/throttle map) and/or a load sensor outside of the drivetrain (e.g., an engine mount sensor). In some embodiments, the feedback module can sense and/or calculate torque based on the current associated with (e.g., drawn from or supplied to) the electric motor 330.

In some embodiments, the second synchronizer 362B on the engine shaft can be configured to selectively disengage the engine shaft from the first internal combustion engine gear 354 and/or the second internal combustion engine gear 356 to interrupt power transmission between the engine shaft and the transmission shafts (e.g., 374, 376). The controller can include a synchronizer module configured to produce a synchronizer control signal associated with a motor drive configuration. When in the motor drive configuration, the synchronizer is disengaged from the first internal combustion engine gear 354 and/or the second internal combustion engine gear 356 and the first motor gear 331 or the second motor gear 333 can transmit power from the motor shaft 332 to the drive shaft 312. In some embodiments, the feedback module of the electronic control unit 320 is configured to receive a vehicle speed signal associated with a wheel speed, and the synchronizer module is configured to produce the synchronizer control signal when the wheel speed is zero.

For example, to begin moving the first wheel 318 and the second wheel 319 from a total stop (i.e., a vehicle wheel speed of zero), the electric motor 330 can rotate the drive shaft 312 to rotate the axle 316 via the first transmission shaft 374 if the first synchronizer 362A is engaged with the first motor gear 331 and the third synchronizer 362C is engaged with the first gear 375A. In some embodiments, the synchronizer assembly can be used to transmit some power from the electric motor 330 to crank (or start) the internal combustion engine 350.

To disengage a gear-set, the electronic control unit 320 can send a control signal to regulate fuel flow to (or any other performance characteristic of) the internal combustion engine 350 to unload the first transmission shaft 374 (or the second transmission shaft 376) as the first electric motor 330 fills to provide torque to the drive shaft 312 (described above). Similar to the launching procedure, a modulated actuation of the synchronizer assembly needs to be included in the software of the electronic control unit 320 to command disengagement once each shaft is unloaded. The disengagement or "torque zeroing" can be based on feedback or torque calculations, as described above. In other embodiments, the electronic control unit 320 sends a control signal to apply a nominal force to the synchronizer that is engaged. When the engaged elements are at or close to "zero" torque, the magnitude of the nominal force is sufficient to disengage the components.

FIGS. 4A-8C is a partial view of system 300 with the electronic control unit 320 not shown. In FIGS. 4A-8C, components rotating under the control of the electric motor 330, the engine 350, and/or the wheels 318, 319, but that are not under load (i.e. not transferring power), are indicated by a hatched pattern (i.e., a series of lines in a single, diagonal direction). Alternatively, components rotating under the control of the electric motor 330, the engine 350, and/or the wheels 318, 319, but that are under load (i.e. transferring power), are indicated by a cross-hatched pattern (i.e., as series of hatching lines that intersect each other). Components that are not rotating under the control of the electric motor 330, the engine 350, and/or the wheels 318, 319, or under any of the other components of the system 300, are shown with no pattern.

Figure 4A:
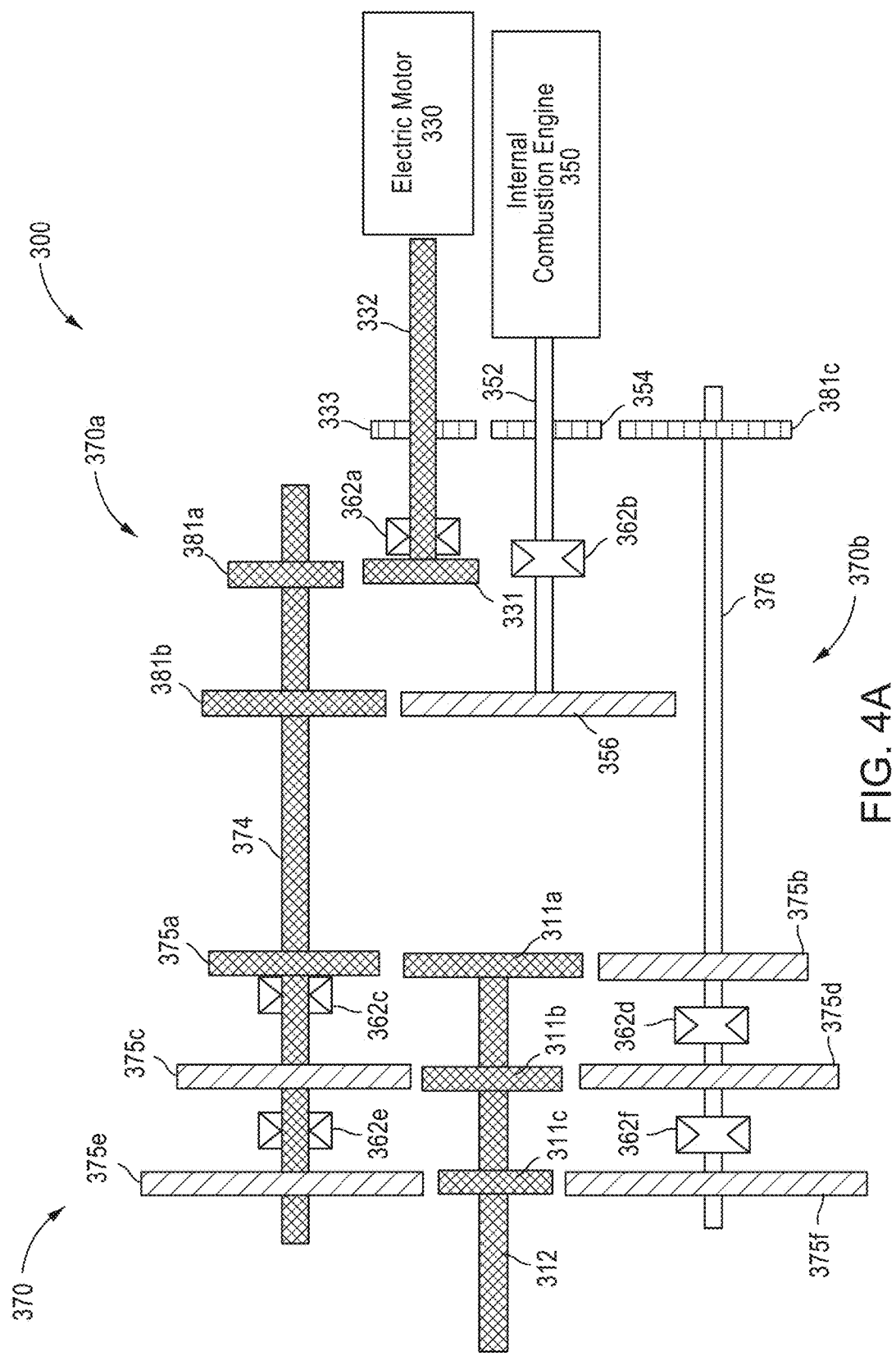
FIGS. 4A-4C are schematic illustrations of the powertrain system of FIG. 3 in various stages of a launching sequence, according to an embodiment.
Figure 4B:
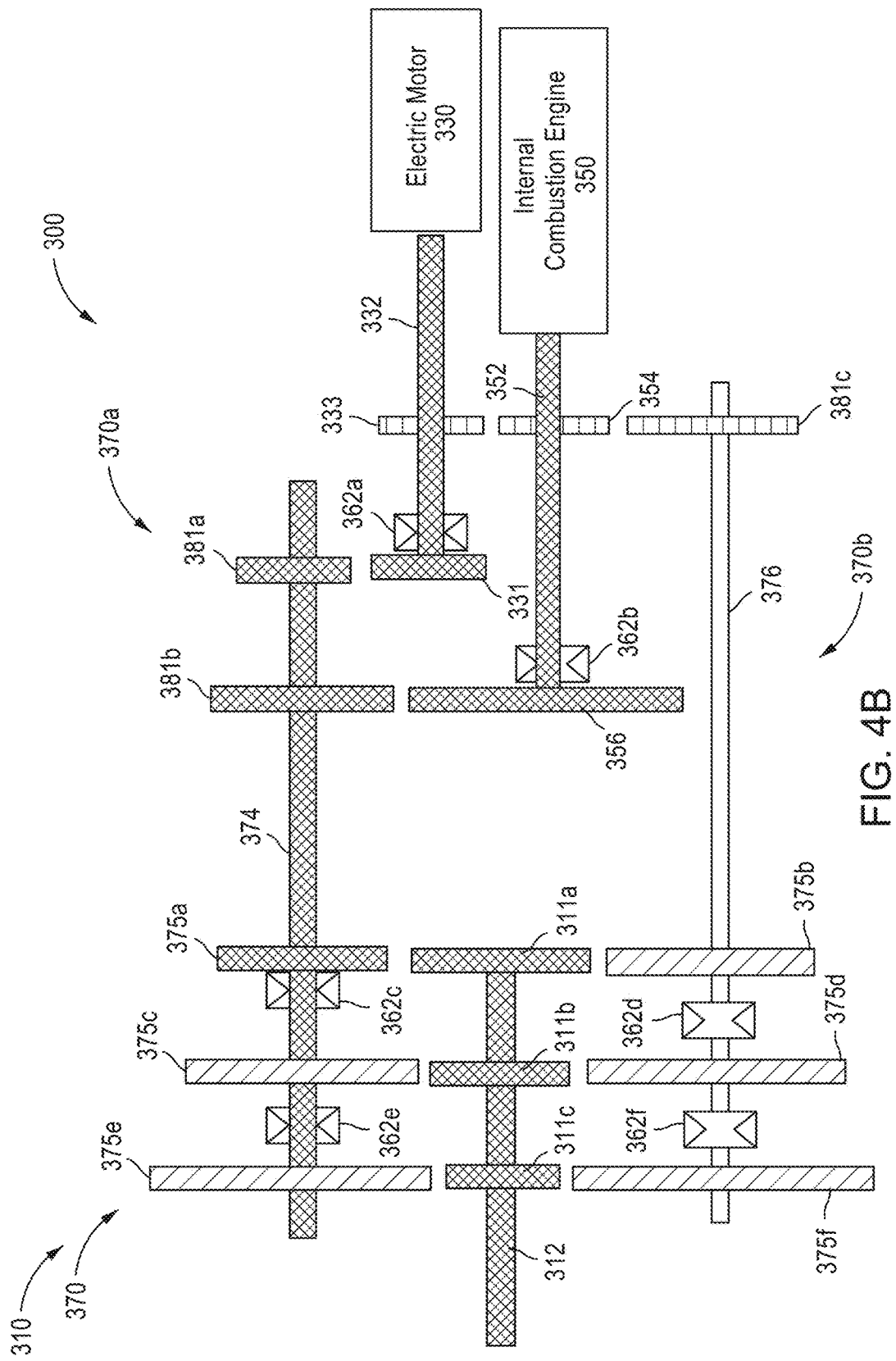
Figure 4C:
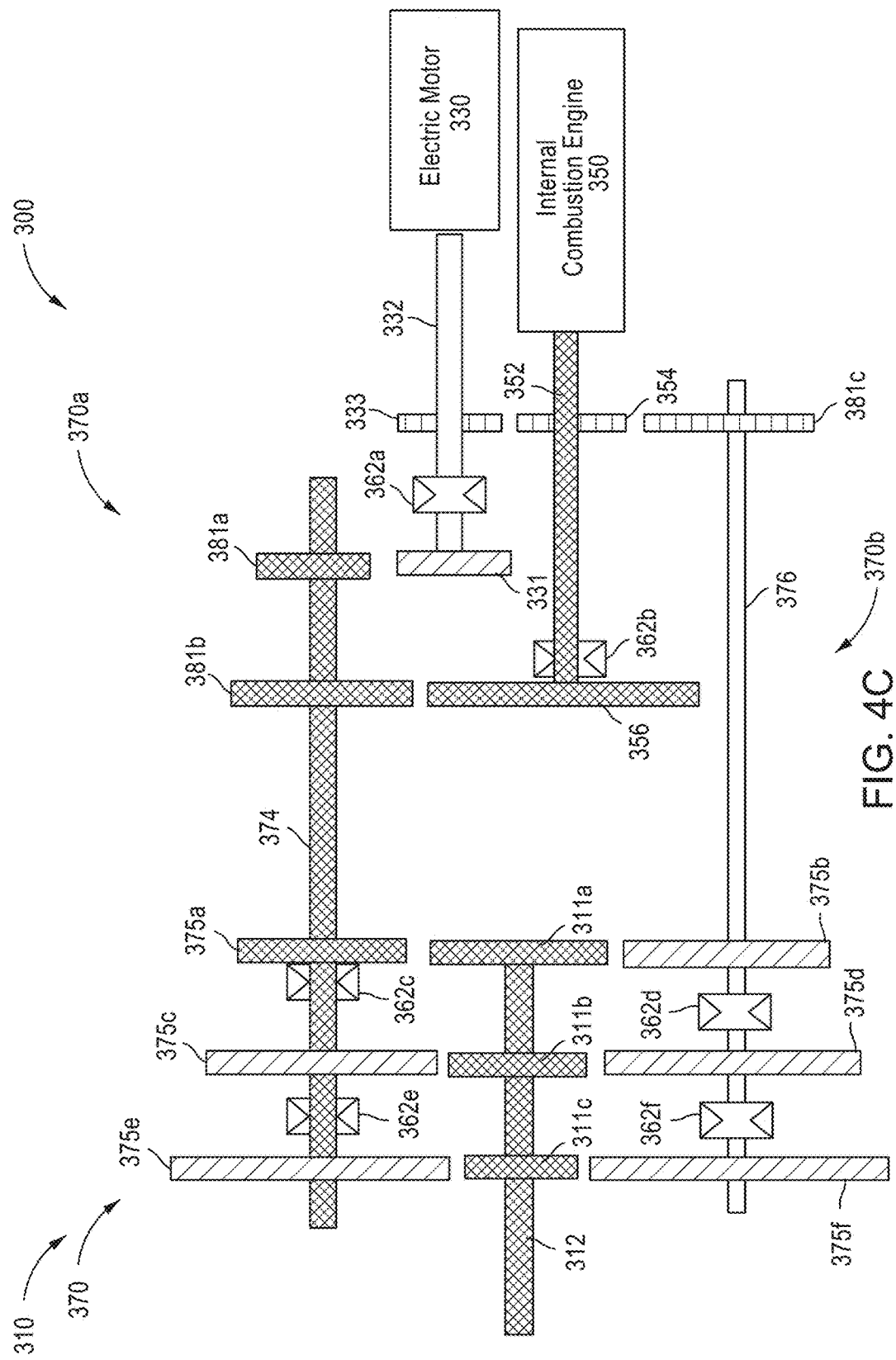

FIGS. 4A-4C show the stages of a performance mode launch sequence for the system 300. As shown in FIG. 4A, to perform low speed maneuvering, the electronic control unit 320 shifts the third synchronizer 362C to the right to lock the first transmission shaft 374 to the first gear 375A. The electronic control unit 320 shifts the first synchronizer 362A to the left along the electric motor shaft 332 to lock the electric motor shaft 332 into engagement with the first electric motor gear 331. Next, the electronic control unit 320 actuates the electric motor 330 and signals the electric motor 330 to rotate the electric motor shaft 332. As a result, as indicated by the cross-hatched pattern, the first electric motor gear 331 and the first transmission input gear 381A rotate under the control of and/or are powered by the electric motor shaft 332. Due to the fixed relationship between the first transmission input gear 381A and the first transmission shaft 374, the rotation of the electric motor shaft 332 causes the rotation of the first transmission shaft 374. When the first transmission shaft 374 is locked to the first gear 375A, rotation of the first transmission shaft 374 causes rotation of the first gear 375A, the first drive shaft gear 311A, and the drive shaft 312. The rotation of the drive shaft 312 causes the differential 314 to rotate the axle 316. Due to the engagement between the first drive shaft gear 311A, the second drive shaft gear 311B, and the third drive shaft gear 311C to the second gear 375B, the fourth gear 375D, and the sixth gear 375F, respectively, the second gear 375B, the fourth gear 375D, and the sixth gear 375F also rotate under control of the electric motor shaft 332. Because the synchronizers 362D and 362F are disengaged from the gears on the second transmission shaft 376, no power is transmitted from the second gear 375B, the fourth gear 375D, and the sixth gear 375F to the second transmission shaft 376. This is indicated by the lack of pattern of the second transmission shaft 376. In this manner, when in the "electric only" mode, the frictional losses within the transmission are minimized. The vehicle 310 can be moved in a forward or reverse direction depending on the rotational direction of the electric motor shaft 332. Thus, this arrangement eliminates the need for a mechanical reverse gear in the transmission 370. In the first stage of the launch sequence shown in FIG. 4A, the system 300 can be in an electric mode such that the internal combustion engine 350 does not need to be running. As shown in FIG. 4A, with the second synchronizer 362B disengaged from the first internal combustion engine gear 354 and the second internal combustion engine gear 356, the internal combustion engine 350 can idle at a fixed speed while the electric motor 330 accelerates the vehicle 310.

As shown in FIG. 4B, when the speed of the first transmission shaft 374 matches the speed of the internal combustion engine 350, the second synchronizer 362B is engaged with the second internal combustion engine gear 356 such that rotation of the engine shaft 352 causes rotation of the second internal combustion engine gear 356. As used herein, "matching" the speed of two rotating components includes accounting for the gearing (and various gear ratios) that may exist between the two components. Due to the fixed relationship between the second transmission input gear 381B and the first transmission shaft 374, when the second synchronizer 362B locks the engine shaft 352 to the second internal combustion engine gear 356, the second transmission input gear 381B and the first transmission shaft 374 rotate under the control of and/or are powered by the internal combustion engine 350, as indicated by the cross-hatched pattern. Thus, as shown in FIG. 4B, when the first synchronizer 362A is engaged with the first electric motor gear 331, the second synchronizer 362B is engaged with the second internal combustion engine gear 356, and the third synchronizer 362C is engaged with the first gear 375A, the drive shaft 312 can be powered by both the electric motor 330 and the internal combustion engine 350 simultaneously.

As shown in FIG. 4C, the first synchronizer 362A can be moved out of engagement with the first electric motor gear 331 such that the rotation of the electric motor shaft 332 does not cause rotation of the first electric motor gear 331. Thus, the electric motor 330 is disengaged from the first transmission shaft 374. In such a configuration, the internal combustion engine 350 can independently accelerate the vehicle 310. The electric motor 330 can idle or be turned off.

In some embodiments, the launch sequence of claims 4A-4C can be utilized such that the electric motor 330 powers the drive shaft 312 (and thus the vehicle 310) independently from a stop to 22 km/hr. Thereafter, the engine 350 can engage with the drive shaft 312 as shown in FIG. 4B. The engine 350 and the motor 330 can simultaneously contribute power to the system 300 and continue the acceleration of the vehicle 310 to, for example, 100 km/hr. For speeds above 100 km/hr, the motor 330 can be disengaged and the engine 350 can independently power the vehicle 310. Although the transition speed between the electric-only mode and the dual power mode (i.e., the engine and the motor both supply power to the drive shaft) is described as 22 km/hr, in other embodiments the transition speed can be any suitable speed. Additionally, although the motor 330 is described as being disengaged at 100 km/hr, in some embodiments the motor can remain engaged with the drive shaft 312 at higher speeds, which could include the maximum vehicle speed.

Figure 30:
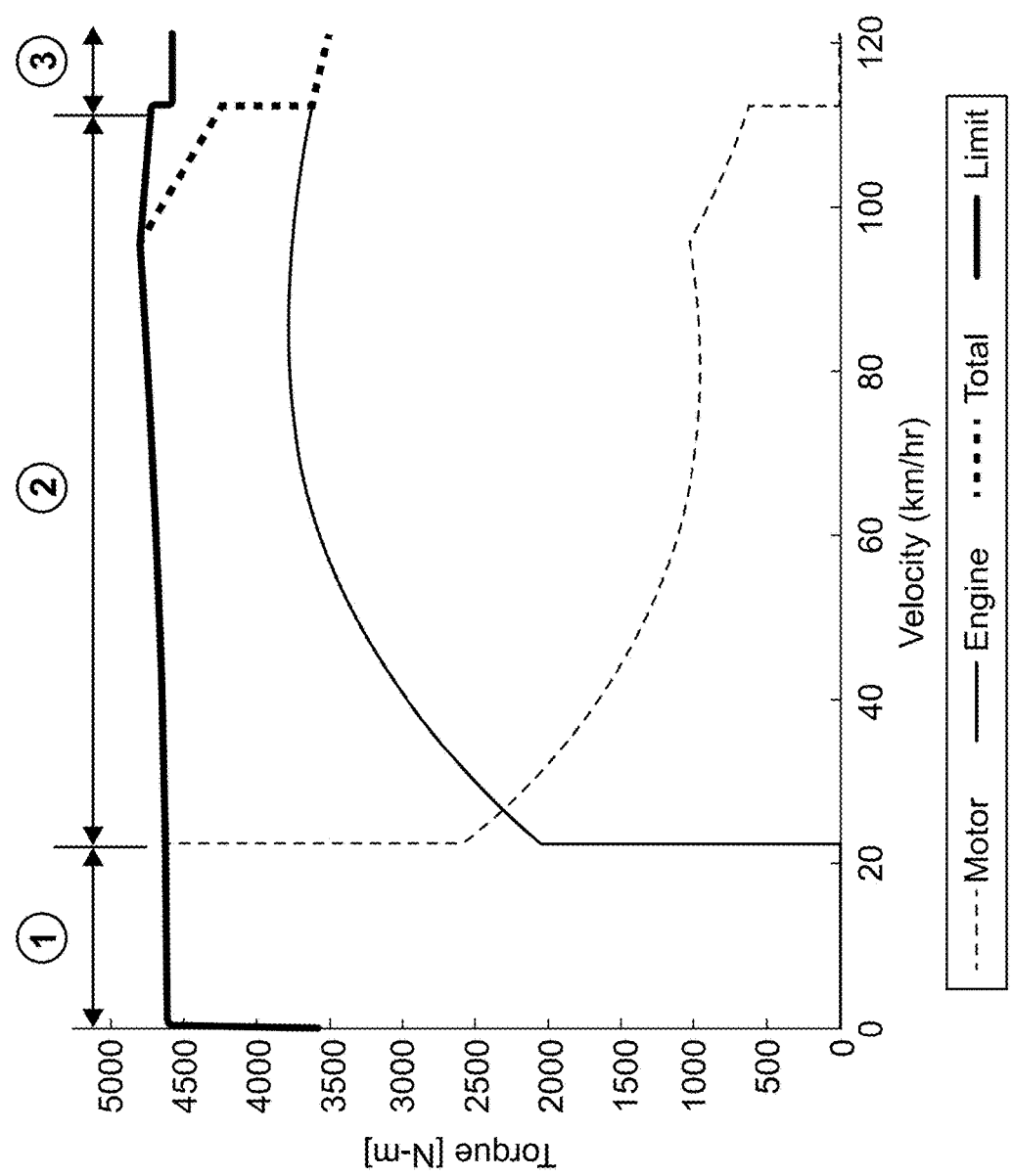
FIG. 30 is a graph simulating torque at the rear wheels during launch of a vehicle, according to an embodiment.

FIG. 30 is a representative wheel torque versus vehicle speed curve simulation. For the analysis shown in FIG. 30, the torque-speed data for the Brusa HSM1 180 kW Hybrid Motor was used with the vehicle parameters provided by the performance car company. As shown in FIG. 30, an electric motor, such as the electric motor 330, can produce the highest torque at low speeds. The friction limit gradually increases with speed because the normal force acting on the rear tires increases due to aerodynamic downforce. In some embodiments, the electric motor 330 can be geared to maximize the torque that can be delivered to the tires 318, 319 without causing the tires 318, 319 to slip. In the lower speed range, such as below 22 km/hr, an internal combustion engine, such as the engine 350, provides low levels of torque and thus can be disengaged from the system 300. However, in some embodiments, when in the lower speed range, the engine, such as the engine 350, can be revved to preserve the performance car (or supercar) driving experience.

When both the electric motor 330 and the engine 350 are engaged with the first transmission shaft 374, the electronic control unit 320 can regulate the torque of the electric motor 330 to continue providing maximum acceleration while avoiding tire slip.

The gear ratios for the electric motor 330 and the internal combustion engine 350 can be optimized to eliminate the need for shifting between 0 and 100 km/hr. For example, in some embodiments, the gear ratios for the electric motor 330 and the internal combustion engine 350 were estimated to be 2.80 and 1.75, respectively, with a final drive gear ratio of 5. In some embodiments, acceleration from 0 to 100 km/hr can occur over a duration of, for example, about 3.18 seconds for a vehicle weighing about 1600 kg.

Figure 5A:
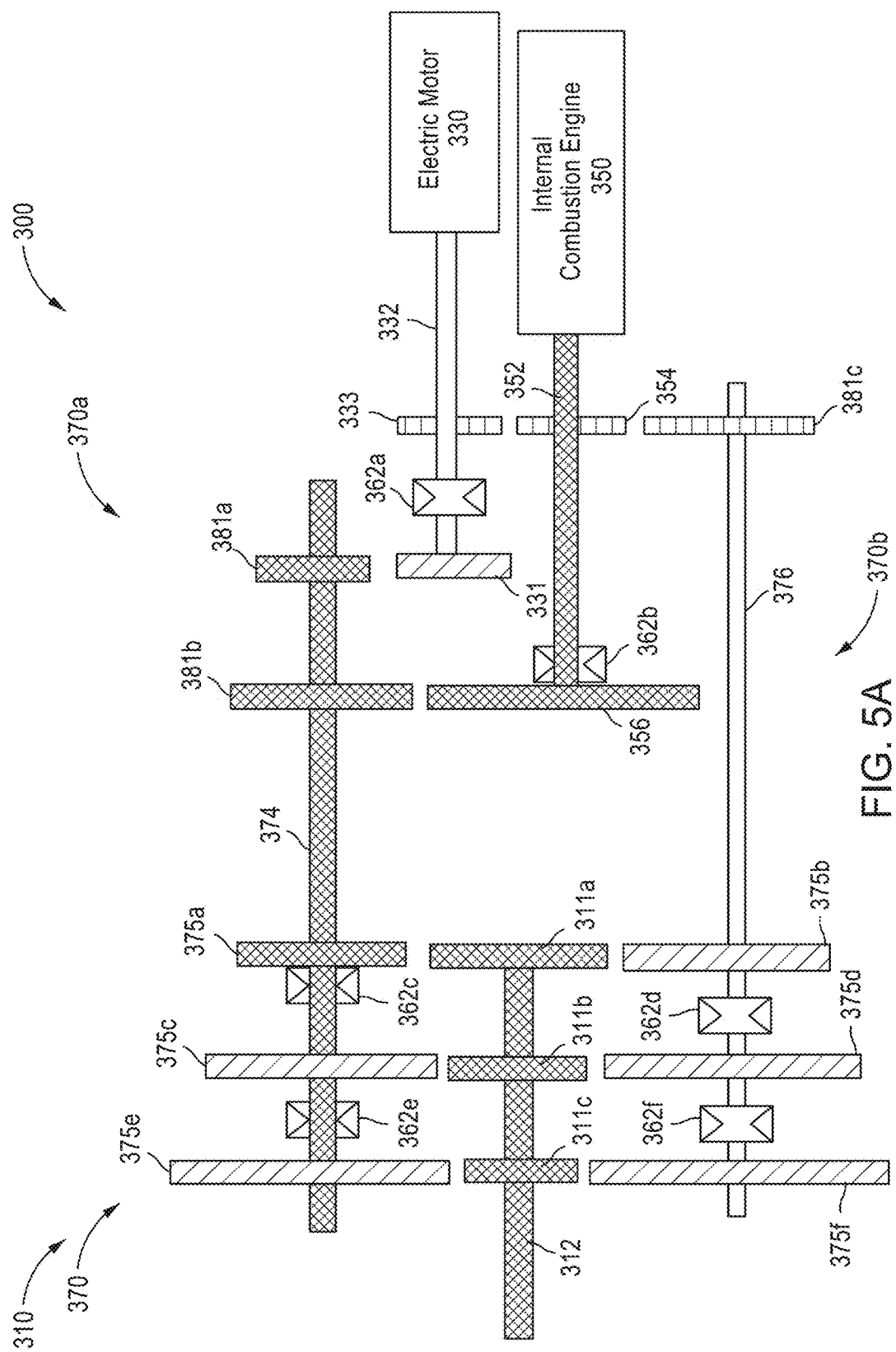

FIGS. 5A-5D show the stages of a low-speed upshifting sequence for the system 300. As shown in FIG. 5A, with the second synchronizer engaged with the second internal combustion engine gear 356 and the third synchronizer 362C is engaged with the first gear 375A, the internal combustion engine 350 can power the drive shaft 312.

As shown in FIG. 5B, once the electronic control unit 320 (not shown) receives a signal to upshift, the first synchronizer 362A can engage the second electric motor gear 333 such that the second electric motor gear 333 is fixedly coupled to the electric motor shaft 332. As a result, the electric motor 330 can rotate the second transmission shaft 376 via rotation of the electric motor shaft 332, the second electric motor gear 333, the first internal combustion engine gear 354, and the third transmission input gear 381C. The electric motor 330 can increase the speed of the second transmission shaft 376 until it matches the speed of the second gear 375B, which is spinning at the same speed as the drive shaft 312 due to the engagement between the second gear 375B and the first drive shaft gear 311A.

Once the second transmission shaft 376 is rotating at the same speed as the second gear 375B (and the first drive shaft gear 311A and the output shaft 312), the fourth synchronizer 362D can be shifted into engagement with the second gear 375B such that the second gear 375B is rotationally fixed relative to the second transmission shaft 376. The electronic control unit 320 can adjust the throttle of the internal combustion engine 350 to reduce the torque output of the internal combustion engine 350. Simultaneously, the torque output of the electric motor 330 can be adjusted accordingly to maintain a constant total torque output. When the torque output of the internal combustion engine 350 is nearly zero, the electronic control unit 320 can unlock the third synchronizer 362C (i.e., shift the third synchronizer 362C out of engagement with the first gear 375A) such that the internal combustion engine 350 is disengaged from the first transmission shaft 374. The electric motor 330 can drive the vehicle 310 to torque-fill between gears to minimize jerk. Once disengaged, the speed of the internal combustion engine 350 decreases due to friction and pumping losses.

Figure 5C:
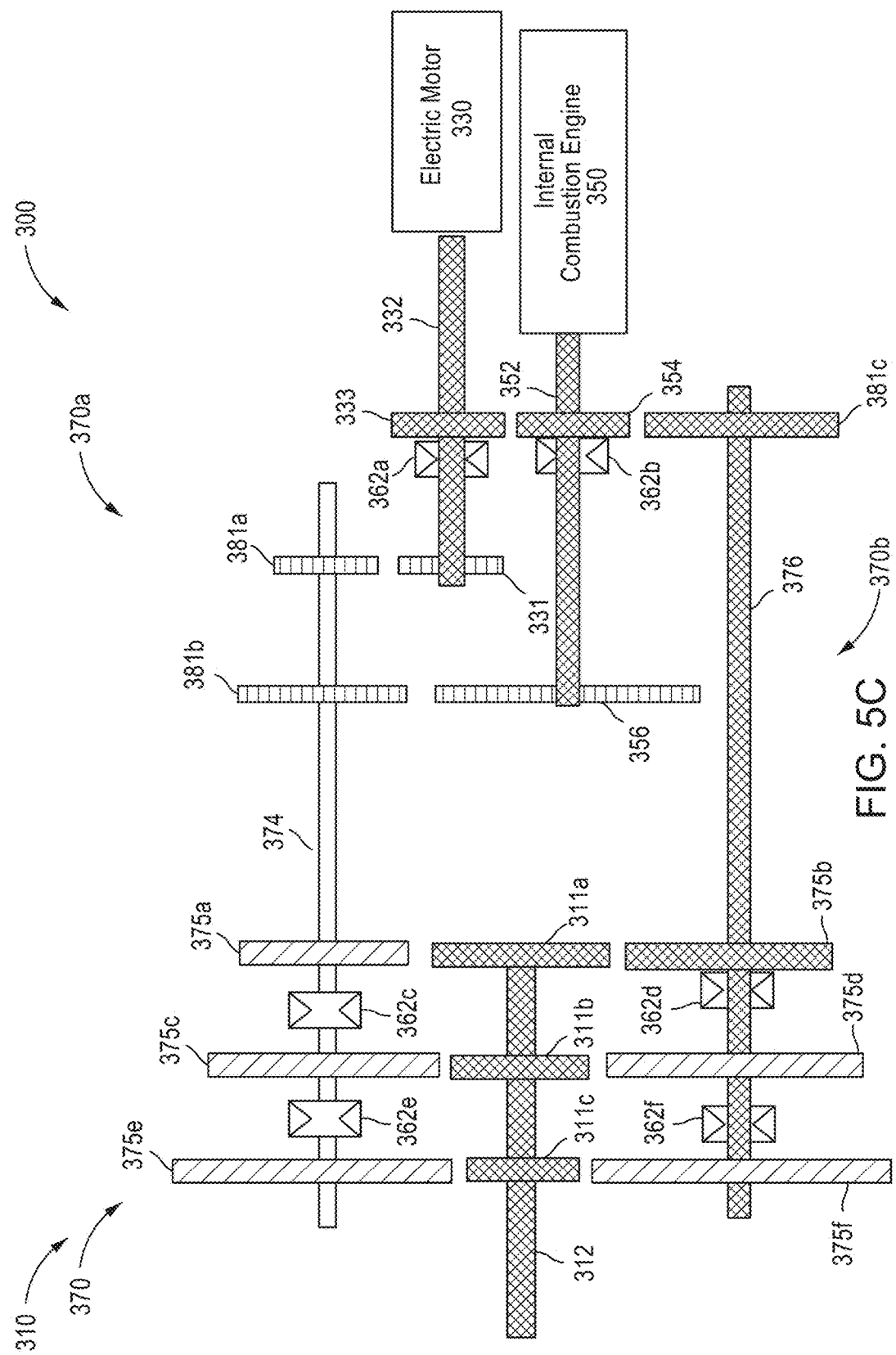

As shown in FIG. 5C, once the internal combustion engine 350 is speed-matched to the second transmission shaft 376 and while the electric motor 330 powers the second transmission shaft 376 via the third transmission input gear 381C, the electronic control unit 320 can shift the second synchronizer 362B to the right to engage the internal combustion engine shaft 352 with the first internal combustion engine gear 354 such that rotation of the internal combustion engine shaft 352 rotates the first internal combustion engine gear 354. Thus, the internal combustion engine 350 can power the second transmission shaft 376 via rotation of the internal combustion engine shaft 352, the first internal combustion engine gear 354, and the third transmission input gear 381C. Thus, both the electric motor 330 and the internal combustion engine 350 can contribute power to the second transmission shaft 376.

Figure 5D:
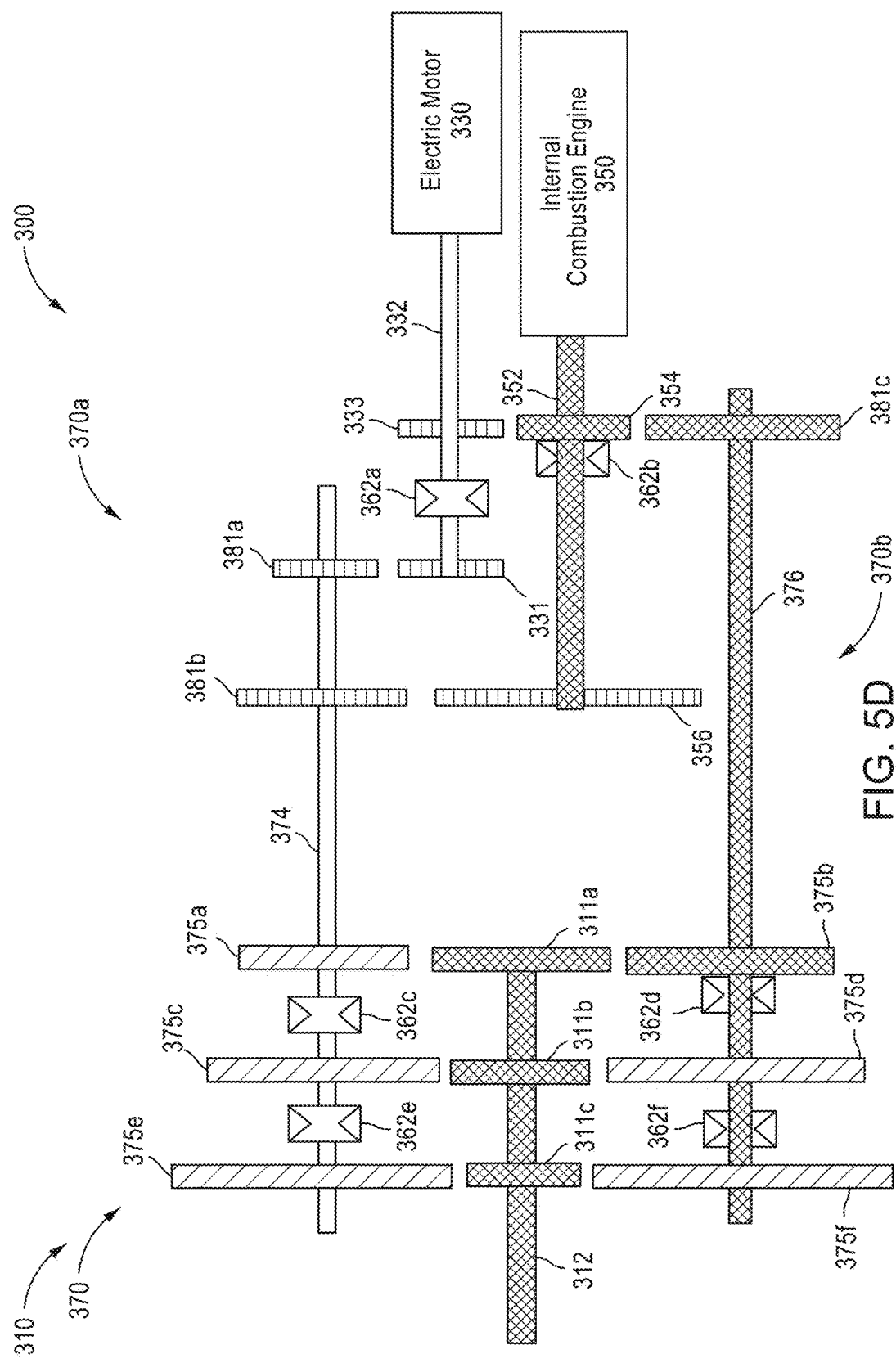

As shown in FIG. 5D, the electronic control unit 320 can unload the electric motor 330 and disengage it from the second transmission shaft 376 via disengaging the synchronizer 362A from the second electric motor gear 333. Thus, the internal combustion engine 350 can power the vehicle 310 through the second gear 375B.

In some embodiments, during regular driving situations, the upshifting sequence described with reference to FIGS. 5A-5D can be performed around 2000-3000 RPM, which is considered "low-speed." Although the low-speed upshifting sequence of FIGS. 5A-5D are described with reference to shifting from first gear to second gear, the same or a similar sequence can be applied to any suitable shifting sequence from a lower gear to a higher gear, such as from second gear to third gear.

In some embodiments, the total time for the upshifting sequence of FIGS. 5A-5D is about 1.1 seconds. In some embodiments, the largest contributor to the time duration is the time needed to decelerate the engine 350, which may be, for example, about 0.9 seconds. In some embodiments, rather than relying on losses alone to slow down the internal combustion engine 350, the system 300 can include a braking device (not shown) implemented to produce higher deceleration. In such embodiments, the shift time can be reduced to, for example, about 0.2 seconds.

In some embodiments, shifting time can be calculated based on, for example, a HSMI-10.18.13 Brusa 400V motor. However, the selection of a different motor will affect the shifting time based on, for example, different motor inertia. Additionally, in some embodiments, the data representing, for example, tire diameter and used to calculate a maximum torque speed curve of the internal combustion engine can be provided by, for example, vehicle manufacturers. In some embodiments, the first gear ratio can be assumed to be 1.75, the second gear ratio can be assumed to be 1.36, the third gear ratio can be assumed to be 1.16, the fourth gear ratio can be assumed to be 0.95, the fifth gear ratio can be assumed to be 0.82, and the sixth gear ratio can be assumed to be 0.69. The time to speed up or slow down on shaft with the gearing through electric motor 320 can be computed using Equation 5.

$$t = \frac{I_{eff} * \omega}{\tau_{out}} \quad \text{Equation 5}$$

In Equation 5, ω can be the goal speed of the gearing, $I_{eff}$ can be the inertial load on the electric motor, and $\tau_{out}$ can be the average torque delivered by the electric motor 330 during this process. A similar method can be used to compute the time the internal combustion engine 350 takes to speed up or down. In some embodiments, an assumption can be made that the time to change the throttle and the torque of the engine 350 is about the same as the time for the engine 350 to perform one revolution, or t=1/ω, where ω is the engine speed. In some embodiments, the time to shift and engage a synchronizer 375 when the speed of the two rotating components are matched can be set to 0.0081 seconds.

Following these assumptions, the time to realize each sequence from the shifting procedures can be computed and then added up to calculate the total shifting time. For example, to estimate a upshifting time from fourth gear to fifth gear, similar assumptions can be used. In some embodiments, four synchronizers are shifted during the sequence taking $t_{sync}$=4*0.0081=0.032 sec. The electric motor 330 can then speed up to, for example, 4006 RPM to match the speed of the internal combustion engine 350. The electric motor 330 can provide 305 Nm of torque and can have an inertia of 0.065 kg·m², thus taking $$t_{EM} = \frac{0.065 * \left(4006 * \left(\frac{2\pi}{60}\right)\right)}{305} = 0.142 \text{ sec.}$$

The electric motor 330 can then speed up the internal combustion engine 350 to match the speed of the vehicle 310 in fourth gear. The electric motor speed increases from 4006 RPM to 4766 RPM. The electric motor can provide a 305 Nm torque and can bear its own inertial load along with the inertial load of the shaft and the internal combustion engine which can add up to 0.224 kg·m², thus taking $$t_{ICE} = \frac{0.224 * \left(760 * \left(\frac{2\pi}{60}\right)\right)}{305} = 0.038 \text{ sec.}$$

By adding all these times, the estimate of the upshifting time procedure from gear four to gear 5 can be, for example, 0.204 seconds. A similar approach can be used to estimate the other shifting times described herein.

Figure 6C:
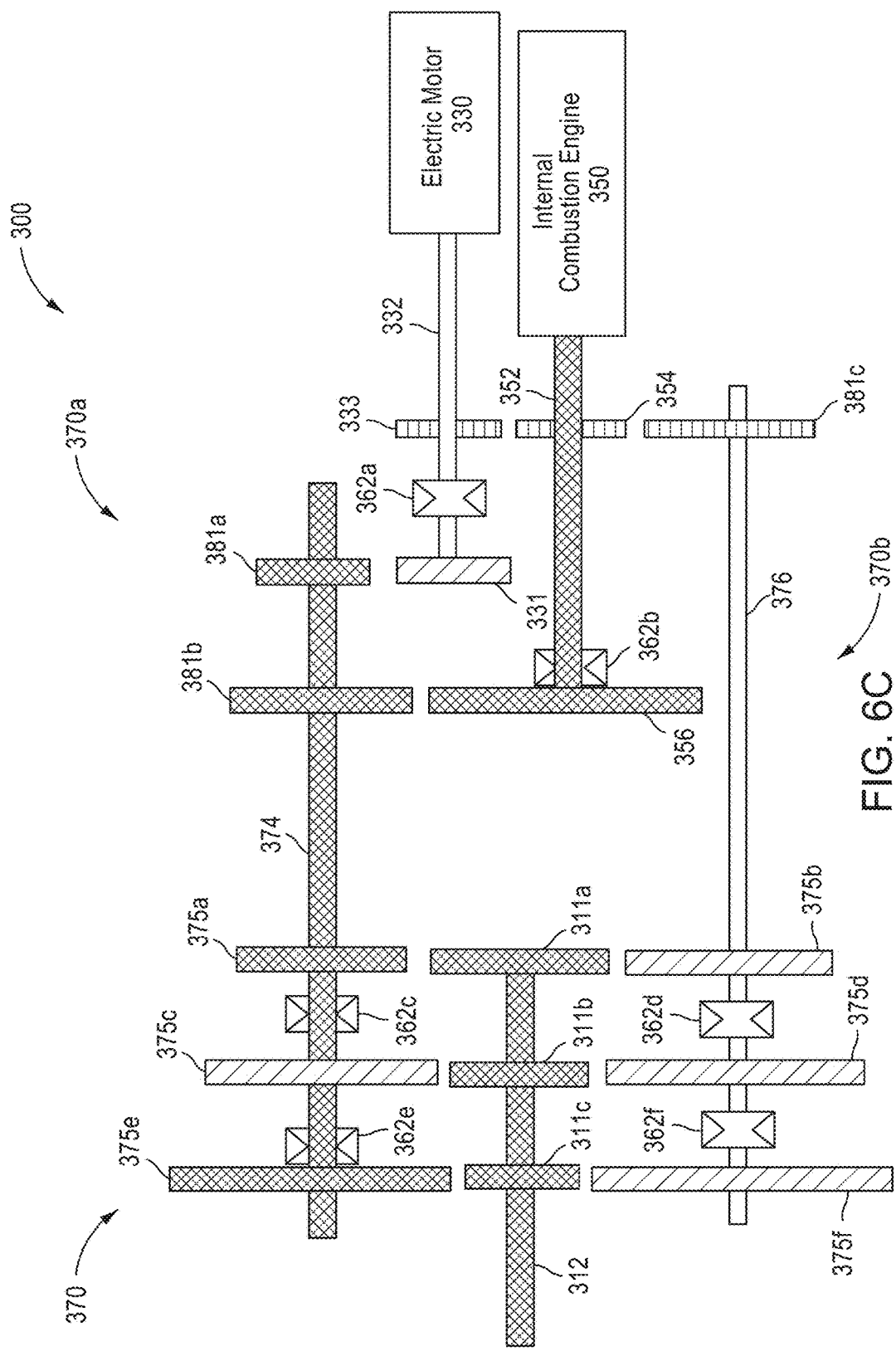

FIGS. 6A-6C show the stages of a high-speed upshifting sequence for the system 300. Due to the poor torque performance of the electric motor 330 at high RPMs, in some embodiments torque-filling is not achieved at high vehicle velocities. However, at these speeds, the speed lost during shifting is a small fraction of the original speed and thus, the jerk is not significant. Thus, at high speeds, the electric motor 330 can be used to directly speed-match the internal combustion engine 350 when shifting at high speeds as shown and described with reference to FIGS. 6A-6C.

As shown in FIG. 6A, when the fourth synchronizer is engaged with the fourth gear 375D and the second synchronizer 375B is engaged with the first internal combustion engine gear 354, the internal combustion engine 350 can provide power to the drive shaft 312 via a power path including the internal combustion engine shaft 352, the first internal combustion engine gear 354, the third transmission input gear 381C, the second transmission shaft 376, the fourth gear 375D, and the second drive shaft gear 311B.

To increase the speed of the vehicle 310, the electronic control unit 320 (not shown) can move the first synchronizer 362A into engagement with the first electric motor gear 331 such that the rotation of the electric motor shaft 332 causes rotation of the first electric motor gear 331. As a result, the electric motor 330 can speed up the first transmission shaft 374. The electronic control unit 320 can simultaneously adjust the throttle of the internal combustion engine 350. When the output torque of the internal combustion engine 350 is zeroed, the electronic control unit 320 can unlock the fourth synchronizer 362D from the fourth gear 375D such that the fourth gear 375D is disengaged from the second transmission shaft 376. Additionally, the electronic control unit 320 can unlock the second synchronizer 362B from the first internal combustion engine gear 354 such that the first internal combustion engine gear 354 is disengaged from the engine shaft 352.

As shown in FIG. 6B, when the speed of the electric motor 330 matches the speed of the internal combustion engine 350 (and thus the first transmission shaft 374, the second transmission gear 381B, and the second internal combustion engine gear 356 are spinning at the same speed as the engine shaft 352), the electronic control unit 320 can lock the second synchronizer 362B with the second internal combustion engine gear 356 such that the second internal combustion engine gear 356 is rotationally fixed with the engine shaft 352.

Next, the torque of the electric motor 330 can be used to reduce the rotational speed of the internal combustion engine 350. Once the speed of the internal combustion engine 350 matches the speed of the fifth gear 375E, the electronic control unit 320 can shift the fifth synchronizer 362E to the left into engagement with the fifth gear 375E such that the fifth gear 375E is rotationally fixed relative to the first transmission shaft 374. As shown in FIG. 6C, the electronic control unit 320 can then unload the electric motor 330 by shifting the first synchronizer 362A out of engagement with the first electric motor gear 331 to a neutral position such that the first electric motor gear is free spinning relative to the electric motor shaft 332. Thus, as shown in FIG. 6C, the internal combustion engine 350 can independently power the drive shaft 312 through the fifth gear 375E. Since the torque output from the electric motor 330 is directly used to decelerate the internal combustion engine 350, the time to perform this upshift sequence is reduced. For example, in some embodiments, the upshift sequence shown and described in relation to FIGS. 6A-6C can be completed in about 0.3 seconds. Additionally, although this sequence was shown and described in relation to upshifting the power path from the fourth gear 375D to the fifth gear 375E, the same or similar sequence of steps can be used to upshift the system 300 from any lower numbered gear 375 to any higher numbered gear 375.

In some embodiments, the upshift sequence shown and described with reference to FIGS. 6A-6C can be performed in about 0.3 seconds due to the torque output from the electric motor 330 being used to directly decelerate the internal combustion engine 350.

Figure 7A:
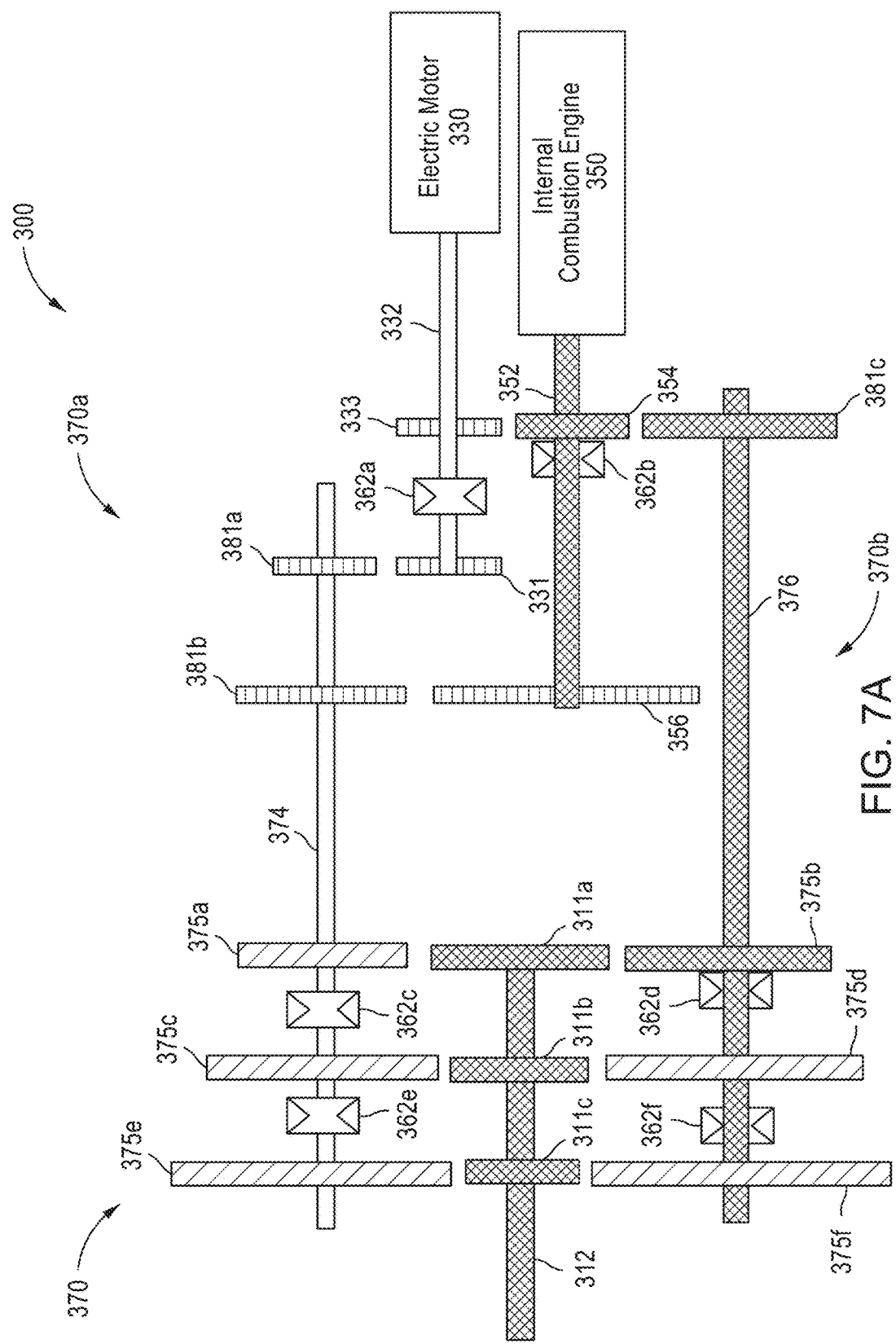

FIGS. 7A-7D show the stages of a downshifting sequence at low speeds for the system 300. In some embodiments, the downshifting sequence can be used for decelerating or braking. As shown in FIG. 7A, when the second synchronizer 362B is engaged with the first internal combustion engine gear 354 and the third synchronizer 362D is engaged with the second gear 375B, the internal combustion engine 350 can power the drive shaft 312 (and drive the vehicle 310) via a power path including the engine shaft 352, the first internal combustion engine gear 354, the third transmission input gear 381C, the second transmission shaft 376, the second gear 375B, the first drive shaft gear 311A, and the drive shaft 312. The electric motor 330 can remain in an idle state while the internal combustion engine 350 independently powers the system 300 in this configuration.

When the user signals the system 300 to downshift, the electronic control unit 320 can shift the first synchronizer 362A into engagement with the first electric motor gear 331 such that the first electric motor gear 331 and the electric motor shaft 332 are rotationally fixed. Thus, the electric motor 330 can control the rotational speed of the first transmission shaft 374 via rotation of the electric motor shaft 332, which rotates the first electric motor gear 331 and the first transmission input gear 381A. Thus, the electric motor 330 can increase the speed of the first transmission shaft 374 to match the speed of the first gear 375A, which is spinning at the same speed as the first drive shaft gear 311A (and thus the drive shaft 312 and the second gear 375B) due to the engagement between the first gear 375A and the first drive shaft gear 311A.

Figure 7B:
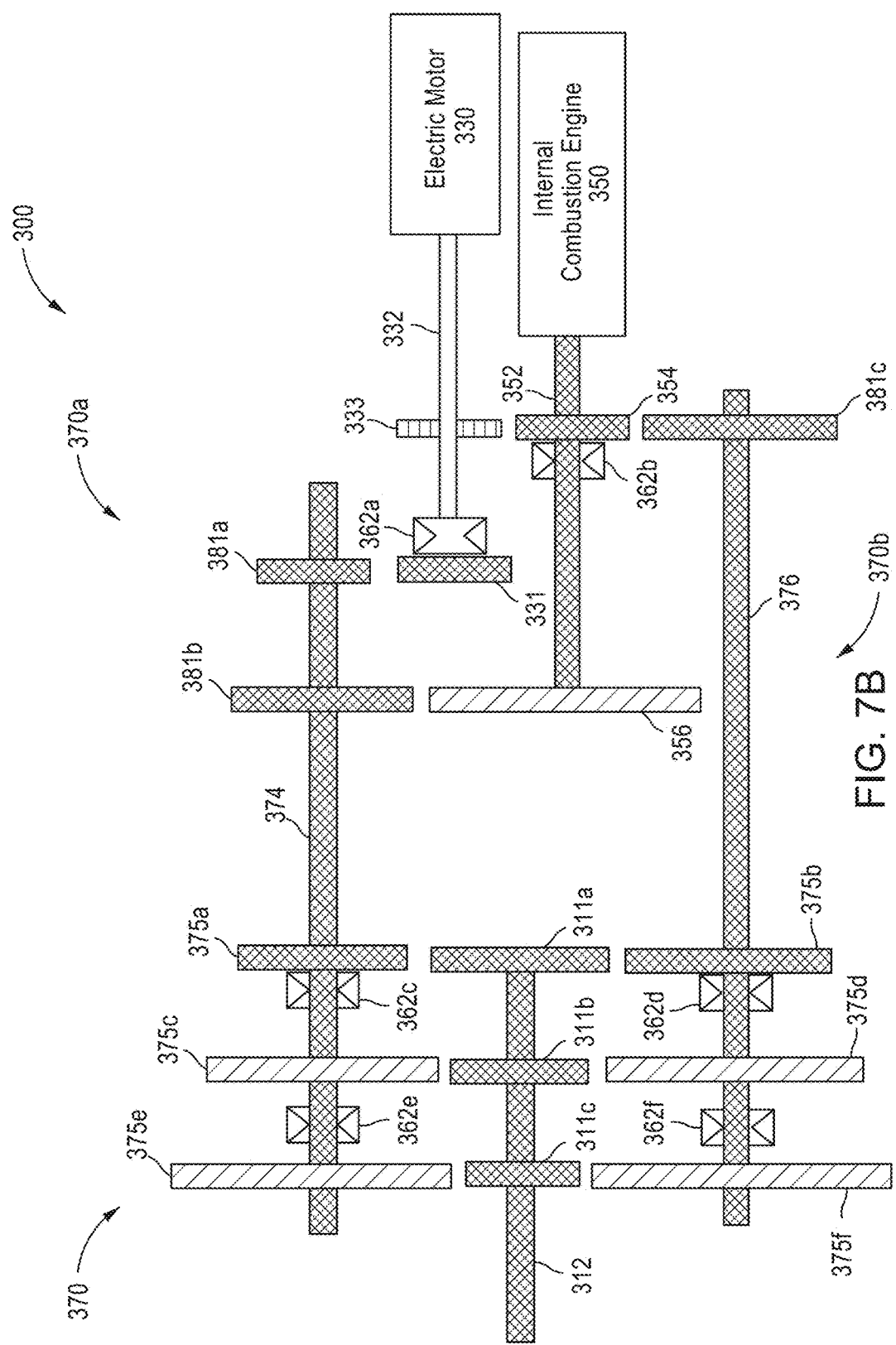

As shown in FIG. 7B, when the speed of the first gear 375A and the speed of the first transmission shaft 374 match, the electronic control unit 320 can shift the third synchronizer 362C into engagement with the first gear 375A such that the first gear 375A is rotationally fixed relative to the first transmission shaft 374. In the configuration of FIG. 7B, the electric motor 330 and the internal combustion engine 350 are simultaneously providing power to the drive shaft 312 via the first transmission shaft 374 and the second transmission shaft 376, respectively. Said another way, the drive shaft 312 is receiving power from two separate transmission shaft simultaneously.

Next, the electronic control unit 320 can unload the internal combustion engine 350 and shift the load to the electric motor 330. As shown in FIG. 7C, when the torque load on the internal combustion engine 350 is close to zero, the electronic control unit 320 can disengage the second synchronizer 362B from the first internal combustion engine gear 354 and the fourth synchronizer 362D from the second gear 375B so that the internal combustion engine 350 runs freely (i.e., both the first internal combustion engine gear 354 and the second internal combustion engine gear 356 are free running on the engine shaft 352). Meanwhile, the electric motor 330 can drive the vehicle 310 through the first gear 375A.

The electronic control unit 320 can increase the speed of the internal combustion engine 350 to match the speed of the first gear 375A while the vehicle 310 decelerates. When the speeds of the electric motor 330 and the internal combustion engine 350 are matched (and thus the speeds of the first transmission shaft 374, the second transmission input gear 381B, and the second internal combustion engine gear 356 are matched to the speed of the engine shaft 352), the electronic control unit 320 can shift the second synchronizer 362B into engagement with the second internal combustion engine gear 356 such that the second internal combustion engine gear 356 is rotationally fixed relative to the engine shaft 352. In such a configuration, the electric motor 330 and the internal combustion engine 350 both power the drive shaft 312 via the first gear 375A.

The electronic control unit can then load the internal combustion engine 350 while unloading the electric motor 330. As shown in FIG. 7D, the electric motor 330 can be disengaged from providing power to the first transmission shaft 374 by shifting the first synchronizer 362A out of engagement with the first electric motor gear 331 such that the first electric motor gear 331 is in a free running configuration relative to the electric motor shaft 332. As shown in FIG. 7D, the internal combustion engine 350 can then independently power the drive shaft via the first gear 375A. In some embodiments, the steps of the downshifting sequence shown and described with relation to FIGS. 7A-7D can be performed in about 0.2 seconds. In some embodiments, the smallest duration of time within which the downshifting sequence can occur is limited by the rate at which the electric motor 330 can increase the speed of the first transmission shaft 374 to match the speed of the first gear 375A. Additionally, although this sequence was shown and described in relation to downshifting the power path from the second gear 375B to the first gear 375A, the same or similar sequence of steps can be used to downshift the system 300 from any higher numbered gear 375 to any lower numbered gear 375, such as from the fourth gear 375D to the third gear 375C and/or from the third gear 375C to the second gear 375B.

In some embodiments, the downshifting sequence of FIGS. 7A-7D can be used to accelerate and provide more torque to the wheels 318, 319 of the vehicle 310 by changing the gearing configuration. In some embodiments, rather than downshifting, the electronic control unit 320 can identify the desire of a user to downshift to accelerate the vehicle 310 and provide more torque to the wheels 318, 319 by monitoring the position of a gas pedal of the vehicle 310 and the speed of the internal combustion engine 350. Rather than downshifting, the electric motor 330 can be engaged (via the first synchronizer 362A) and used to supply additional torque to the drive shaft 312 via either the first transmission shaft 374 or the second transmission shaft 376 while the system 300 remains in second gear (i.e., the fourth synchronizer 362D continues to engage the second gear 375B with the second transmission shaft 376). In some embodiments, the system 300 can engage the electric motor 330 in about 0.1 seconds such that this approach can be faster than downshifting to accelerate the vehicle.

Figure 8A:
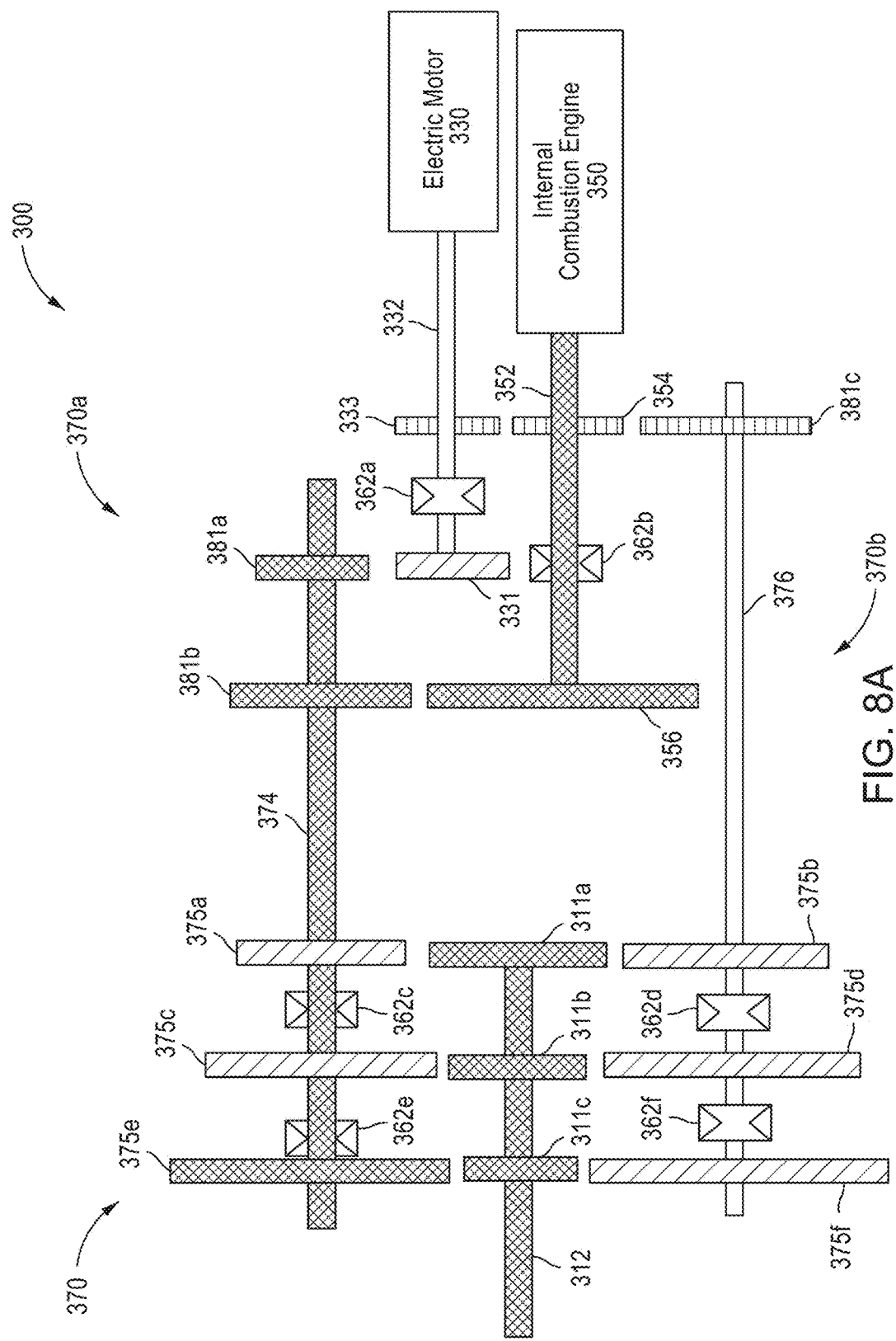
FIGS. 8A-8C are schematic illustrations of the powertrain system of FIG. 3 in various stages of a downshift sequence at high speeds, according to an embodiment.
Figure 8B:
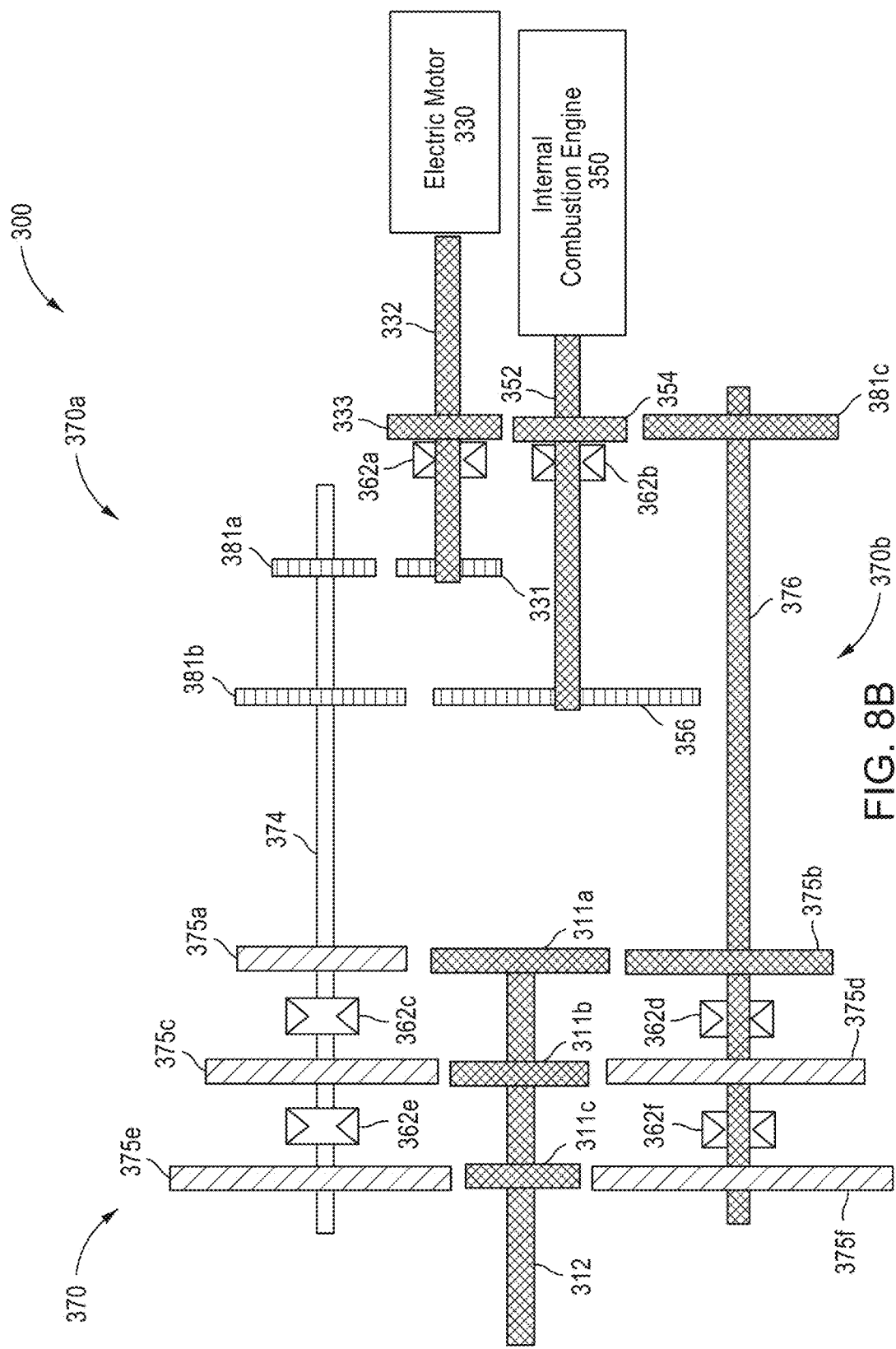
Figure 8C:
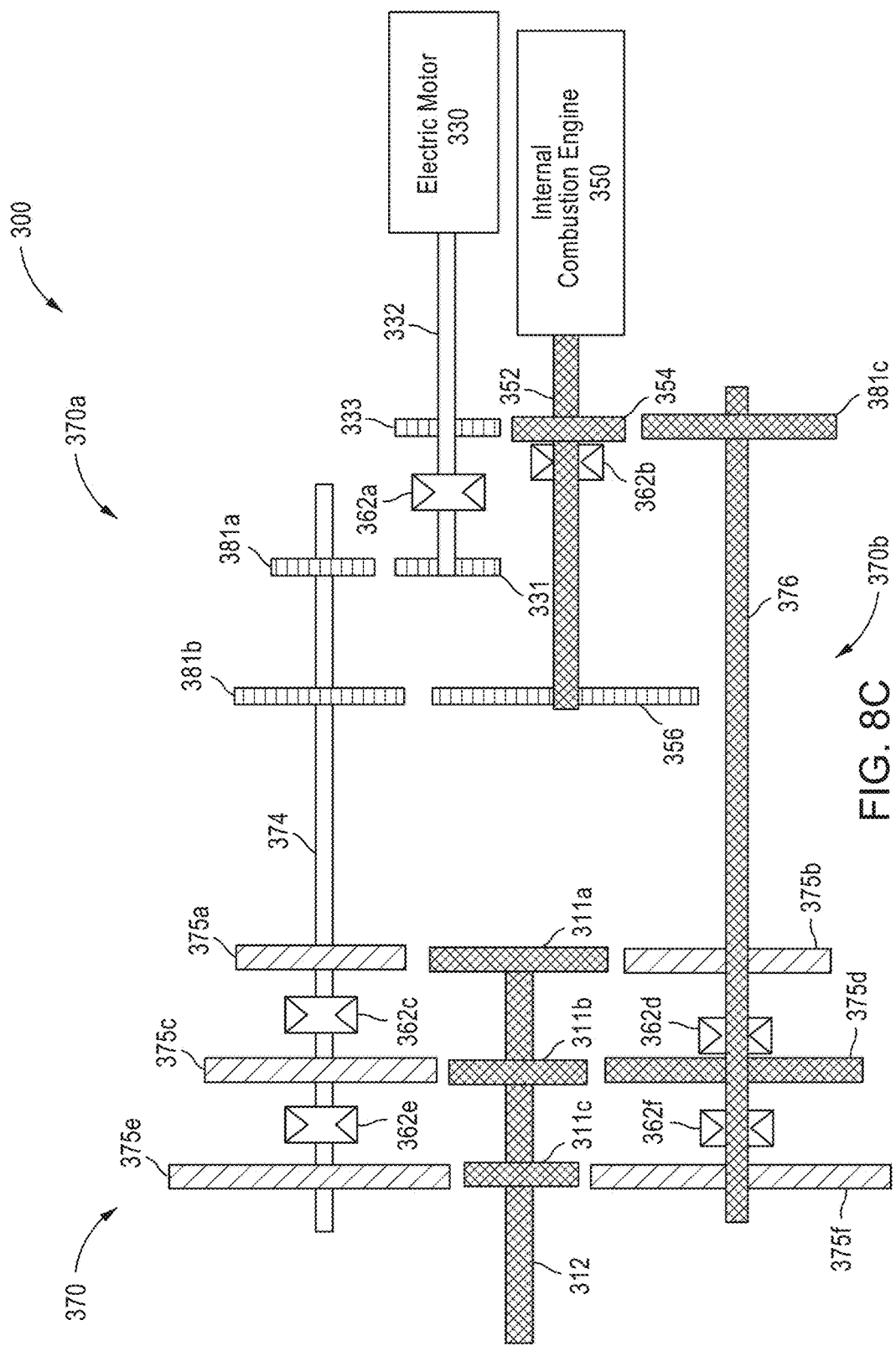

FIGS. 8A-8C show the stages of a high-speed downshifting sequence at low speeds for the system 300. In the high-speed downshifting sequence from fifth gear to fourth gear, the electric motor 330 can be used to speed up the internal combustion engine 350 to match the speed of the fourth gear 375D to facilitate engagement.

FIG. 8A shows the system 300 in a configuration in which the drive shaft 312 is powered via the internal combustion engine 350 and the transmission 370 is in fifth gear (i.e. the internal combustion engine 350 powers the drive shaft 312 via the fifth gear 375E). As shown, with the second synchronizer 362B engaged with the second internal combustion engine gear 356 and the fifth synchronizer 362E engaged with the fifth gear 375E, the internal combustion engine 350 can drive the vehicle 310 via the first transmission shaft 374.

When the user decides to downshift, the electronic control unit 320 can unload the internal combustion engine 350 and can shift the second synchronizer 362B out of engagement with the second internal combustion engine gear 356 and the fifth synchronizer 362E out of engagement with the fifth gear 375E. At the same time, the electronic control unit 320 can lock the electric motor 330 to the second transmission shaft 376 (i.e., the electronic control unit 320 can shift the first synchronizer 362A into engagement with the second electric motor gear 333). The electronic control unit 320 can then use the electric motor 330 to speed match the second transmission shaft 376 to the internal combustion engine 350 and engine shaft 352.

As shown in FIG. 8B, when the rotational speed of the first internal combustion engine gear 354 is matched to the rotational speed of the engine shaft 352, the electronic control unit 320 can shift the second synchronizer 362B to engage with and lock the first internal combustion engine gear 354 to the engine shaft 352, thus locking the electric motor 330 to the internal combustion engine 350. In the configuration of FIG. 8B, both the electric motor 330 and the internal combustion engine 350 can provide power to the second transmission shaft 376.

As shown in FIG. 8C, the electric motor 330 can then be used to accelerate the internal combustion engine 350 to match the speed of the fourth gear 375D. The electronic control unit 320 can then disengage the electric motor 330 by shifting the first synchronizer 362A to a neutral position (i.e. the first synchronizer is shifted out of engagement with the second electric motor gear 333). As a result, the internal combustion engine 350 independently provides power to the drive shaft 312 via the fourth gear 375D. In other words, the internal combustion engine 350 rotates the drive shaft 312 via a power path including the engine shaft 352, the first internal combustion engine gear 354, the third transmission input gear 381C, the second transmission shaft 376, the fourth gear 375D, the second drive shaft gear 311B, and the drive shaft 312.

In some embodiments, the steps of the downshifting sequence shown and described with relation to FIGS. 8A-8C can be performed in about 0.2 seconds. In some embodiments, the smallest duration of time within which the downshifting sequence can occur is limited by the time required to accelerate the electric motor 330 to match the speed of the internal combustion engine 350. Additionally, although this sequence was shown and described in relation to downshifting the power path from the fifth gear 375E to the fourth gear 375D, the same or similar sequence of steps can be used to downshift the system 300 from any higher numbered gear 375 to any lower numbered gear 375, such as from the sixth gear 375F to the fifth gear 375E.

In some embodiments, the batteries of the electric motor 330 have a high energy density, a high power discharge rate, and low weight. Additionally, the batteries can charge quickly and can have safety features. Lithium-ion batteries have a relatively high energy density. Thus, in some embodiments, lithium-ion batteries, such as a Panasonic Li-Ion battery NCR18650A, can be included in the system 300. In some embodiments, the battery set for the electric motor 330 can include three hundred thirty-one battery cells configured to achieve particular target voltage and current ratings. For example, target specifications (e.g., voltage and current ratings), calculated based on a case where all stored energy is used for driving, can include a nominal capacity of 3.07 kW-h, a total nominal voltage of 360 V, a mass of the battery set of 15.6 kg, a total max discharge current of 1433 Amps, a total max power of 420 kW, and an approximate total mass with cooling system and packing of 76 kg.

In some embodiments, the system can fulfill the demands of daily city driving without depleted the energy in the batteries. The New European Driving Cycle (NEDC) can be simulated to represent the typical usage of a vehicle during urban driving. The NEDC consists of four repeated ECE-15 urban driving cycles (UDC) and one extra-urban driving cycle (EUDC). Key parameters characterizing the NEDC are represented in Table 1.

TABLE 1

| Characteristic | Unit | ECE-15 | EUDC |
|---|---|---|---|
| Distance | km | 0.9941 | 6.9549 |
| Total Time | sec | 195 | 400 |
| Idle (Standing) Time | sec | 57 | 39 |
| Average Speed (Including Stops) | km/hr | 18.35 | 62.59 |
| Average Driving Speed (Excluding Stops) | km/hr | 18.35 | 62.59 |
| Maximum Speed | km/hr | 50 | 120 |
| Average Acceleration | $m/s^2$ | .599 | 0.354 |
| Maximum Acceleration | $m/s^2$ | 1.042 | 0.833 |

Efficient operation can be achieved by using the electric motor 330 as the power source during both acceleration and constant-speed motion for urban driving. For each step in the cycle, the energy required to accelerate and overcome rolling and air resistance was depleted from the initial battery level.

Energy was gained through regenerative braking when the vehicle was decelerated to a stop. Assuming a battery-to-wheel conversion efficiency of 80%, and that the energy must make a full loop back to the battery, a net efficiency of 64% (0.8²) was assumed for regeneration.

Figure 31:
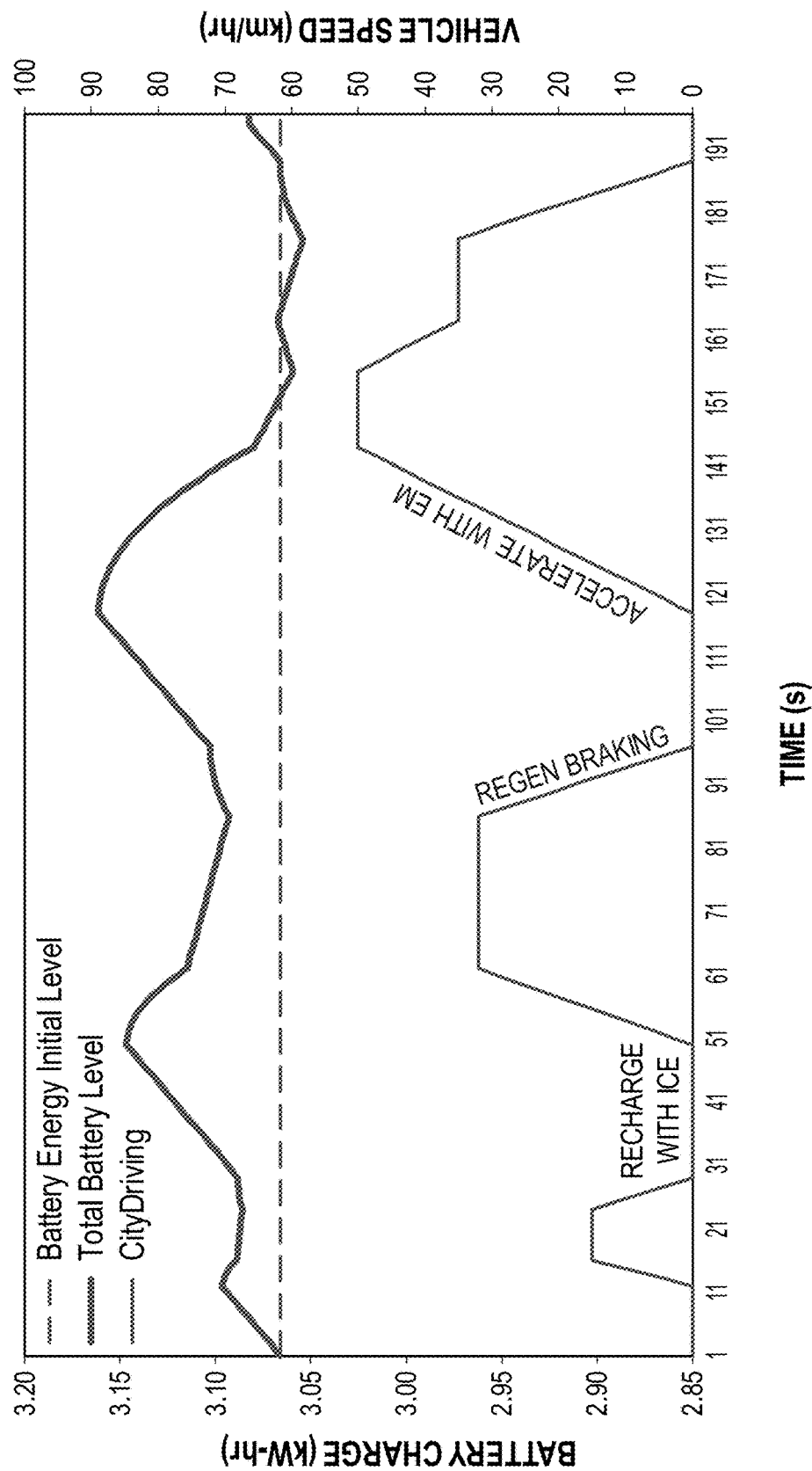
FIG. 31 is a graph of a battery level during an ECE-15 urban driving cycle, according to an embodiment.

When the battery charge is low, power generated by the internal combustion engine 350 can also be used to recharge the battery. As shown in FIG. 31, it is conservatively assumed that the internal combustion engine 350 is operated at a minimum speed of 1500 RPM and produces 8.0 kW when the vehicle is at a stop. Transmission of power from the internal combustion engine 350 to the electric motor 330 was assumed to be 60% efficient.

The simulation of the battery charge level through the NEDC is provided in FIG. 31. A net increase in charge level was achieved through the cycle, demonstrating that the proposed architecture is capable of handling typical city driving functions without fully discharging the battery.

In this simulation, it was assumed that the internal combustion engine 350 is operated at its minimum speed of 1500 RPM. However, recharging can also be performed in the range of the internal combustion engine 350 speeds that provides the highest efficiency or lowest emissions. In some embodiments, the recharging can be performed at the fastest charge rate of the electric motor 330.

In some embodiments, the gearbox of the transmission 370 can be configured to meet particular top speed and initial acceleration requirements. For example, if the final drive gear ratio is 5 and the ratio between the electric motor 330 and the engine 350 is 1.6, the first gear ratio (i.e., the ratio of the first gear 375A to the first drive shaft gear 311A) can be 1.75 and the sixth gear ratio (i.e., the ratio of the sixth gear 375F to the third drive shaft gear 311C) can be 0.69. The ratios for the second gear through the fifth gear can then be selected to maximize useful (no-slip) torque output. The gear ratios can also be constrained such that the center-to-center distance from each gear on one shaft to the corresponding gear on the drive shaft 312 remains constant. For example, the second gear ratio can be 1.36, the third gear ratio can be 1.16, the fourth gear ratio can be 0.95, and the fifth gear ratio can be 0.82.

In some embodiments, the acceleration rate of the system 300 from 0-100 km/hr can be, for example, 3.18 seconds. In some embodiments, the top speed of the system 300 can be, for example, 320 km/hr. In some embodiments, the emissions can be under 275 g $CO_2$/km. In some embodiments, the emissions can be reduced compared to known hybrid architectures due to the engine 350 being operated in its optimum range for recharging in urban driving conditions.

In order to charge the energy storage device while the vehicle 310 is stationary, the system 300 can be configured in a "park and charge" mode in which the engine 350 charges the energy storage device associated with the electric motor 330 while the vehicle 310 is stationary. Similarly stated, in the "park and charge" mode power is transferred from the engine 350 via the first engine gear 354 and the second motor gear 333 to the electric motor 330, which functions as a generator to charge the batteries. A similar configuration can also support an "engine start" mode, during which power is transferred from the electric motor 330 via the second motor gear 333 and the first engine gear 354 to the engine 350 to start or "crank" the engine. To transition into "park and charge" (or "engine start") mode, the electronic control unit 320 shifts the first synchronizer 362A into engagement with the second motor gear 333 and the second synchronizer 362B into engagement with the first engine gear 354. A speed matching module of the electronic control unit 320 can produce a speed control signal to adjust at least one of a speed of the engine shaft 352 or a speed of the motor shaft 332 when the first synchronizer 362A is being shifted to engage the second electric motor gear 333 and the second synchronizer 362B is being shifted to engage the first engine gear 354. Upon matching the speeds of the engine shaft 352 or the motor shaft 332 with the first engine gear 354, the electric motor shaft 332 can be coupled to the second electric motor gear 333 and the internal combustion engine shaft 352 can be coupled to the first motor gear 331. The electronic control unit 320 then starts the engine 350, which causes the internal combustion engine shaft 352 to rotate. Due to this rotation, the first engine gear 354, the second motor gear 333, and the motor shaft 332 all rotate under the power of the engine 350. The electronic control unit 320 can configure the electric motor 330 so that the rotation of the electric motor shaft 332 can charge the energy storage device. The second transmission shaft 376 will also rotate as a result of being operatively coupled to the first engine gear 354. The fourth synchronizer 362D and the sixth synchronizer 362F can be maintained in neutral positions such that the second transmission shaft 376 does not transmit power and/or rotation to the drive shaft while the system 300 is in "park and charge" mode.

To charge the energy storage device while the vehicle 310 is moving, the system 300 can be configured to operate in a "drive and charge" mode in which the engine 350 controls the rotation of the drive shaft 312 as described above with reference to gears two, four, and six. In "drive and charge" mode, with the engine 350 driving the drive shaft 312 via the first engine gear 354, the second transmission shaft 376, and one of the second, fourth, or sixth gears 375 (the second synchronizer 362B engaged with the first engine gear 354 and one of the fourth or the sixth synchronizers 362D, 362F engaged with a second transmission shaft gear 375B, 375D, or 375F), and after the shaft 332 has been speed matched by the electronic control unit 320 with the second motor gear 333, the electronic control unit 320 shifts the first synchronizer 362A to the right along the electric motor shaft 332 to couple the electric motor shaft 332 to the second electric motor gear 333. The electronic control unit 320 signals the electric motor 330 to be charged through rotation of the second electric motor gear 333 and the electric motor shaft 332 by the first engine gear 354. Additionally, in some embodiments, the system 300 can be configured such that the system 300 transitions into the "drive and charge" mode only when the system 300 is not shifting between gears. For example, when the system 300 is shifting between two gears (and the fourth synchronizer 362D and the sixth synchronizer 362F are not engaged with a gear-set), the electric motor 330 can be used for speed-matching of one of the first or the second transmission shafts 374, 376 to a gear-set or for torque filling. When either the fourth synchronizer 362D and the sixth synchronizer 362F is engaged with a gear-set, the electric motor 330 can transition into the "drive and charge" mode such that the electric motor 330 is charged through rotation of the second electric motor gear 333 and the electric motor shaft 332 by the engine gear 354. If the system 300 begins to shift gears such that the fourth synchronizer 362D and the sixth synchronizer 362F are again not engaged with a gear-set, the electric motor 330 can transition out of "drive and charge" mode and be available for speed-matching and torque filling. Additionally, in some embodiments, the systems described herein, such as the system 300, can start in "drive and charge" mode or can start with the motor propelling the vehicle via positive torque from the motor. In some embodiments, the systems described herein can transition into drive and charge or electric only mode before being shut off.

In some embodiments, the electric motor 330 and the engine 350 can be disposed in the rear of the vehicle 310 such that the electric motor 330 and the engine 350 are operatively coupled to the rear axle (e.g., axle 316). Although the system 300 is shown as being rear wheel drive with the axle 316 being a rear axle, in some embodiments the axle 316 can be a front axle. In some embodiments, the system 300 can be all-wheel drive. For example, in some embodiments, both a front axle and a rear axle can be coupled to the drive shaft 312 such that both the front and rear axle are driven by the drive shaft 312. In some embodiments, the system 300 can have two wheels, three wheels, or any suitable number of wheels.

Although shown as separate components, in some embodiments the electronic control unit 320 can be part of the transmission 370. In some embodiments, the electronic control unit 320 can be part of the overall vehicle control module.

Figure 9:
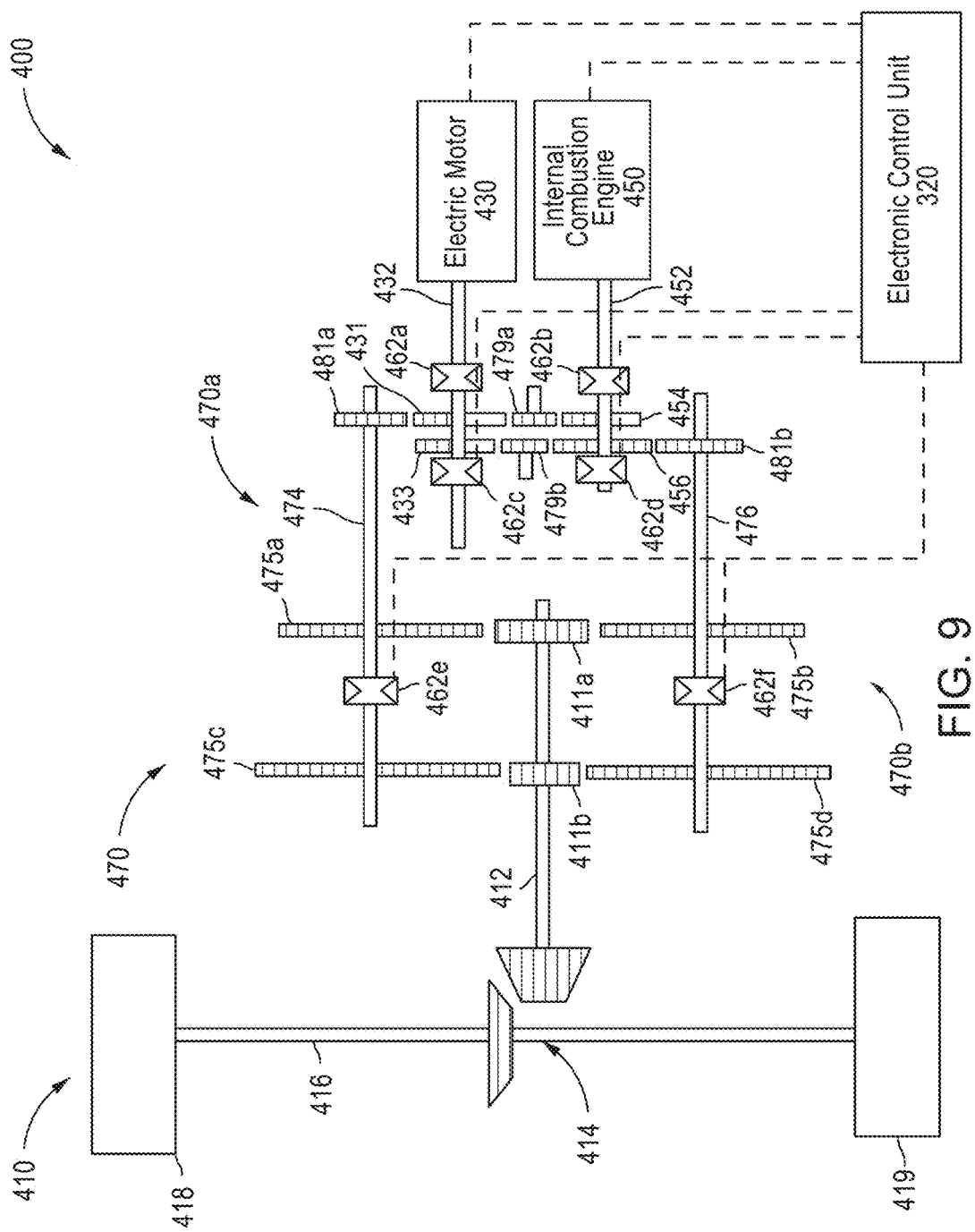
FIG. 9 is a schematic illustration of a powertrain system according to an embodiment.

In some embodiments, two synchronizers can be disposed on each of the electric motor shaft and the internal combustion engine shaft. For example, FIG. 9 is a schematic illustration of a system 400. The system 400 can be the similar in structure and function to the system 100 and the system 300 described above. For example, the system 400 includes two power sources, two transmission shafts, and no clutch, according to an embodiment. The system 400 is included in a vehicle 410. The vehicle 410 includes a drive shaft 412. The drive shaft 412 has an end configured to be coupled via a differential 414 to an axle 416. The drive shaft 412 also includes a first drive shaft gear 411A and a second drive shaft gear 411B fixedly coupled to the drive shaft 412 between the first end and the second end. The first drive shaft gear 411A and the second drive shaft gear 411B can be positioned in any suitable location along the drive shaft 412. The axle 416 includes a first end coupled to a first wheel 418 and a second end coupled to a second wheel 419. The vehicle 410 can also include a chassis and any other suitable components. Although shown as driving two wheels (i.e., as part of a four-wheeled vehicle), in other embodiments, the vehicle 410 and any of the vehicles described herein can have any number of wheels and drive configurations. Moreover, although shown as including a drive shaft 412 that is substantially perpendicular to the axle 416, in other embodiments, the drive shaft 412 can have any relationship and/or connection to the wheels 418, 419 (e.g., a transverse mounted, front-wheel drive system, a rear-wheel drive system, an all-wheel drive system, or the like).

The powertrain system 400 contains an electronic control unit 420, an electric motor 430, an internal combustion engine 450, and a dual-shaft transmission 470. The electric motor 430 is configured to rotate and/or receive rotation power from an electric motor shaft 432. The electric motor 430, and any of the electric motors described herein, can be any suitable electric motor that produces power for and/or absorbs power from the wheels of the vehicle 410 and/or the engine 450. For example, in some embodiments, the electric motor 430 (and any of the electric motors described herein) can be a 120 kW electric motor.

The transmission 470 includes a first transmission subsystem 470A and a second transmission subsystem 470B. The first transmission subsystem 470A includes a first transmission shaft 474 and the second transmission subsystem 470B includes a second transmission shaft 476. The transmission 470 also includes transmission output gears 475 (e.g., a first gear 475A, a second gear 475B, a third gear 475C, and a fourth gear 475D). The odd gears (e.g., the first gear 475A and the third gear 475C) are included in the first transmission subsystem 470A and are coupled to the first transmission shaft 474. The even gears (e.g., the second gear 475B and the fourth gear 475D) are included in the second transmission subsystem 470B and are coupled to the second transmission shaft 476. As described in more detail below, each of the gears 475 can each be moved between a "free running" configuration about its respective first transmission shaft 474 or second transmission shaft 476, and a fixed configuration in which the gear 475 does not rotate relative to its respective first transmission shaft 474 or second transmission shaft 476. The configuration of the gears 475 is controlled by a synchronizer (or shifting) assembly, as discussed below. Although four gears 475 are shown and described, the system 400 and the transmission 470 can be configured to include any number of gears 475 arranged in any functional way to modulate power and/or speed when rotating the drive shaft 412.

The transmission output gears 475 are operably coupled to, engaged with and/or meshed with the drive shaft gears 411. Specifically, the first gear 475A and the second gear 475B are operatively coupled to, engaged with, and/or meshed with the first drive shaft gear 411A. The third gear 475C and fourth gear 475D are operatively coupled to, engaged with, and/or meshed with the second drive shaft gear 411B. Because the drive shaft gears 411 are fixedly coupled to (i.e., cannot rotate relative to) the drive shaft 412 and each of the transmission output gears 475 is coupled to a respective drive shaft gear 411, rotation of the wheels 418, 419 and/or the drive shaft 412 produces rotation of the transmission output gears 475, and vice-versa.

The first transmission subsystem 470A also includes a first transmission input gear 481A fixedly coupled to the first transmission shaft 474. The second transmission subsystem 470B includes a second transmission input gear 481B fixedly coupled to the second transmission shaft 476.

As shown, the electric motor 430 is operatively coupled to the first transmission shaft 474 by the electric motor shaft 432. Specifically, a first electric motor gear 431 and a second electric motor gear 433 are coupled to the electric motor shaft 432. The first electric motor gear 431 is configured to be operatively coupled to, engaged with and/or meshed with the first transmission input gear 481A. The first electric motor gear 431 is also configured to be operatively coupled to, engaged with and/or meshed with an idler gear 479A such that the first electric motor gear 431 is indirectly coupled to a first internal combustion engine gear 454 described below via the idler gear 479A. The second electric motor gear 433 is configured to be operatively coupled to, engaged with and/or meshed with an idler gear 479B such that second electric motor gear 433 is indirectly coupled to the second internal combustion engine gear 456 described below via the idler gear 479B. As described in more detail below, the first electric motor gear 431 and the second electric motor gear 433 can each be moved between a "free running" configuration about the electric motor shaft 432 and a fixed configuration, in which the gear does not rotate relative to the electric motor shaft 432. The configuration of the first electric motor gear 431 is controlled by a first synchronizer (or shifting element) 462A of the synchronizer (or shifting) assembly, as discussed below. The configuration of the second electric motor gear 433 is controlled by a third synchronizer (or shifting element) 462C of the synchronizer (or shifting) assembly, as discussed below.

In this manner, the operational configuration (or "mode") of the system can be changed to allow various routes of power transfer between the electric motor 430, the engine 450 and the wheels 418, 419 (via the rotation of the first transmission shaft 470A and/or the second transmission shaft 470B). For example, when the first electric motor gear 431 is in the fixed configuration relative to the electric motor shaft 432, the electric motor 430 can be configured to rotate the first transmission shaft 474 via the electric motor shaft 432, the first electric motor gear 431, and the first transmission input gear 481A. Conversely, when the first electric motor gear 431 is in the free running configuration about the electric motor shaft 432, no power is transferred between the electric motor 430 and the first transmission shaft 474, even though the first electric motor gear 431 remains operably coupled to and/or meshed with the first transmission input gear 481A. Although the second electric motor gear 433 is shown as being smaller than the first electric motor gear 431, the first electric motor gear 431 and the second electric motor gear 433 can each be any suitable size.

The internal combustion engine 450, and any of the engines described herein, can be any suitable engine that produces power for and/or absorbs power from the wheels 418, 419 and/or the motor 430. The engine 450 is configured to rotate and/or be rotated by an internal combustion engine shaft 452. A first internal combustion engine gear 454, a second internal combustion engine gear 456, a second synchronizer (or shifting element) 462B, and a fourth synchronizer (or shifting element) 462D, are each coupled to the internal combustion engine shaft 452. As shown, the first internal combustion engine gear 454 is operably coupled to, engaged with, and/or meshed with the idler gear 479A and the second internal combustion engine gear 456 is operably coupled to, engaged with, and/or meshed with both the idler gear 479B and the second transmission input gear 481B. As described in more detail below, the first internal combustion engine gear 454 and the second internal combustion engine gear 456 can each be moved between a "free running" configuration about the shaft 452 and a fixed configuration, in which the first internal combustion engine gear 454 and/or the second internal combustion engine gear 456 does not rotate relative to the shaft 452. The configuration of the first internal combustion engine gear 454 is controlled by the second synchronizer 462B of the synchronizer assembly. The configuration of the second internal combustion engine gear 456 is controlled by the fourth synchronizer 462D of the synchronizer assembly.

As a result, depending on the configuration of the synchronizer assembly (i.e., the synchronizers 462A, 462B, 462C, and 462D), the electric motor 430 can be configured to crank (or transmit power to) the internal combustion engine 450 through rotation of the internal combustion engine shaft 452. Additionally, when the first internal combustion engine gear 454 and the first electric motor gear 431 are each in the fixed configuration, the internal combustion engine 450 can be configured to charge an energy storage device (not shown) associated with the electric motor 430 through the rotation of the electric motor shaft 432. Alternatively, when the second internal combustion engine gear 456 and the second electric motor gear 433 are each in the fixed configuration, the internal combustion engine 450 can be configured to charge an energy storage device (not shown) associated with the electric motor 430 through the rotation of the electric motor shaft 432. The energy storage device can include a battery bank. In some embodiments, the energy storage device can be a component of the electric motor 430. In other embodiments, the energy storage device can be a separate component that is electrically coupled to the electric motor 430.

Additionally, as described below, depending on the position of the second synchronizer 462B and the fourth synchronizer 462D, the internal combustion engine shaft 452 can be decoupled from the first transmission subsystem 470A and the second transmission subsystem 470B when the powertrain system 400 is in, for example, an "electric motor only" drive configuration, a "charging" configuration, or the like.

As described in more detail below, however, the engine power can be transmitted from the engine 450 and/or the engine shaft 452 to the first transmission shaft 474 or the second transmission shaft 476 when the synchronizer assembly is actuated to shift between the gears 475 within the transmission 470. For example, when the second synchronizer 462B is engaged with the first internal combustion engine gear 454 and the first synchronizer 462A is not engaged with the first motor gear 431, the rotation speed of the first transmission shaft 474 is dependent on the rotation speed of the engine shaft 452. Thus, the engine 450 can adjust the speed of the first transmission shaft 474 until the speed of the first transmission shaft 474 matches the speed of a target gear, such as the third gear 475C. When the speed of the first transmission shaft 474 matches the speed of the target gear (e.g., the third gear 475C), a synchronizer (the fifth synchronizer 462E) can shift into engagement with the target gear and lock the target gear to the first transmission shaft 474 such that the target gear and the first transmission shaft 474 are rotationally fixed. Similarly, when the fourth synchronizer 462D is engaged with the second internal combustion engine gear 456, the engine power can be transmitted from the engine 450 and/or the engine shaft 452 to the second transmission shaft 476 via the second transmission input gear 481B. In such a configuration, the rotation speed of the second transmission shaft 476 is dependent on the rotation speed of the engine shaft 452. Thus, the rotation speed of the transmission 470 (e.g., the first transmission shaft 474 or the second transmission shaft 476) can be dependent on a rotation speed of the engine shaft 452 when a synchronizer (such as the fifth synchronizer 462E, described below) associated with a gear 475 (such as the first gear 475A, described below) is being shifted into engagement with the gear 475. Thus, the engine 450 and/or the engine shaft 452 is operatively coupled to the first transmission shaft 474 and/or the second transmission shaft 476 by a linkage that is devoid of a clutch (e.g., a friction clutch or a torque converter). Similarly stated, the transmission 470 is a manual transmission that is coupled to the engine 450 via a linkage that is devoid of a clutch or a torque converter. Such a manual transmission can include, for example, a "fully manual" or driver manipulated transmission or an automated manual transmission or "AMT," which has the similar structure and gearing as a manual, but with electronic actuation. Thus, the powertrain 400 is described as including a dual-shaft clutchless transmission 470. By eliminating the clutch, the powertrain system 400 can operate with improved efficiency and higher performance than a system that includes a clutch.

While described as being a clutchless transmission, in some embodiments the system 400 can include one or more clutches configured to selectively disengage two or more components of the system 400. For example, the system 400 can include a clutch on the engine shaft 452 instead of or in addition to the synchronizers 462B, 462B and first and second gears 454, 456 such that the engine 450 can be disengaged from the first transmission subassembly 470A, the second transmission subassembly 470B, and/or a motor shaft associated with the motor 430 during, for example, a gear shifting operation. In some embodiments, the system 400 can include a clutch on the motor shaft 432 such that the motor shaft 432 can be disengaged from the first transmission subassembly 470A, the second transmission subassembly 470B, and/or an engine shaft associated with the engine 450.

The synchronizer assembly can include, for example, a first synchronizer (or shifting element) 462A, a second synchronizer (or shifting element) 462B, a third synchronizer (or shifting element) 462C, a fourth synchronizer (or shifting element) 462D, a fifth synchronizer (or shifting element) 462E, and a sixth synchronizer (or shifting element) 462F. As described above, the first synchronizer 462A is located on the electric motor shaft 432, and is capable of moving into engagement with the first electric motor gear 431. The third synchronizer 462C is located on the electric motor shaft 432, and is capable of moving into engagement with the second electric motor gear 433. The second synchronizer 462B is located on the internal combustion engine shaft 452, and is capable of moving into engagement with the first internal combustion engine gear 454. The fourth synchronizer 462D is located on the internal combustion engine shaft 452, and is capable of moving into engagement with the second internal combustion engine gear 456. The fifth synchronizer 462E is located on the first transmission shaft 474, and is capable of moving between the first gear 475A and the third gear 475C. The sixth synchronizer 462F is located on the second transmission shaft 476, and is capable of moving between the second gear 475B and the fourth gear 475D. Alternatively, the synchronizer assembly can be configured to include any number of synchronizers suitable to control any number of gears 475 arranged in the transmission 470.

The synchronizers are operably coupled to the electronic control unit 420 (and any associated actuators, not shown in FIG. 9) so that the electronic control unit 420 can selectively slide the synchronizers along their respective shafts to move a gear between the free running configuration and the fixed configuration. The synchronizers can be any suitable mechanism that matches the speed of a free-spinning gear to the speed of the rotating shaft about which the free spinning gear is rotated. For example, the synchronizers can the same or similar in structure and/or function to the synchronizers described above with references to the system 100 or the system 300.

The electronic control unit 420 is configured to control the electric motor 430, the internal combustion engine 450, and the synchronizer assembly 460 to operate the system 400. The electronic control unit 420 is configured to use speed-matching so that changes in the gear configuration of the transmission 470 can be made in a manner that limits damage and/or excessive wear (e.g., to the dog-teeth). Specifically, changing the gear configuration includes both shifting into gear (i.e., the selection or engagement of a gear) and shifting out of gear (i.e. the deselection or disengagement of a gear). Accordingly, the "speed matching" described herein (for any of the powertrain systems) can be used to enable shifting into gear, and also can be used to "match" the torque between engaged components to allow those components to be disengaged.

For example, in some embodiments, any of the speed matching systems and algorithms described herein can be used during a gear deselection to "zero" the torque across such components. Specifically, in some embodiments, the electronic control unit 420 (or any of the electronic control units or controllers described herein) can modulate the torque within the drivetrain to allow deselection of gears (e.g., via control of the engine or electric motor).

Accordingly, the electronic control unit 420 can be configured to have precise, closed-loop control over the speed of the internal combustion engine 450, the speed of the electric motor 430, and the position of the synchronizers of the synchronizer assembly. This configuration gives the electronic control unit control over the speed of all shafts and gears in the transmission 470. In some embodiments, the electronic control unit 420 (and any of the controllers described herein) can include one or more modules to perform the functions described herein. For example, in some embodiments, the electronic control unit 420 can be similar to the electronic control unit 120 described above.

Although the gear shifting configurations are described below in a sequential manner, it is understood that the system 400 (and any of the systems described herein) can enable shifting in any sequence. For example, in some embodiments, the gears can be shifted between first and third, second and fourth, etc.

Selecting or "shifting" between gears within the powertrain system 400 is facilitated by the electronic control unit 420 that controls (or adjusts) any one of the engine speed, the speed of any of the shafts within the transmission 470 and/or the motor speed to match a speed of the target gear to a speed of a corresponding (or mating) gear or shaft when the synchronizer assembly is being shifted. In some embodiments, the electronic control unit 420 (or controller) can include a speed matching module that produces an engine control signal to adjust an engine speed to match a speed of a gear or shaft within the transmission 470 to a speed of a corresponding gear or shaft during shifting. Specifically, when it is necessary to mesh two gears (and/or shafts) moving at different angular speeds, the electronic control unit 420 can be configured to use either the internal combustion engine 450 or the electric motor 430 to increase the speed of the slower spinning gear and/or shaft to match the speed of the faster spinning gear. Once the two gears are spinning at the same speed, the electronic control unit 420 can produce a signal to shift an associated transmission synchronizer to mate the two gears. For example, when shifting between gears 475 within the transmission 470, the appropriate synchronizer (e.g., synchronizer 462E) is shifted to match the speed of a free running gear (e.g., of gear 475A) to the speed of a transmission shaft (e.g., the first transmission shaft 474).

Because the first transmission shaft 474 and the second transmission shaft 476 are coupled to the drive shaft 412 by a number of gears (e.g., the gears 475), and because the engine shaft 452 can remain coupled to the first transmission shaft 474 or the second transmission shaft 476, differences between the speed of the engine shaft 452 (i.e., the engine speed) and the transmission shaft to be coupled to the engine shaft 452 are undesirable and limit the ability of the shifting to occur. In traditional manual transmissions, a clutch is used to temporarily disengage the engine shaft from the transmission shaft. In the powertrain system 400 described herein, the electronic control unit 420 can adjust or "match" the shaft speeds to facilitate the desired shifting while a rotation speed of the input shaft is dependent on a rotation speed of the engine shaft. For example, with the fourth synchronizer 462D in a neutral position on the engine shaft 452, the electronic control unit 420 can increase (or decrease) the speed of the internal combustion engine 450 and, thus, the engine shaft 452 to match the speed of the, for example, second internal combustion engine gear 456. Specifically, while the electric motor 430 provides rotation to the first transmission shaft 474 and the transmission 470 is in, for example, third gear (e.g., the fifth synchronizer 462E is in engagement with the third gear 475C such that power is transmitted to the drive shaft 412 via the third gear 475C), the second transmission input gear 481B rotates the second internal combustion engine gear 456 relative to the engine shaft 452. The electronic control unit 420 can control the electric motor 430 and the internal combustion engine 450 to adjust the speeds of one or both until the engine shaft 452 and the second internal combustion engine gear 456 are rotating at matching speeds. Once the speeds match, the fourth synchronizer 462D can shift into engagement with the second internal combustion engine gear 456 such that the engine shaft 452 is locked to the second internal combustion engine gear 456 and the engine 450 can provide power to the second transmission shaft 476. This arrangement can eliminate the lag in acceleration that is traditionally associated with shifting gears because the shifting allows torque and acceleration to be transmitted from the engine 450 to the transmission 470 (and, in turn, to the drive shaft 412) throughout the entire shifting process. Moreover, for any brief period of "zero torque" transmission, which occurs at the instant of gear shifting, the electric motor 430 can supply power (or "torque fill") to the drive shaft 412.

Specifically, the electric motor 430 is configured to transmit power between the electric motor shaft 432 and the drive shaft 412 when a synchronizer is being shifted to engage and/or select one of the sets of mating gears (i.e. torque fill) to prevent acceleration lag. For example, when neither the second synchronizer 462B nor the fourth synchronizer 462D are engaged with the first internal combustion engine gear 454 and the second internal combustion engine gear 456, respectively, during a shifting operation, the power from the engine 450 is not transmitted from the engine shaft 452 to either of the transmission shafts (e.g., 474, 476). As a result, the power from the engine 450 is not transmitted to the drive shaft 412. During this shifting period, the electric motor 430 can apply torque to the drive shaft 412 to prevent acceleration lag. After the second synchronizer 462B engages with the first internal combustion engine gear 454 or the fourth synchronizer 462B engages the second internal combustion engine gear 456, power is transmitted from the engine 450 to the drive shaft 412 (via one of the gears 475 in a locked configuration relative to one of the transmission shafts), the electric motor 430 can continue to transmit additional power to the drive shaft 412. Alternatively, the electric motor 430 can disengage from the drive shaft 412 until the next gear shifting period.

Similarly, for any brief period of "zero torque" transmission during gear shifting, the engine 450 can supply power (or "torque fill") to the drive shaft 412. Specifically, the engine 450 can be configured to transmit power between the engine shaft 432 and the drive shaft 412 when a synchronizer is being shifted to engage and/or select one of the sets of mating gears (i.e. torque fill) to prevent acceleration lag. For example, when the first synchronizer 462A is shifting out of engagement with the first motor gear 431 and the third synchronizer 476A is shifting into engagement with the second motor gear 433 (or vice versa), the power from the motor 430 may not be transmitted from the motor shaft 452 to either of the transmission shafts (e.g., 474, 476). As a result, the power from the motor 430 is not transmitted to the drive shaft 412. During this shifting period, the engine 450 can apply torque to the drive shaft 412 to prevent acceleration lag. For example, the engine 450 drive shaft 412 can operate under the power and/or rotational control of the engine 450 via the first transmission shaft 474 or the second transmission shaft 476 while the first transmission shaft 474 is speed matched to the electric motor shaft 432. After the third synchronizer 462C or first synchronizer 462A engages with either the second motor gear 433 or the first motor gear 431, respectively, and power is transmitted from the motor 430 to the drive shaft 412 (via one of the gears 475 in a locked configuration relative to one of the transmission shafts), the engine 450 can continue to transmit additional power to the drive shaft 412. In some embodiments, the engine 450 can remain engaged to the transmission shaft through which the moto 430 is providing power but transmit little or no power to the transmission shaft. Alternatively, the engine 450 can disengage from the drive shaft 412 until the next gear shifting period.

While the engine 450 provides rotation to one of the transmission shafts (e.g., 474 or 476), the electric motor 430 can provide rotation to the other of the transmission shafts. Thus, for example, if the fifth synchronizer 462E is engaged with the third gear 475C and the second synchronizer 462B is engaged with the first internal combustion engine gear 454, the rotational speed of the first transmission shaft 474 can depend on the speed of the engine 450. As the vehicle 410 accelerates and the engine 450 increases the rotational speed of the first transmission shaft 474 (and thus the speed of the drive shaft 412), the third synchronizer 462C can shift into engagement with the second electric motor gear 433 such that the speed of the second transmission shaft 476 is dependent on the speed of the electric motor 430. The electric motor 430 can thus increase the speed of the second transmission shaft 476 to match the rotational speed of the fourth gear 475D such that, when the speeds are matched, the fifth synchronizer 462E can shift out of engagement with the third gear 475C and the sixth synchronizer 462F can shift into engagement with the fourth gear 475C. The second synchronizer 462B can then shift into a neutral position and the fourth synchronizer 462D can shift into engagement with the second internal combustion engine gear 456 such that the internal combustion engine 450 can also provide power to the second transmission shaft 476. The electric motor 430 can continue to provide additional power to the second transmission shaft 476, or the third synchronizer 462C can shift to a netural position such that the electric motor 430 is disengaged from either of the transmission shafts.

In some embodiments, the drive shaft 412 (and thus, the vehicle 410) can be driven by both power sources (the motor 430 and the engine 450) simultaneously. In some embodiments, while one of the power sources is being shifted (e.g., synchronizer 462E or 462F is shifting to engage a gear set while the motor drives the first transmission shaft 474), the other power source (e.g., the engine 450) can torque fill to prevent power interruption. In some embodiments, for example, if the motor 430 is powering the drive shaft 412 via the first gear 475A, the engine 450 can shift into or out of this gear (i.e., such that both the motor 430 and the engine 450 provide power to the drive shaft via the first transmission shaft 474 and the first gear 475A). Alternatively, the engine 450 can switch into or out of any of the gears 475 coupled to the shaft 476 (e.g., second gear 475B or the fourth gear 475D) for simultaneous or sequential powering of the drive shaft 412 via the second transmission shaft 476. Said another way, in some embodiments, the vehicle 410 can be driven through a first gear ratio on the engine power (e.g., via the second shaft 476) and a second gear ratio via the motor power (e.g., via the first shaft 474). In some embodiments, the vehicle 410 can be driven through the same ratio by both the motor 430 and the engine 450 simultaneously.

In order to charge the energy storage device while the vehicle 410 is stationary, the system 400 can be configured in a "park and charge" mode in which the engine 450 charges the energy storage device associated with the electric motor 430 while the vehicle 410 is stationary. Similarly stated, in the "park and charge" mode power can be transferred from the engine 450 via the first engine gear 454 and the second motor gear 431 to the electric motor 430, which functions as a generator to charge the batteries. Alternatively, in the "park and charge" mode, power can be transferred from the engine 450 via the second engine gear 456 to the second motor gear 433 to the electric motor 430. A similar configuration can also support an "engine start" mode, during which power is transferred from the electric motor 430 via the second motor gear 433 and the first engine gear 454 to the engine 450 to start or "crank" the engine. To transition into "park and charge" (or "engine start") mode, in some embodiments, the electronic control unit 420 shifts the first synchronizer 462A into engagement with the second motor gear 433 and the second synchronizer 462B into engagement with the first engine gear 454. A speed matching module of the electronic control unit 420 can produce a speed control signal to adjust at least one of a speed of the engine shaft 452 or a speed of the motor shaft 432 when the first synchronizer 462A is being shifted to engage the first electric motor gear 431 and the second synchronizer 462B is being shifted to engage the first engine gear 454. Upon matching the speeds of the engine shaft 452 or the motor shaft 432 with the first engine gear 454, the electric motor shaft 432 can be coupled to the first electric motor gear 431 and the internal combustion engine shaft 452 can be coupled to the first engine gear 454. The electronic control unit 420 then starts the engine 450, which causes the internal combustion engine shaft 452 to rotate. Due to this rotation, the first engine gear 454, the first motor gear 431, and the motor shaft 432 all rotate under the power of the engine 450. The electronic control unit 420 can configure the electric motor 430 so that the rotation of the electric motor shaft 432 can charge the energy storage device. The second transmission shaft 476 will also rotate as a result of being operatively coupled to the first motor gear 431. The fifth synchronizer 462E and the sixth synchronizer 462F can be maintained in neutral positions such that the first transmission shaft 474 and the second transmission shaft 476 does not transmit power and/or rotation to the drive shaft 412 while the system 400 is in "park and charge" mode.

To charge the energy storage device while the vehicle 410 is moving, the system 400 can be configured to operate in a "drive and charge" mode in which the engine 450 controls the rotation of the drive shaft 412 as described above with reference to gears two and four. In "drive and charge" mode, with the engine 450 driving the drive shaft 412 via the first engine gear 456, the second transmission shaft 476, and one of the second or fourth gears 475 (the fourth synchronizer 462D engaged with the second engine gear 456 and the sixth synchronizer 462F engaged with a second transmission shaft gear 475B or 475D), and after the shaft 432 has been speed matched by the electronic control unit 420 with the second motor gear 433, the electronic control unit 420 shifts the third synchronizer 462C to the right along the electric motor shaft 432 to couple the electric motor shaft 432 to the second electric motor gear 433. The electronic control unit 420 signals the electric motor 430 to be charged through rotation of the second electric motor gear 433 and the electric motor shaft 432 by the second engine gear 456. Alternatively, rather than the third synchronizer 462C engaging the second motor gear 433 to the shaft 432, in some embodiments the second synchronizer 462B can engage the first motor gear 431 to the engine shaft 452 and then the first synchronizer 462A can engage the first motor gear 431 to the motor shaft 432. Additionally, in some embodiments, the system 400 can be configured such that the system 400 transitions into the "drive and charge" mode only when the system 400 is not shifting between gears. For example, when the system 400 is shifting between two gears (and the sixth synchronizer 462F is not engaged with a gear-set), the electric motor 430 can be used for speed-matching of one of the first or the second transmission shafts 474, 476 to a gear-set or for torque filling. When the sixth synchronizer 462F is engaged with a gear-set, the electric motor 430 can transition into the "drive and charge" mode such that the electric motor 430 is charged through rotation of either of the electric motor gears 431, 433 and the electric motor shaft 432 by the engine gear 454. If the system 400 begins to shift gears such that the sixth synchronizer 462F is again not engaged with a gear-set, the electric motor 430 can transition out of "drive and charge" mode and be available for speed-matching and torque filling.

In some embodiments, the electronic control module 420 can include a feedback module (e.g., similar to the feedback module 122 described above) to receive input from sensors configured to monitor the torque and/or speed of the first transmission shaft 474 and the second transmission shaft 476. The electronic control module 420 and/or the feedback module can also be configured to monitor the torque of the first electric motor shaft 432 and the internal combustion engine shaft 452. The electronic control module 420 is configured to process the torque signals and other input, and produce and/or transmit signals to actuate the appropriate synchronizer combination in order to achieve a particular required function. For example, in some embodiments, the electronic control module 420 can include a speed matching module configured to produce an engine control signal based on the input received by the feedback module. The speed matching module can, for example, adjust an engine speed such that a speed of the engine shaft 452 and/or second internal combustion engine gear 456 is matched to a speed of the first transmission shaft 474 during a gear shift operation. Such engine control signals can be delivered to an engine control module, and can include signals to adjust the throttle position, fueling, timing or any other aspect of the engine performance that will adjust the engine speed. In other embodiments, the electronic control module 420 and/or the speed matching module are configured to produce a motor control signal to adjust a speed of a motor shaft such that a speed of a target gear 475 is matched to a speed of a corresponding transmission shaft (e.g., 474, 476) during a gear shift operation.

In some embodiments, the electronic control module 420 can include a feedback module (e.g., similar to the feedback module 122 described above) to receive input from sensors configured to monitor (or calculate) the torque of any components within the drive train to facilitate deselection of a gear. Specifically, the electronic control module 420 can adjust or "zero" the torque across engaged components. In some embodiments, the feedback module can sense and/or calculate torque based on torque sensor (e.g., strain gauge sensors on a shaft), calculated engine load (e.g., from a fueling/throttle map) and/or a load sensor outside of the drivetrain (e.g., an engine mount sensor). In some embodiments, the feedback module can sense and/or calculate torque based on the current associated with (e.g., drawn from or supplied to) the electric motor 430.

In some embodiments, the second synchronizer 462B and the fourth synchronizer 462D on the engine shaft can be configured to selectively disengage the engine shaft from the first internal combustion engine gear 454 and the second internal combustion engine gear 456, respectively, to interrupt power transmission between the engine shaft and the transmission shafts (e.g., 474, 476). The controller can include a synchronizer module configured to produce a synchronizer control signal associated with a motor drive configuration. When in the motor drive configuration, the synchronizers 462B and 462D are disengaged from the first internal combustion engine gear 454 and the second internal combustion engine gear 456 and the first motor gear 431 or the second motor gear 433 can transmit power from the motor shaft 432 to the drive shaft 412. In some embodiments, the feedback module of the electronic control unit 420 is configured to receive a vehicle speed signal associated with a wheel speed, and the synchronizer module is configured to produce the synchronizer control signal when the wheel speed is zero.

For example, to begin moving the first wheel 418 and the second wheel 419 from a total stop (i.e., a vehicle wheel speed of zero), the electric motor 430 can rotate the drive shaft 412 to rotate the axle 416 via the first transmission shaft 474 if the first synchronizer 462A is engaged with the first motor gear 431 and the fifth synchronizer 462E is engaged with the first gear 475A. In some embodiments, the synchronizer assembly can be used to transmit some power from the electric motor 430 to crank (or start) the internal combustion engine 450.

To disengage a gear-set, the electronic control unit 420 can send a control signal to regulate fuel flow to (or any other performance characteristic of) the internal combustion engine 450 to unload the first transmission shaft 474 (or the second transmission shaft 476) as the first electric motor 430 fills to provide torque to the drive shaft 412 (described above). Similar to the launching procedure, a modulated actuation of the synchronizer assembly needs to be included in the software of the electronic control unit 420 to command disengagement once each shaft is unloaded. The disengagement or "torque zeroing" can be based on feedback or torque calculations, as described above. In other embodiments, the electronic control unit 420 sends a control signal to apply a nominal force to the synchronizer that is engaged. When the engaged elements are at or close to "zero" torque, the magnitude of the nominal force is sufficient to disengage the components.

FIGS. 10-24 are schematic illustrations of a partial view of the system 400 in a variety of configurations. In FIGS. 10-24, components rotating under the control of the electric motor 330, the engine 450, and/or the wheels 418, 419, but that are not under load (i.e. not transferring power), are indicated by a hatched pattern (i.e., a series of lines in a single, diagonal direction). Alternatively, components rotating under the control of the electric motor 430, the engine 450, and/or the wheels 418, 419, but that are under load (i.e. transferring power), are indicated by a cross-hatched pattern (i.e., as series of hatching lines that intersect each other). Components that are not rotating under the control of the electric motor 430, the engine 450, and/or the wheels 418, 419, or under any of the other components of the system 400, are shown with no pattern.

Figure 10:
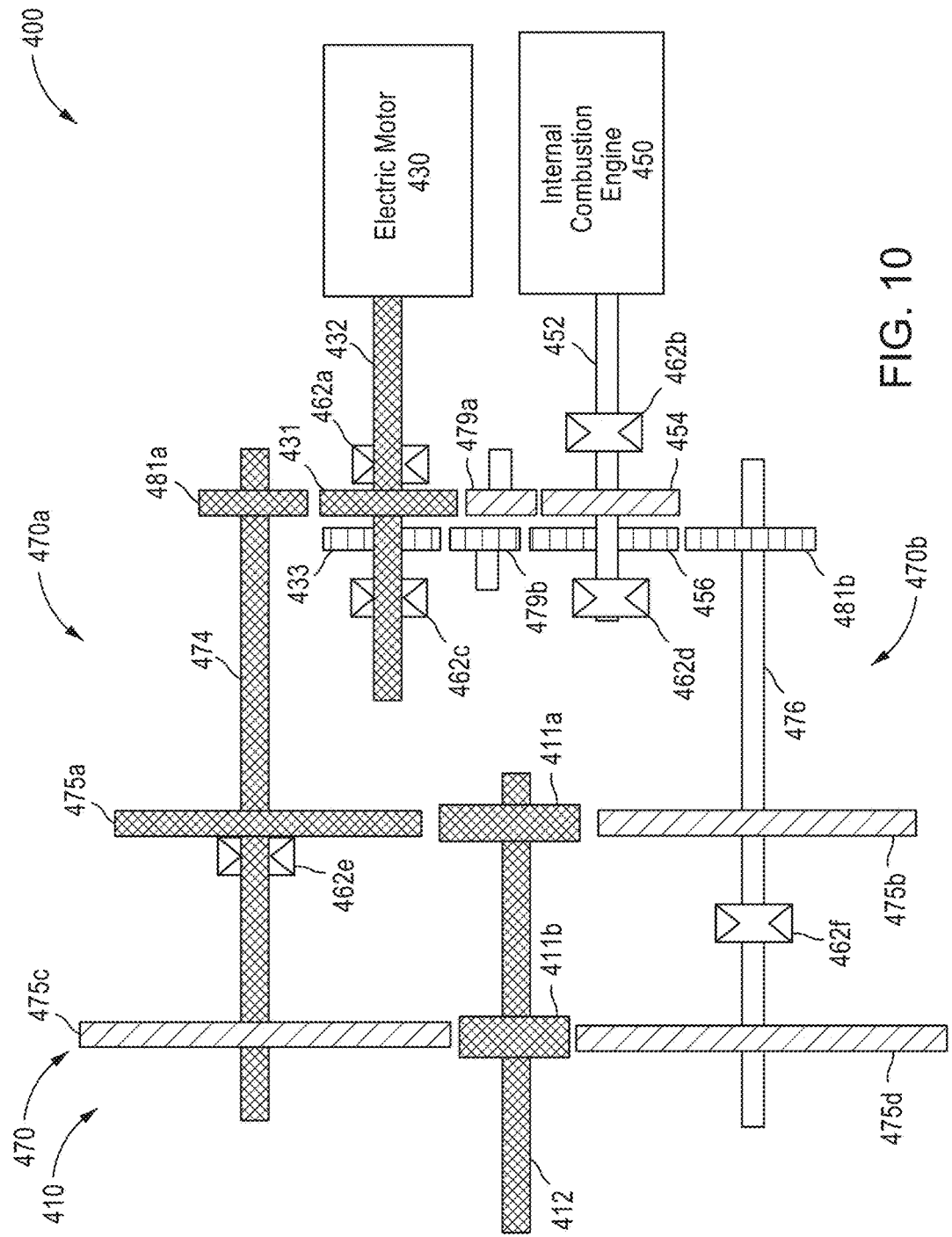
FIGS. 10-12 are schematic illustrations of the powertrain system of FIG. 10 in various stages of a launching sequence, according to an embodiment.

FIG. 10 is a partial view of system 300 with the electronic control unit 320 not shown. As shown in FIG. 10, the electric motor 430 can being acceleration of the vehicle 410. Specifically, the first synchronizer 462A is shifted into engagement with the first electric motor gear 431 such that the first electric motor gear 431 locks the electric motor shaft 432 into engagement with the first electric motor gear 431. The fifth synchronizer 462E is shifted into engagement with the first gear 475A such that the first gear 475A is locked to the first transmission shaft 474. Next, the electronic control unit 420 actuates the electric motor 430 and signals the electric motor 430 to rotate the electric motor shaft 432. As a result, as indicated by the cross-hatched pattern, the first electric motor gear 431 and the first transmission input gear 481A rotate under the control of and/or are powered by the electric motor shaft 432. Due to the fixed relationship between the first transmission input gear 481A and the first transmission shaft 474, the rotation of the electric motor shaft 432 causes the rotation of the first transmission shaft 474. When the first transmission shaft 474 is locked to the first gear 475A, rotation of the first transmission shaft 474 causes rotation of the first gear 475A, the first drive shaft gear 411A, and the drive shaft 412. The rotation of the drive shaft 412 causes the differential 414 to rotate the axle 416.

Due to the engagement between the first drive shaft gear 411A and the second drive shaft gear 411B to the second gear 475B and the third gear 475C and the fourth gear 475D, respectively, the second gear 475B, the third gear 475C, and the fourth gear 475D also rotate under control of the electric motor shaft 432. Because the synchronizer 462F is disengaged from the gears on the second transmission shaft 476, no power is transmitted from the second gear 475B or the fourth gear 475D to the second transmission shaft 476. This is indicated by the lack of pattern of the second transmission shaft 476. In this manner, when in the "electric only" mode, the frictional losses within the transmission are minimized. The vehicle 410 can be moved in a forward or reverse direction depending on the rotational direction of the electric motor shaft 432. Thus, this arrangement eliminates the need for a mechanical reverse gear in the transmission 470. In the first stage of the launch sequence shown in FIG. 10, the system 400 can be in an electric mode such that the internal combustion engine 450 does not need to be running. As shown in FIG. 10, with the second synchronizer 462B and the fourth synchronizer 462D disengaged from the first internal combustion engine gear 454 and the second internal combustion engine gear 456, respectively, the internal combustion engine 450 can idle at a fixed speed while the electric motor 430 accelerates the vehicle 410.

Figure 11:
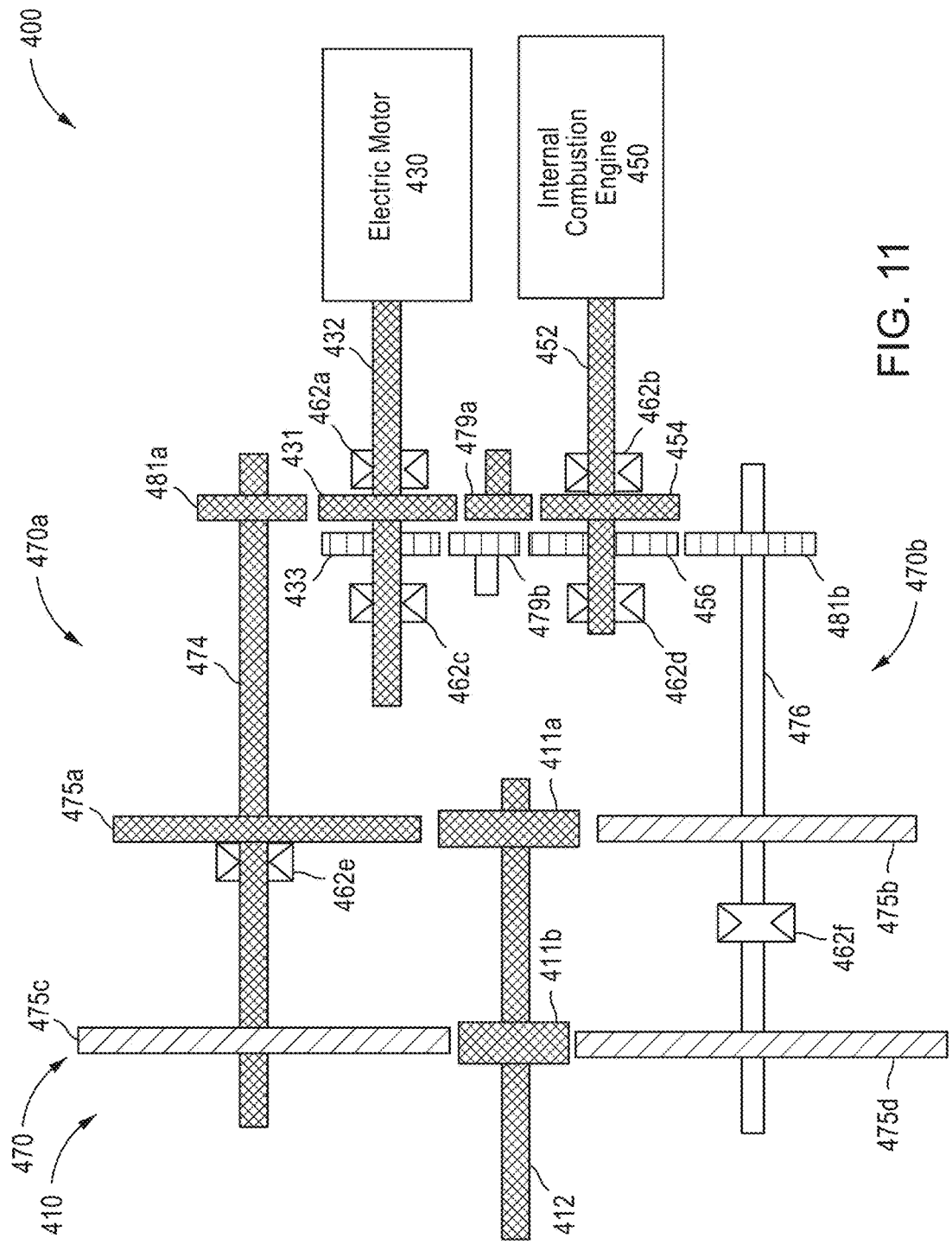

As shown in FIG. 11, the engine 450 can be accelerated until the speed of the engine shaft 452 matches the speed of the first internal combustion engine gear 454, which is rotating as a result of being operatively coupled to the idler gear 479A, which is coupled to the first electric motor gear 431. When the speed of the engine shaft 452 matches the speed of the first internal combustion engine gear 454, the second synchronizer 462B can be shifted to the left into engagement with the first internal combustion engine gear 454 such that the first internal combustion engine gear 454 is engaged with (i.e., locked to) the engine shaft 452. Due to the fixed relationship between the first transmission input gear 481A and the first transmission shaft 474, when the second synchronizer 462B locks the engine shaft 452 to the first internal combustion engine gear 454, the first transmission input gear 481A and the first transmission shaft 474 rotate under the control of and/or are powered by the internal combustion engine 450, as indicated by the cross-hatched pattern. Thus, as shown in FIG. 11, when the first synchronizer 462A is engaged with the first electric motor gear 431, the second synchronizer 462B is engaged with the first internal combustion engine gear 454, and the fifth synchronizer 462E is engaged with the first gear 475A, the drive shaft 412 can be powered by both the electric motor 430 and the internal combustion engine 450 simultaneously.

Figure 12:
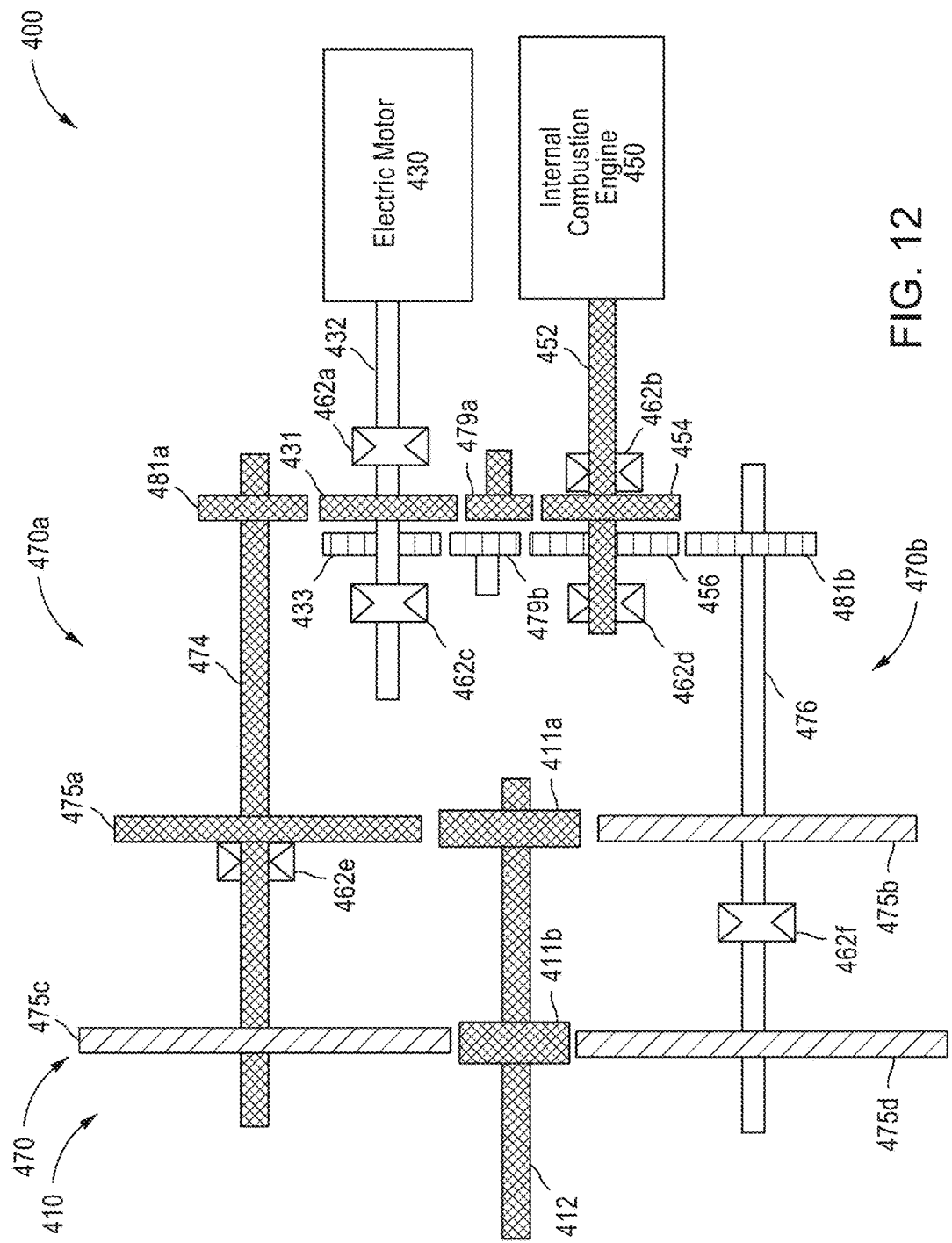

As shown in FIG. 12, the first synchronizer 462A can be moved out of engagement with the first electric motor gear 431 such that the rotation of the electric motor shaft 432 does not cause rotation of the first electric motor gear 431. Thus, the electric motor 430 is disengaged from the first transmission shaft 474. In such a configuration, the internal combustion engine 450 can independently accelerate the vehicle 410. The electric motor 430 can idle or be turned off.

Figure 13:
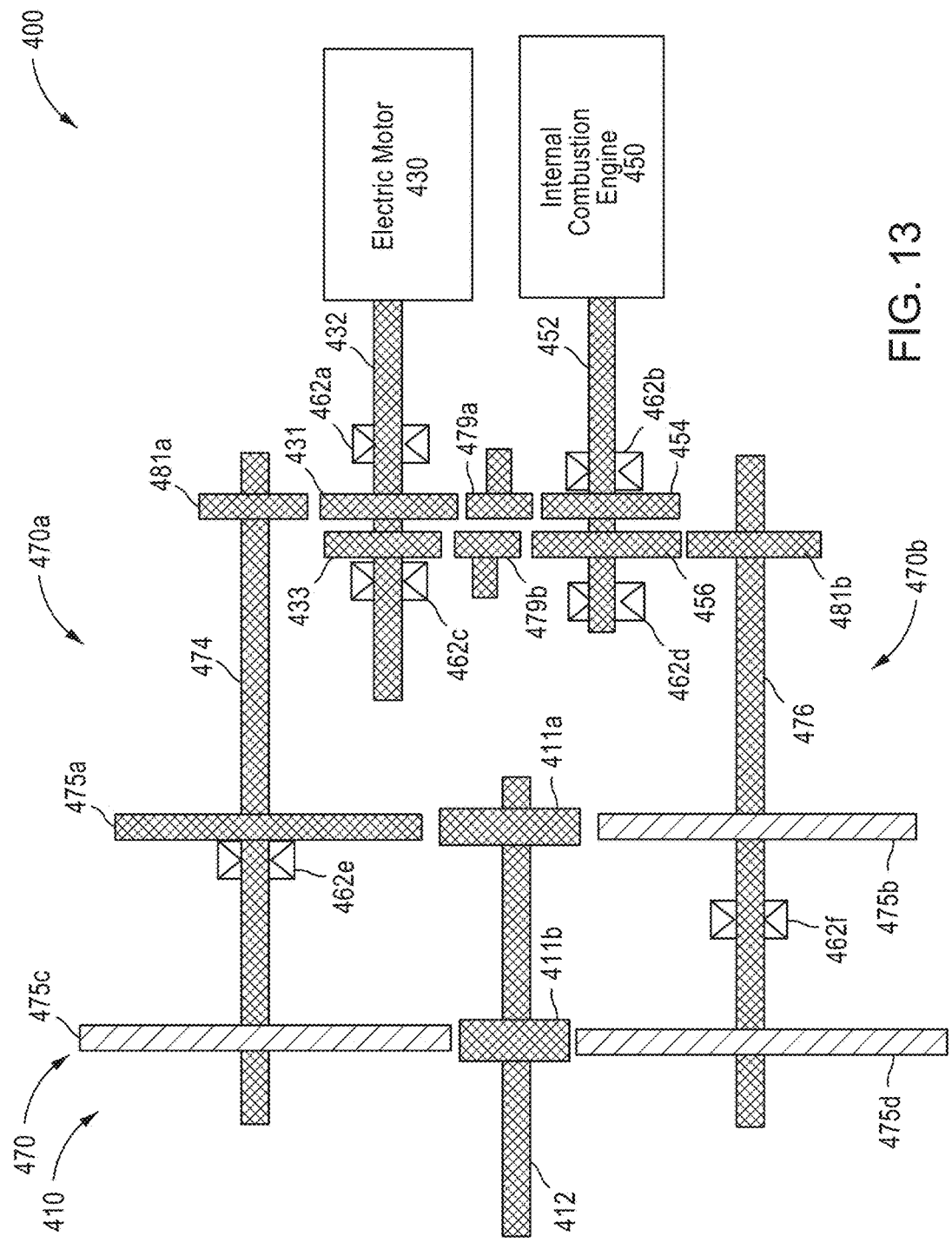
FIGS. 13-15 are schematic illustrations of the powertrain system of FIG. 10 in various stages of a shifting sequence, according to an embodiment.

As shown in FIG. 13, the third synchronizer 462C can be shifted to the right into engagement with the second motor gear 433 such that the second motor gear 433 is locked to the motor shaft 432. In such a configuration, the electric motor 430 can rotate the second transmission shaft 476 via a power path that includes the motor shaft 432, the second motor gear 433, the idler gear 479B, the free-running second engine gear 456, and the second transmission input gear 481B. Thus, the second transmission shaft 476 can rotate under the control and/or power of the electric motor 430 and the first transmission shaft 474 (and the drive shaft 412) can rotate under the control and/or power of the internal combustion engine 450.

In the configuration of FIG. 13, the electronic control unit 420 can control the electric motor 430 and the engine 450 such that, for example, the fourth gear 475D and the second transmission shaft 476 are spinning at the same speed. Specifically, the engine 450 can control the speed of the fourth gear 475D via controlling the speed of the engine shaft 452 when the second synchronizer 462B is engaged with the first engine gear 454 and the fifth synchronizer 462E is engaged with the first gear 475A due to the fourth gear 475D being operatively coupled to the second drive gear 411B of the drive shaft 412. When the speed of the fourth gear 475D matches the speed of the second transmission 476, the sixth synchronizer 462F can shift to the left to engage the fourth gear 475D such that the fourth gear 475D is locked to the second transmission shaft 476.

Figure 14:
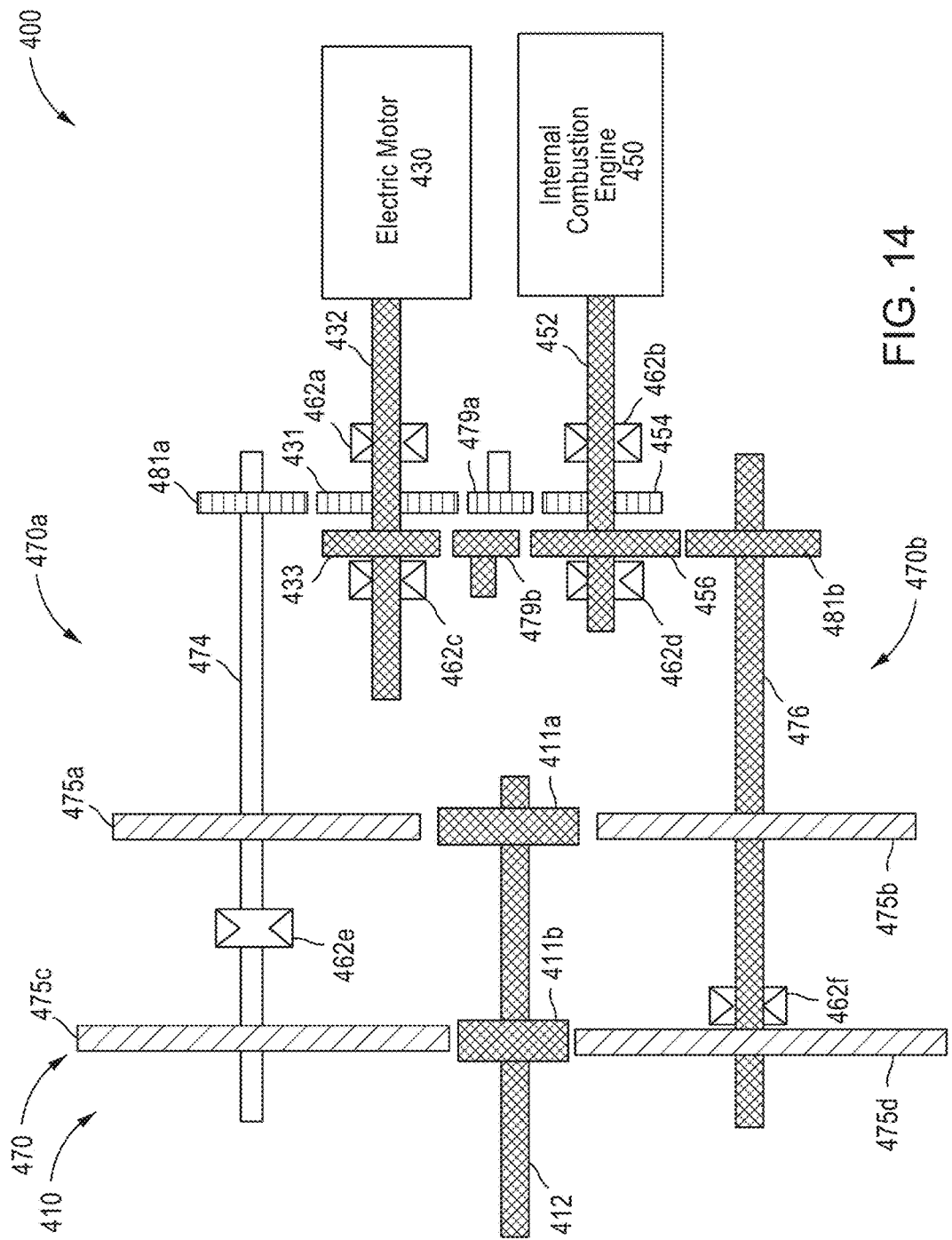

As shown in FIG. 14, the fifth synchronizer 462E can then be disengaged from the first gear 475A and the second synchronizer 462B can be disengaged from the first engine gear 454 such that the first engine gear 454 is free spinning. When the engine shaft 452 is spinning at the same speed as the second engine gear 456, the fourth synchronizer 462D can be shifted into engagement with the second engine gear 456 such that the engine 450 and the motor 430 can simultaneously provide power and/or rotation to the drive shaft 412 via the second transmission shaft 476 and the fourth gear 475D.

Figure 15:
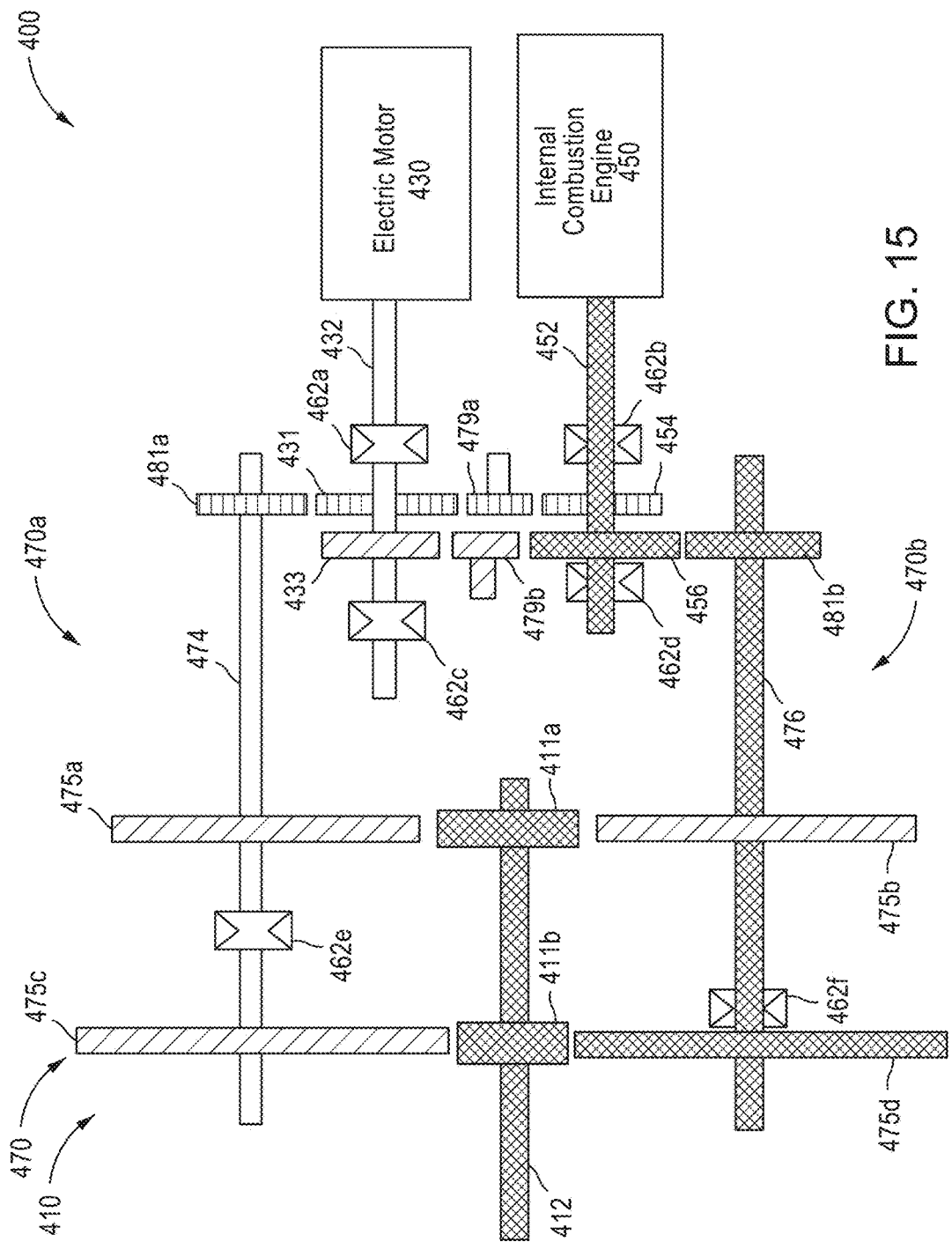

As shown in FIG. 15, the third synchronizer 462C can then be shifted out of engagement with the second motor gear 433 such that the motor shaft 432 is not under the control of the electric motor 430. As a result, the electric motor 430 does not provide any power or rotation to either of the first transmission shaft 474 or the second transmission shaft 476. However, the second motor gear 433 and the idler gear 479B spin as a result of being operatively coupled to the second engine gear 456, which is fixedly engaged with the engine shaft 452 by the fourth synchronizer 462D. In such a configuration, the internal combustion engine 450 provides power to the drive shaft 412 independently.

Figure 16:
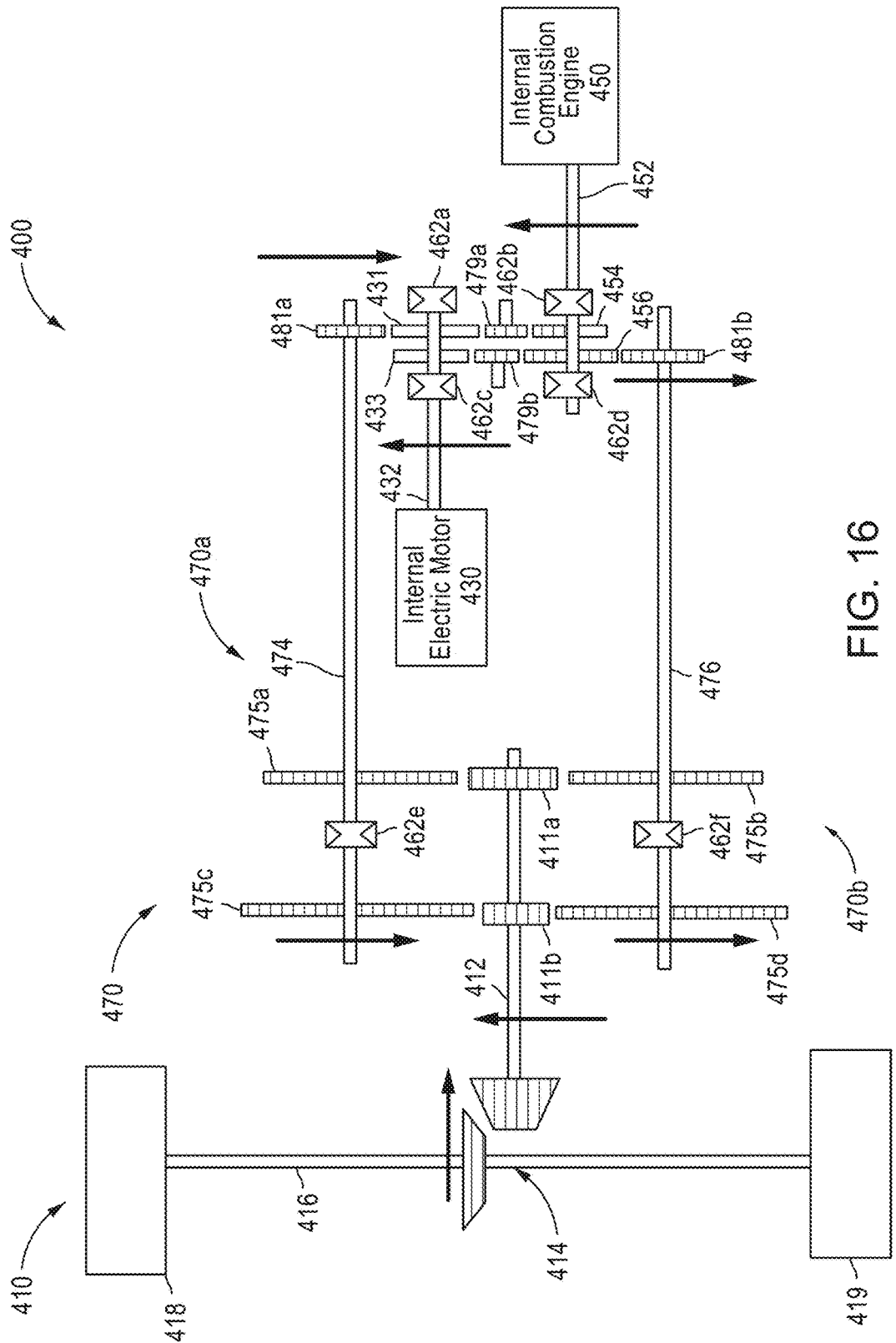
FIG. 16 is a schematic illustration of the powertrain system of FIG. 10 including arrows representing the rotation direction of each shaft relative to the other shafts, according to an embodiment.

FIG. 16 is a schematic illustration of the system 400 with arrows representing the direction each shaft is configured to spin viewed from a top perspective when the vehicle 410 is moving forward (to the right). All synchronizers 462 are in a neutral position in the configuration of FIG. 16.

Figure 17:
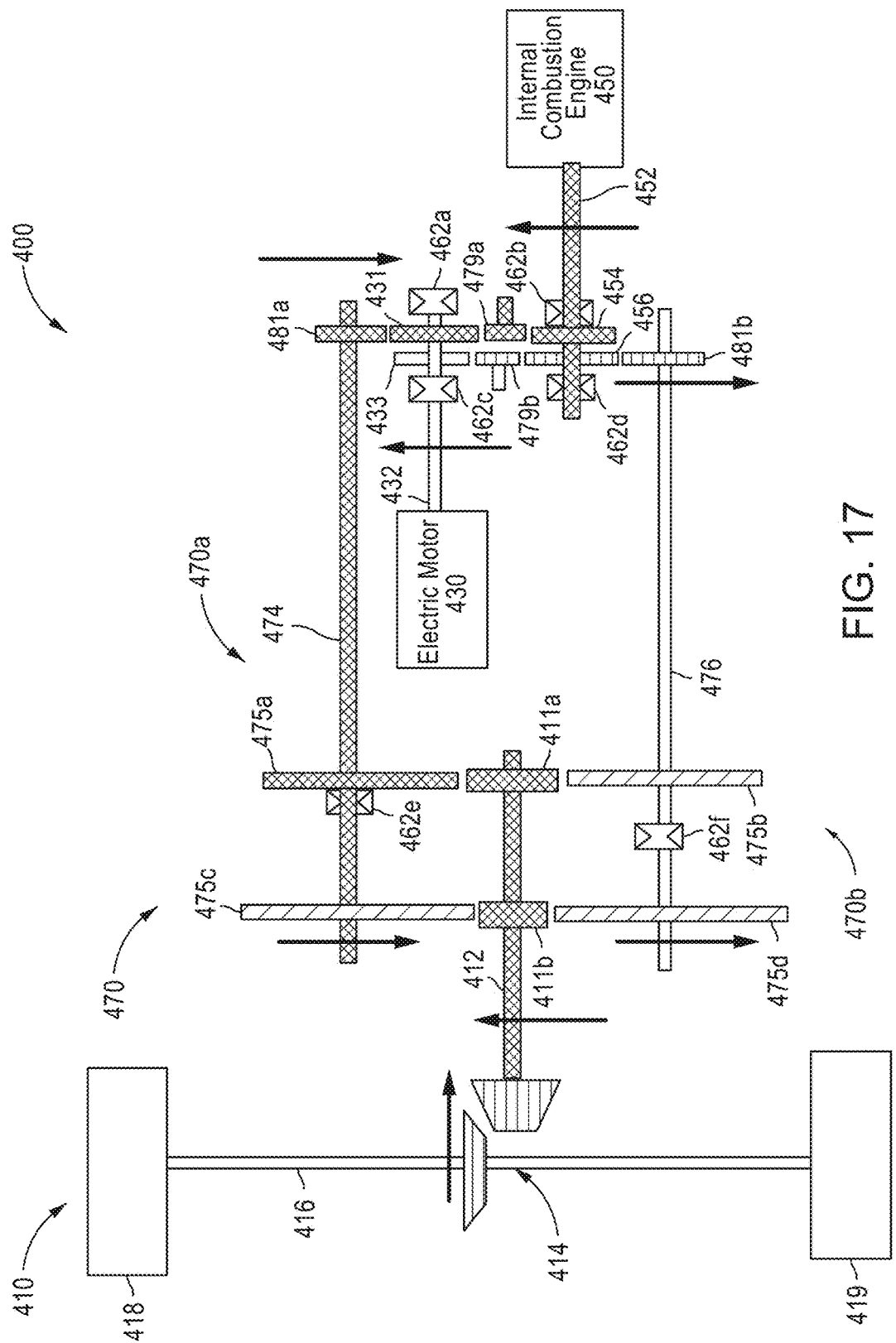
FIGS. 17-24 are schematic illustrations of the powertrain system of FIG. 10 in various stages of a shifting sequence, according to an embodiment.
Figure 18:
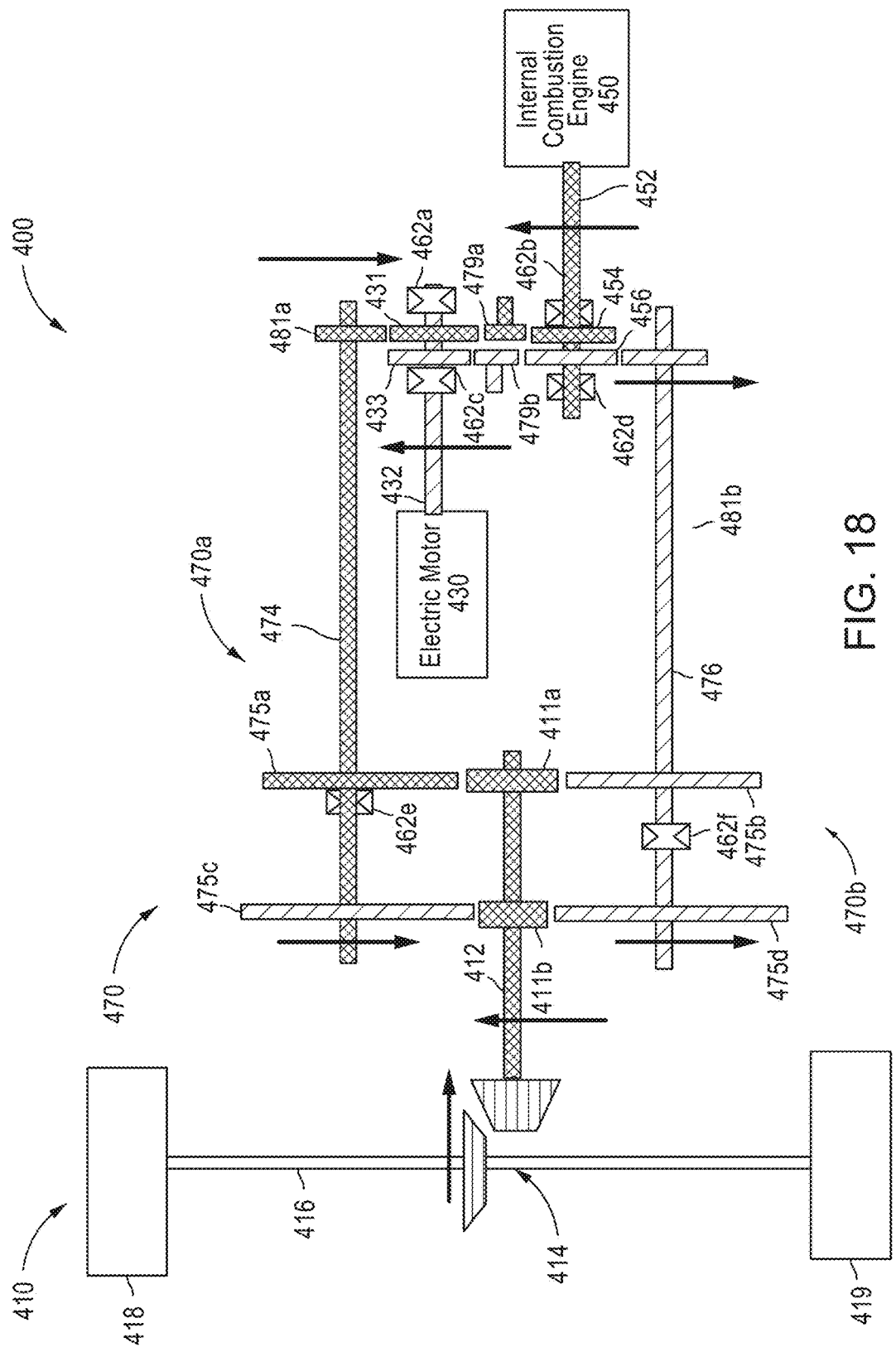

FIGS. 17-24 are schematic illustrations of the sequence of shifting the system 400 from first gear to second gear. FIG. 17 is a schematic illustration of the system 400 in first gear (i.e., the power path runs through the first gear 475A) under the power of the engine 450. In such a configuration, the second synchronizer 462B is engaged with the first engine gear 454 and the fifth synchronizer 462E is engaged with the first gear 475A. To shift from first gear to second gear, as shown in FIG. 18, first the third synchronizer 462C is shifted into engagement with the second motor gear 433.

Figure 19:
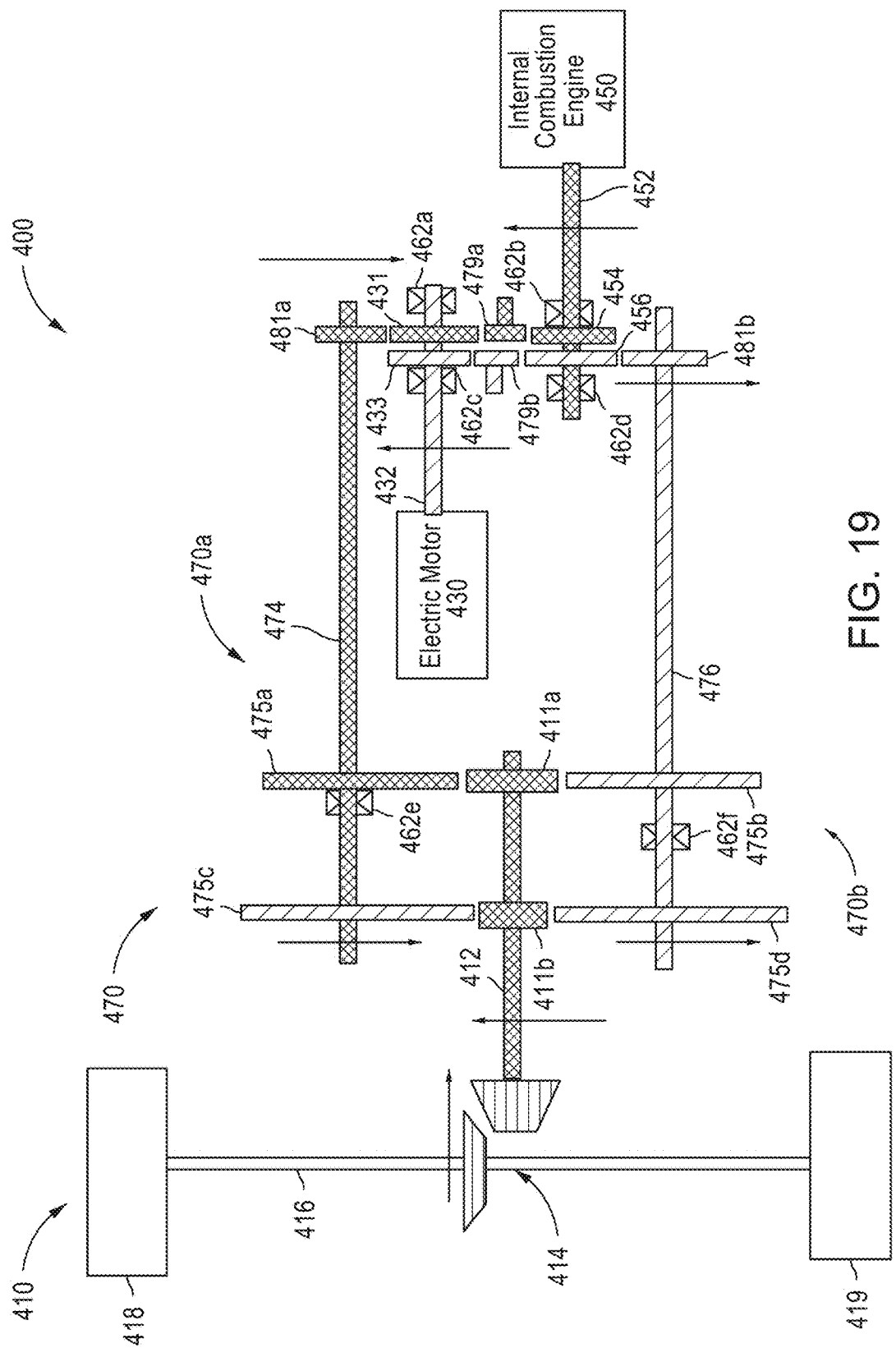

As shown in FIG. 19, the electric motor 430 can be turned on such that the motor shaft 432 rotates under the control of the electric motor 430. As a result of the engagement between the second motor gear 433 and the motor shaft 432, the idler gear 479B, the free spinning second engine gear 456, the second transmission input gear 481B, and the second transmission shaft 476 rotate under the control and/or power of the electric motor 430. Additionally, in the configuration of FIG. 19, the second gear 475B rotates under the control of the internal combustion engine 450 via the first engine gear 454, the idler gear 479A, the first motor gear 431, the first transmission input gear 481A, the first transmission shaft 474, the first gear 475A, and the first drive gear 411A. Thus, the electronic control unit 420 can control the speeds of the second transmission shaft 476 and the second gear 475B via controlling the electric motor 430 and the internal combustion engine 450.

Figure 20:
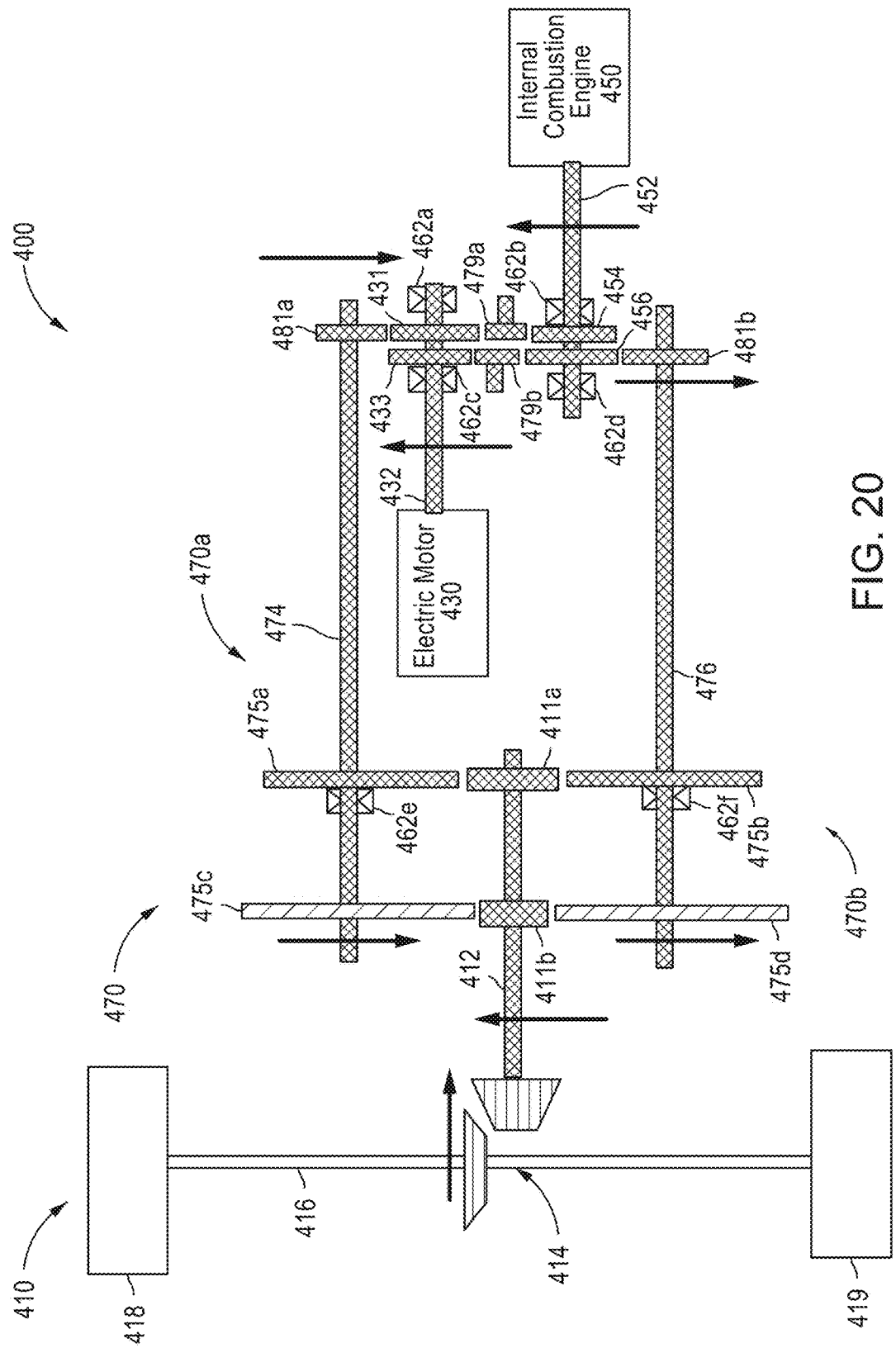

As shown in FIG. 20, when the speed of the second transmission shaft 476 matches the speed of the second gear 475B, the sixth synchronizer 462F can be shifted into engagement with the second gear 475B such that the second gear 475B is locked with the second transmission shaft 476. In such a configuration, the electric motor 430 can provide power and/or rotation to the drive shaft 412 via the second transmission shaft 476 and the internal combustion engine 450 can provide power and/or rotation to the drive shaft 412 via the first transmission shaft 474, simultaneously.

Figure 21:
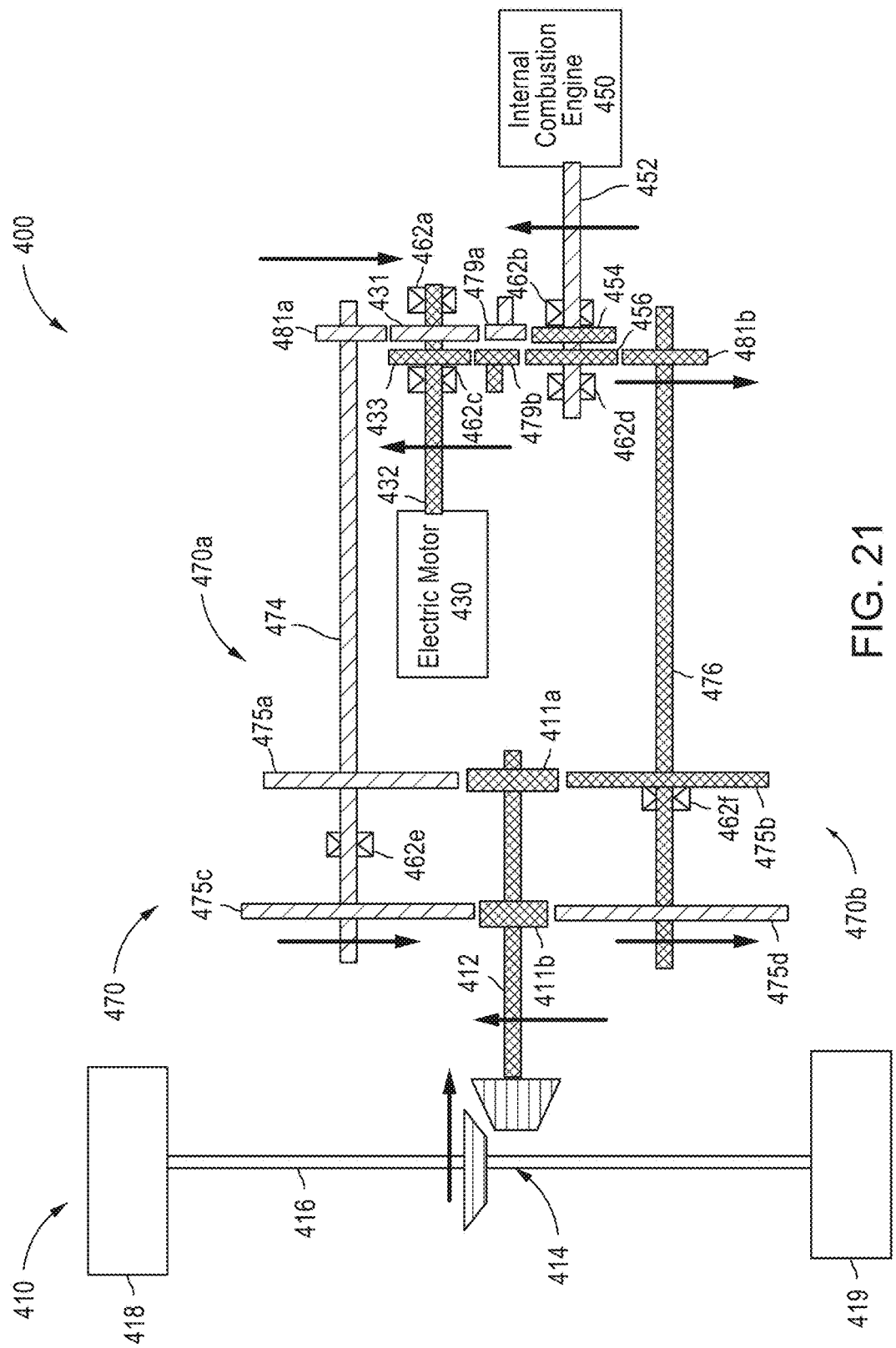
Figure 22:
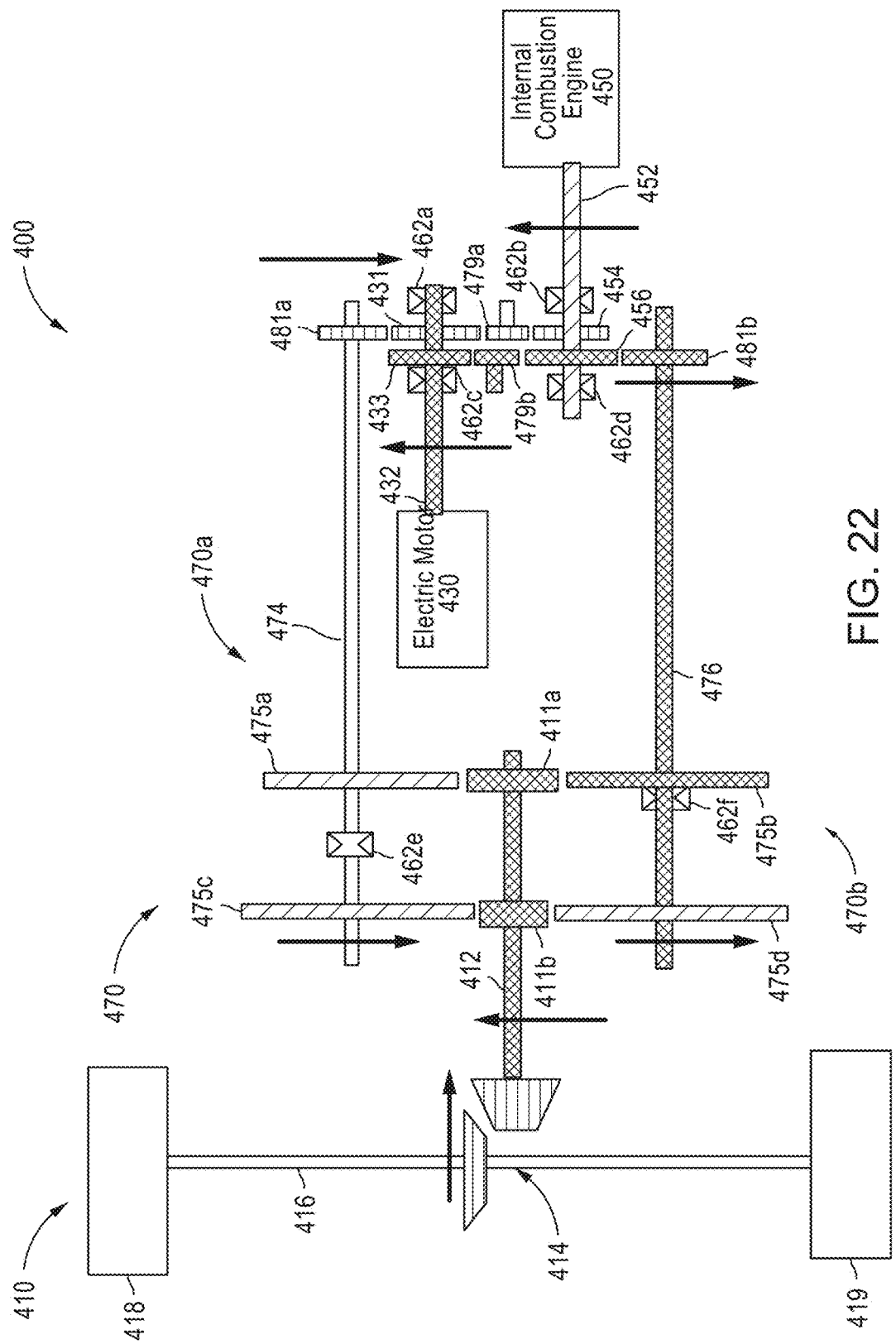

As shown in FIG. 21, the fifth synchronizer 462E can be shifted out of engagement with the first gear 475A such that the first gear 475A is free spinning relative to the first transmission shaft 474. As shown in FIG. 22, the second synchronizer 462B can be shifted out of engagement with the first engine gear 454 such that the internal combustion engine 450 and the engine shaft are disengaged from providing rotation and/or power to the system 400. The internal combustion engine 450 can then adjust the speed of the engine shaft 452 such that the speed of the engine shaft 452 matches the speed of the second engine gear 456.

Figure 23:
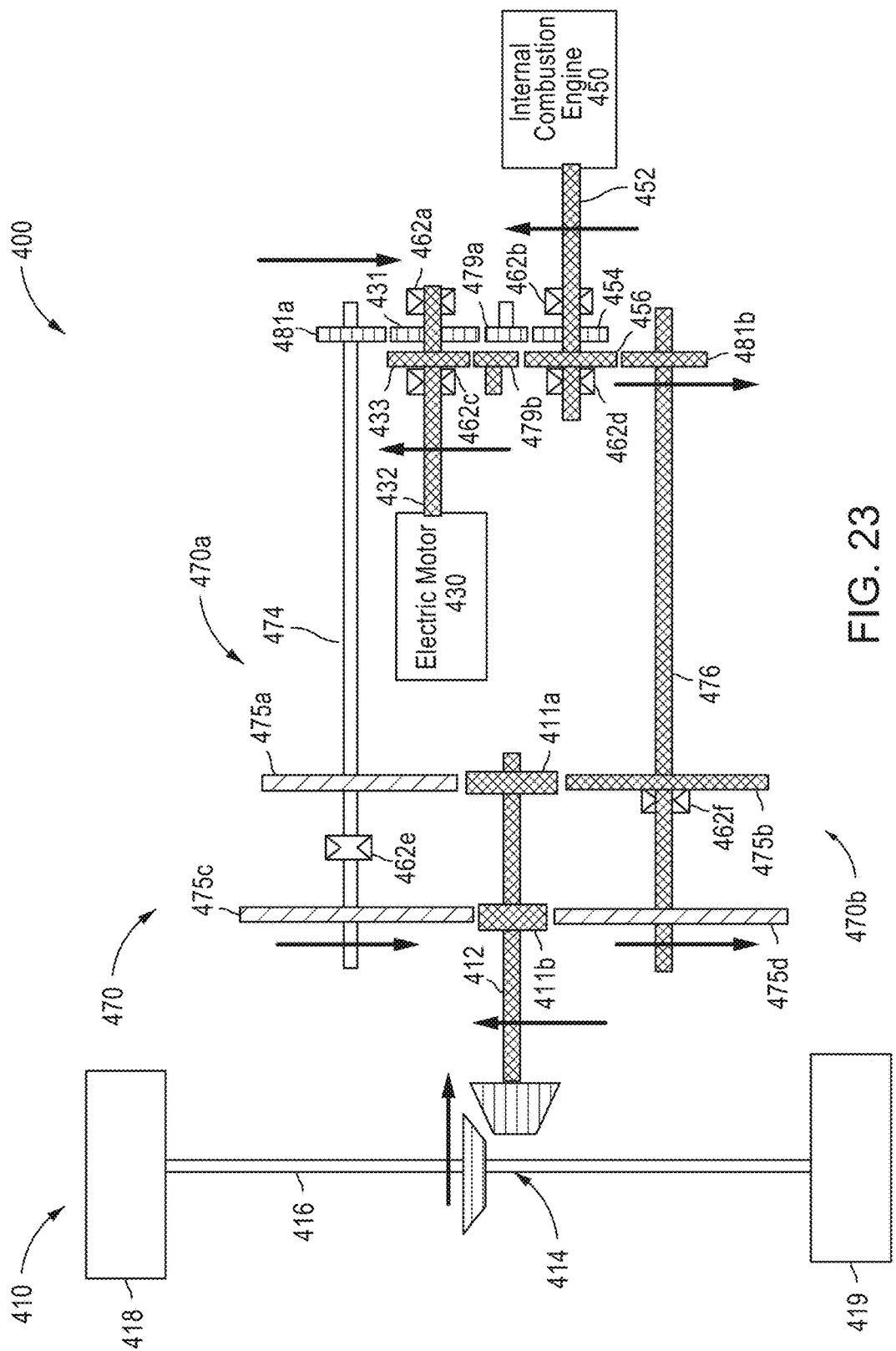

As shown in FIG. 23, when the engine shaft 452 is spinning at a speed that matches the speed of the second engine gear 456, the fourth synchronizer 462D can be shifted into engagement with the second engine gear 456 such that the second engine gear 456 is locked to the engine shaft 452.

Figure 24:
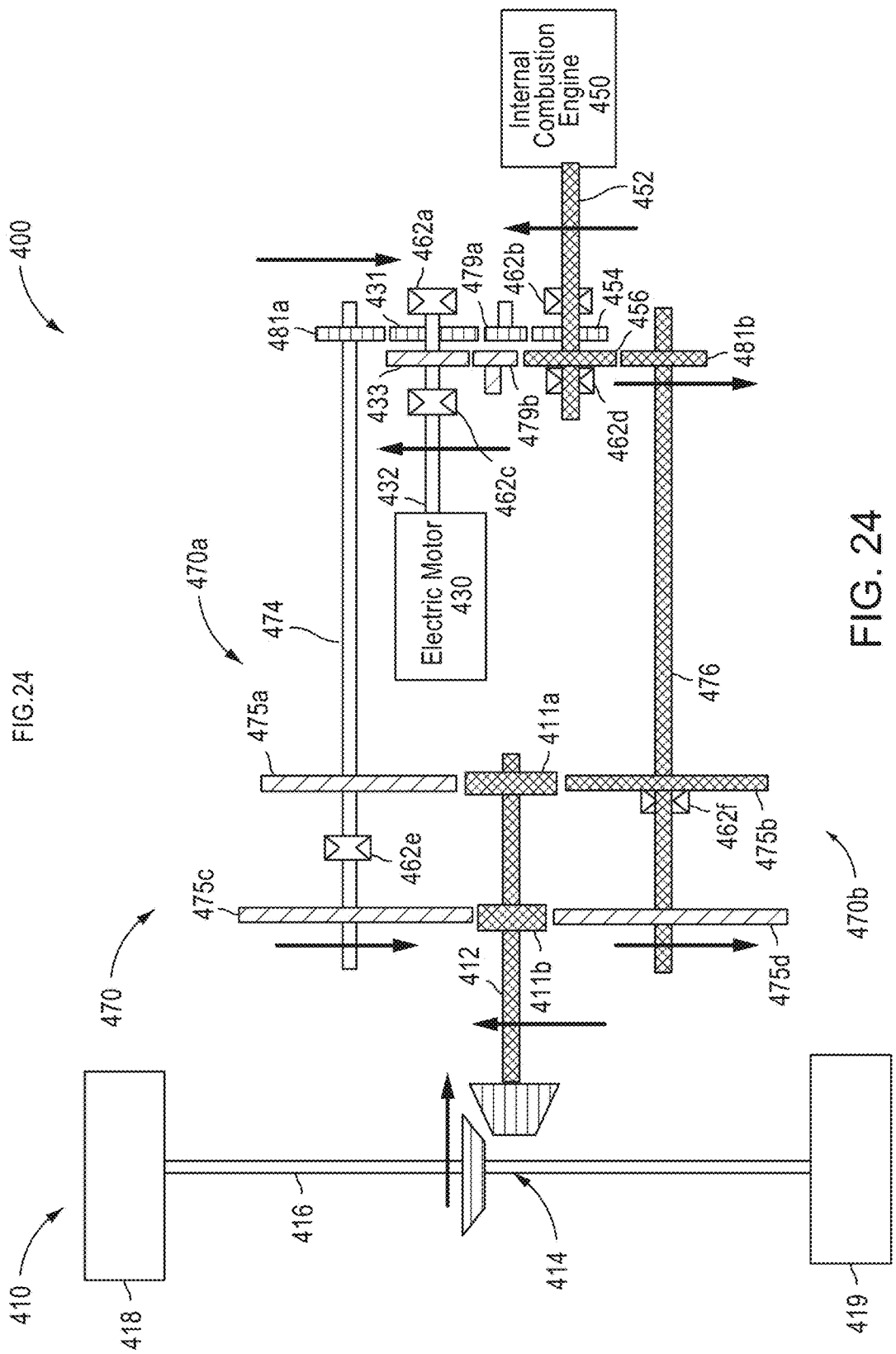

As shown in FIG. 24, after the second engine gear 456 is engaged with the engine shaft 450 such that the internal combustion engine 450 provides power and/or rotation to the drive shaft 412 via the second transmission shaft 476 and the second gear 475B, the electric motor 430 can be disengaged from providing power to the drive shaft 412. Specifically, the third synchronizer 462C can be shifted out of engagement with the second motor gear 433 such that the second motor gear 433 free spins on the motor shaft 432. The electric motor 430 can then be turned off and the internal combustion engine 450 can continue to power the system 400. Although the sequence of FIGS. 17-24 shows the sequence of shifting from first gear to second gear, the same or a similar sequence can be used to shift the system 400 from any suitable lower gear to any suitable higher gear.

Figure 25:
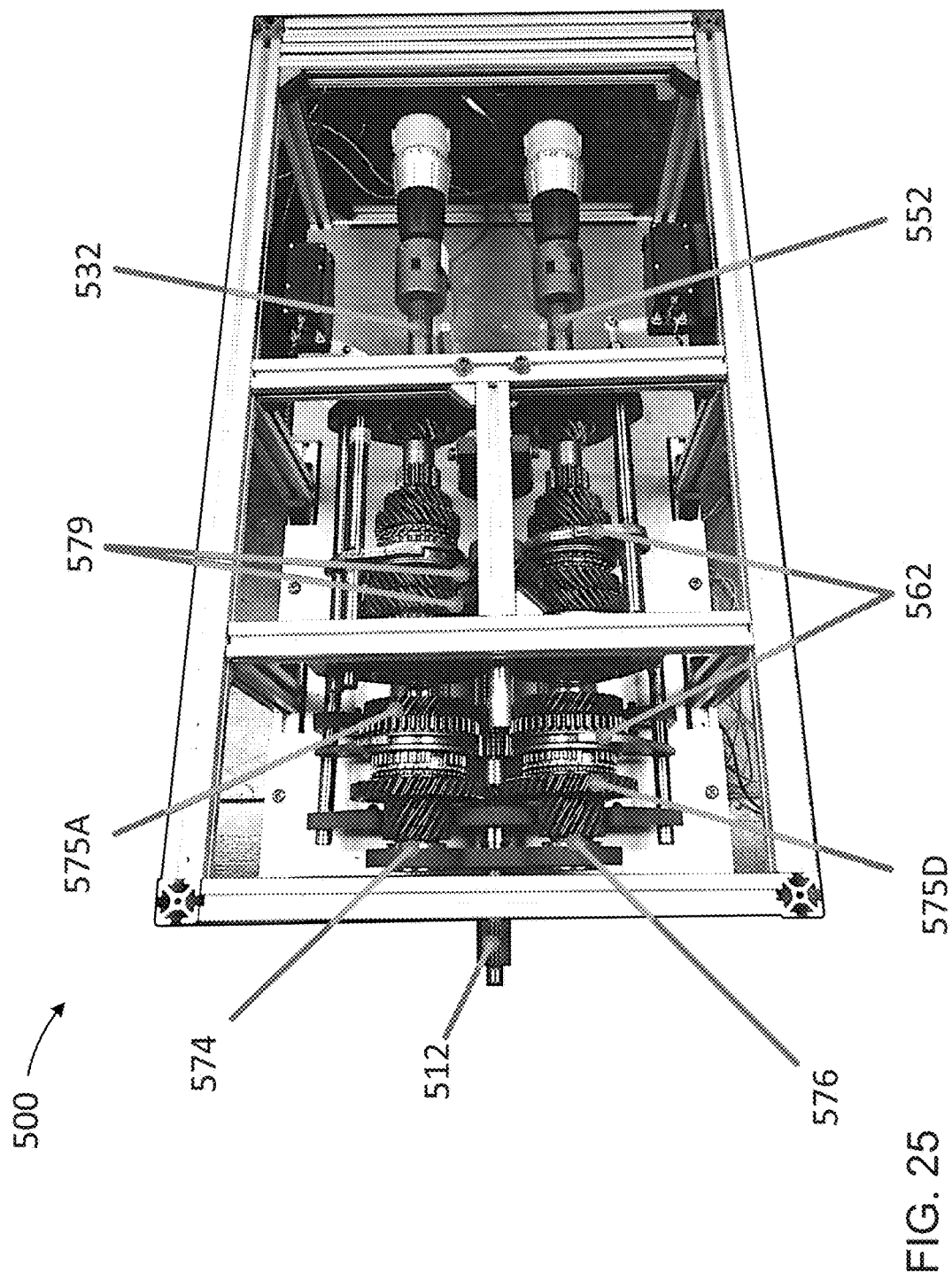
FIG. 25 is a photograph of a prototype of a portion of a powertrain system, according to an embodiment.

FIG. 25 is a photograph of a prototype system 500. As shown in FIG. 25, the system 500 can be the same or similar in structure and or function to any of the systems described in, and in particular system 500 can be the same or similar in structure and/or function to the system 400. The system 500 is constructed using select shafts, gears, and synchronizers from three identical 1999 Honda Civic transmissions mounted on a 1.2 m long custom aluminum and Delrin test bed. Similar to the system 400, the system 500 incorporates an idler shaft with idler gears 579 between a first electric motor shaft 532 and a second electric motor shaft 552. The system 500 includes four gears, such as a first gear 575A and a fourth gear 575D. Additionally, the system 500 includes a first transmission shaft 574 and a second transmission shaft 576 operably coupled to a drive shaft 512 via the four gears. Additionally, synchronizers 562 are operable to change the power and/or rotation paths of the system 500.

Figure 32:
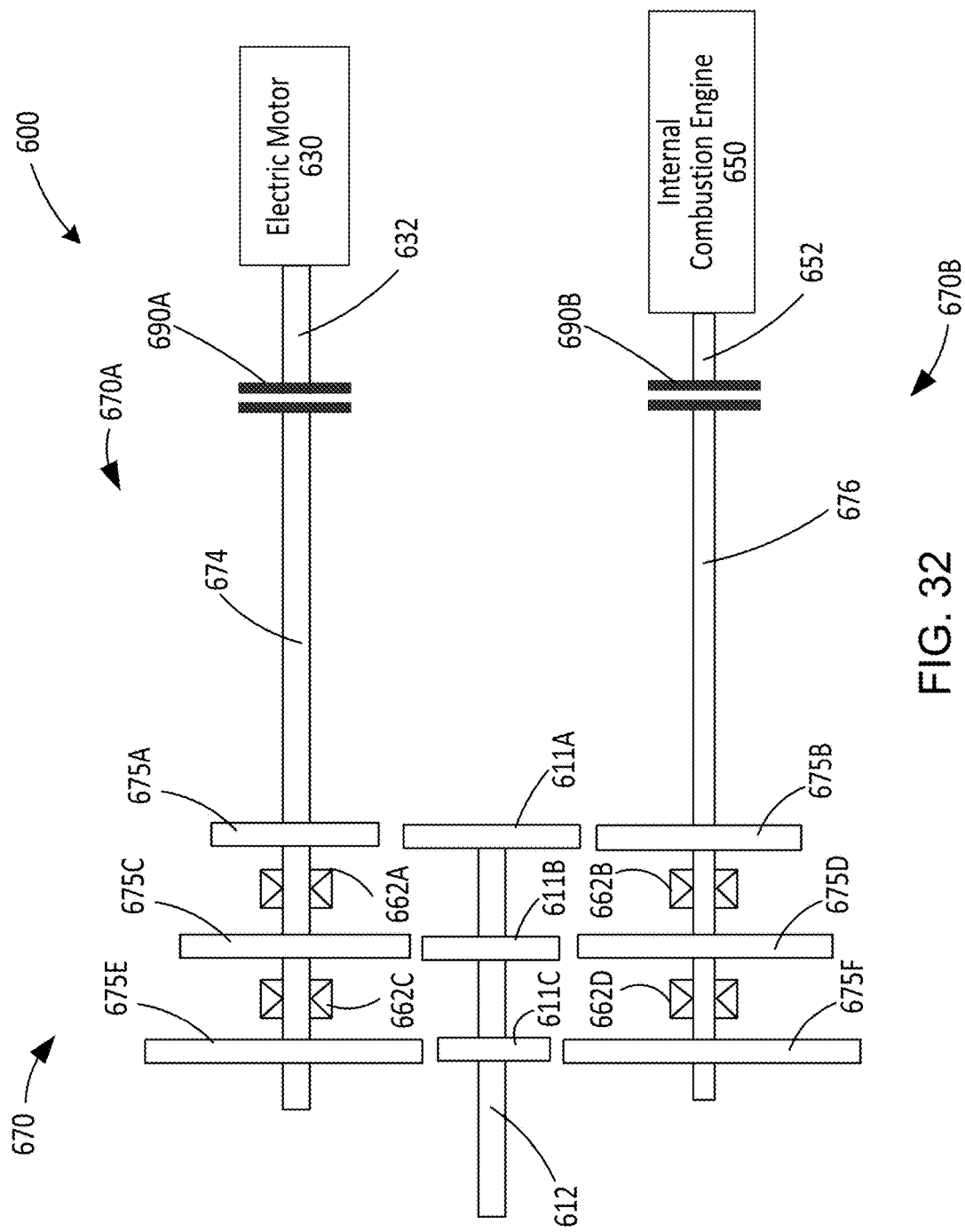
FIG. 32 is a schematic illustration of a powertrain system, according to an embodiment.

FIG. 32 is a schematic illustration of a powertrain system 600. The powertrain system 600 can be the same or similar in structure and/or function to any of the powertrain systems described herein, such as, for example, the powertrain systems 100, 300, and 400. For example, the system 600 can include two power sources and two transmission shafts. The system 600 can be included in a vehicle (not shown) including a drive shaft 612. The drive shaft 612 can be coupled via a differential (not shown) to an axle (not shown). The drive shaft 612 also includes a first drive shaft gear 611A, a second drive shaft gear 611B, and a third drive shaft gear 611C fixedly coupled to the drive shaft 612. The first drive shaft gear 611A, the second drive shaft gear 611B, and the third drive shaft gear 611C can be positioned in any suitable location along the drive shaft 612.

The powertrain system 600 contains an electronic control unit (not shown), an electric motor 630, an internal combustion engine 650, and a dual-shaft transmission 670. The electric motor 630 is configured to rotate and/or receive rotation power from an electric motor shaft 632. The electric motor 630, and any of the electric motors described herein, can be any suitable electric motor that produces power for and/or absorbs power from the wheels of the vehicle and/or the engine 650.

The transmission 670 includes a first transmission subsystem 670A and a second transmission subsystem 670B. The first transmission subsystem 670A includes a first transmission shaft 674 and the second transmission subsystem 670B includes a second transmission shaft 676. The transmission 670 also includes transmission output gears 675 (e.g., a first gear 675A, a second gear 675B, a third gear 675C, a fourth gear 675D, a fifth gear 675E, and a sixth gear 675F). The odd gears (e.g., the first gear 675A, the third gear 675C, and the fifth gear 675E) are included in the first transmission subsystem 670A and are coupled to the first transmission shaft 674. The even gears (e.g., the second gear 675B, the fourth gear 675D, and the sixth gear 675F) are included in the second transmission subsystem 670B and are coupled to the second transmission shaft 676. Similarly as described with reference to other embodiments above, each of the gears 675 can each be moved between a "free running" configuration about above its respective first transmission shaft 674 or second transmission shaft 676, and a fixed configuration in which the gear 675 does not rotate relative to its respective first transmission shaft 674 or second transmission shaft 676. The configuration of the gears 675 is controlled by a synchronizer (or shifting) assembly, similarly as discussed with reference to the embodiment of FIG. 3 above. Although six gears 675 are shown and described, the system 600 and the transmission 670 can be configured to include any number of gears 675 arranged in any functional way to modulate power and/or speed when rotating the drive shaft 612.

The transmission output gears 675 are operably coupled to, engaged with and/or meshed with the drive shaft gears 611 to form gear sets. Specifically, the first gear 675A and the second gear 675B are operatively coupled to, engaged with, and/or meshed with the first drive shaft gear 611A. The third gear 675C and fourth gear 675D are operatively coupled to, engaged with, and/or meshed with the second drive shaft gear 611B. The fifth gear 675E and sixth gear 675E are operatively coupled to, engaged with, and/or meshed with the third drive shaft gear 611C. Because the drive shaft gears 611 are fixedly coupled to (i.e., cannot rotate relative to) the drive shaft 612 and each of the transmission output gears 675 is coupled to a respective drive shaft gear 611, rotation of the wheels and/or the drive shaft 612 produces rotation of the transmission output gears 675, and vice-versa.

The internal combustion engine 650, and any of the engines described herein, can be any suitable engine that produces power for and/or absorbs power from the wheels and/or the motor 630. The engine 650 is configured to rotate and/or be rotated by an internal combustion engine shaft 652.

In some embodiments, as shown in FIG. 32, the first transmission subsystem 670A can optionally include a first clutch 690A such that the motor shaft 632 can be disengaged from the first transmission shaft 674. The second transmission subsystem 670B can optionally include a second clutch 690B such that the engine shaft 652 can be disengaged from the second transmission shaft 674.

Depending on the configuration of the synchronizer assembly (i.e., the synchronizers 662A, 662B, 662C, and 662D), the electric motor 630 and/or the engine 650 can provide power and/or control the rotation of the drive shaft 612 through various gear sets. In some embodiments, the synchronizers 662 can be controlled in combination with the electric motor 630 and/or the engine 650 for passive speed matching similarly as described in reference to other systems described herein. For example, the engine 650 can control the rotation speed of the second transmission shaft 676 to match the rotation speed of the gear 675B or the gear 675D such that the second synchronizer 662B can lock one of the gears 675B, 675D into engagement with the first transmission shaft 676 when the speeds match. In some embodiments, rather than be fixedly coupled to the shaft 612, the drive gears 611 can be moved between a free spinning configuration and a locked configuration (where the gear is engaged with the shaft 612 and rotationally fixed) by a number of synchronizers. In such embodiments, the motor 630 can control the engine speed via the shaft 612. In embodiments that include an optional clutch on the first transmission shaft 676, the speeds of the gears do not need to match the speed of the first transmission shaft 676 to engage the gears with the first transmission shaft 676. Rather, the synchronizer 662C can first bring the first transmission shaft 676 up to speed and the clutch can then bring the engine up to the proper speed (similar to a traditional manual transmission vehicle). The transmission 670 is configured to torque fill similarly as described with reference to other systems herein.

Figure 33:
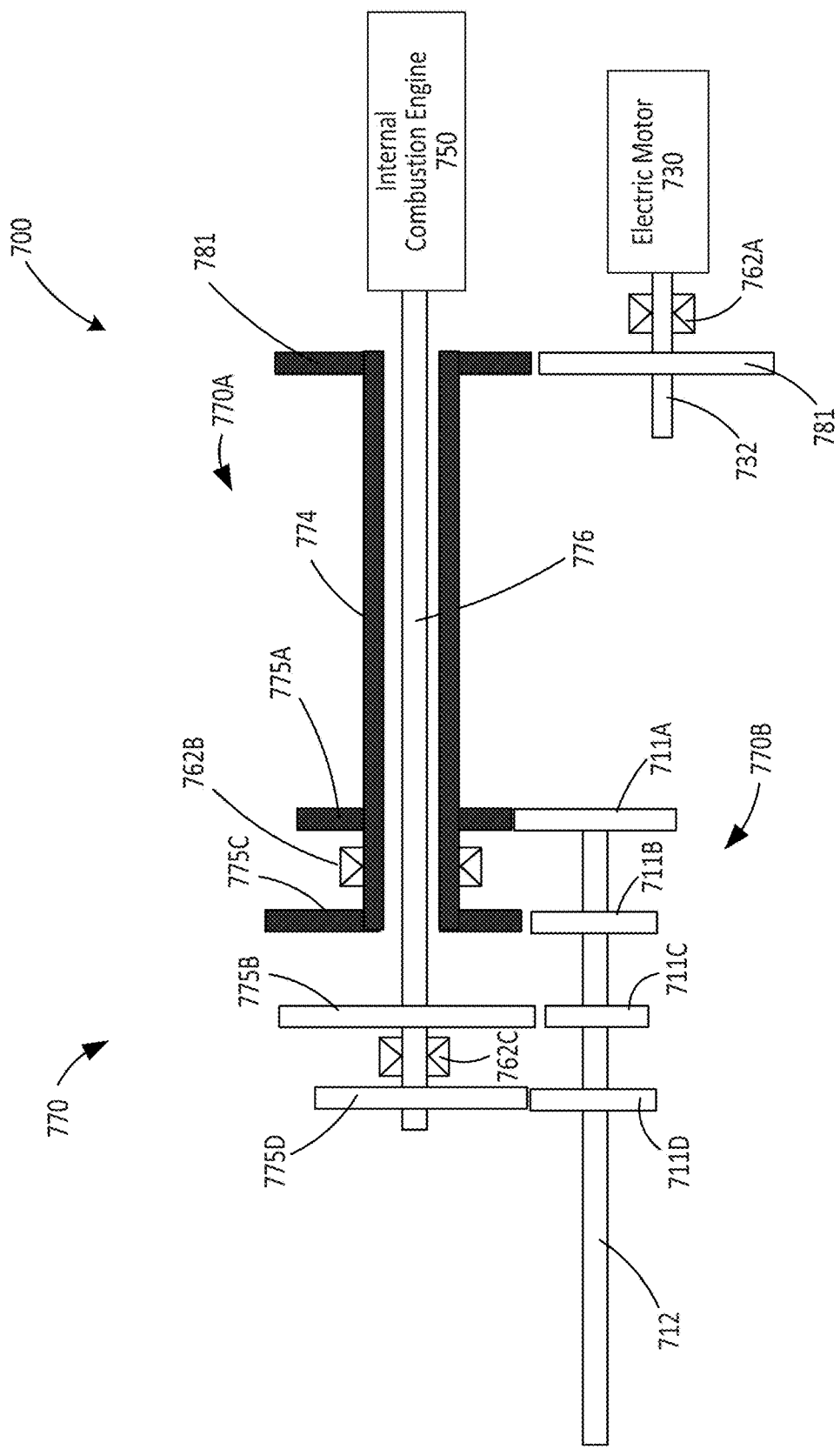
FIG. 33 is a schematic illustration of a powertrain system, according to an embodiment.

FIG. 33 is a schematic illustration of a powertrain system 700. The powertrain system 700 (and individual components of the powertrain system 700) can be the same or similar in structure and/or function to any of the powertrain systems described herein, such as, for example, the powertrain systems 100, 300, and 400. For example, the system 700 can include two power sources and two transmission shafts. The system 700 can be included in a vehicle (not shown) including a drive shaft 712. The drive shaft 712 be coupled via a differential (not shown) to an axle (not shown). The drive shaft 712 also includes a first drive shaft gear 711A, a second drive shaft gear 711B, a third drive shaft gear 711C, and a fourth drive shaft gear 711D fixedly coupled to the drive shaft 712. The first drive shaft gear 711A, the second drive shaft gear 711B, the third drive shaft gear 711C, and the fourth drive shaft gear 711D can be positioned in any suitable location along the drive shaft 712.

The powertrain system 700 contains an electronic control unit (not shown), an electric motor 730, an internal combustion engine 750, and a dual-shaft clutchless transmission 770. The electric motor 730 is configured to rotate and/or receive rotation power from an electric motor shaft 732. The electric motor 730, and any of the electric motors described herein, can be any suitable electric motor that produces power for and/or absorbs power from the wheels of the vehicle and/or the engine 750.

The clutchless transmission 770 includes a first transmission subsystem 770A and a second transmission subsystem 770B. The first transmission subsystem 770A includes a first transmission shaft 774 and the second transmission subsystem 770B includes a second transmission shaft 776. The first transmission shaft 774 can define a first end, a second end, and a lumen running from the first end to the second end. The second transmission shaft 776 can be disposed within the lumen of the first transmission shaft 774. Specifically, the second transmission shaft 776 can be arranged concentrically within the first transmission shaft 774.

The transmission 770 also includes transmission output gears 775 (e.g., a first gear 775A, a second gear 775B, a third gear 775C, and a fourth gear 775D). The odd gears (e.g., the first gear 775A and the third gear 775C) are included in the first transmission subsystem 770A and are coupled to the first transmission shaft 774. The even gears (e.g., the second gear 775B, the fourth gear 775D, and the sixth gear 775F) are included in the second transmission subsystem 770B and are coupled to the second transmission shaft 776. Similarly as described with reference to other embodiments above, each of the gears 775 can each be moved between a "free running" configuration about above its respective first transmission shaft 774 or second transmission shaft 776, and a fixed configuration in which the gear 775 does not rotate relative to its respective first transmission shaft 774 or second transmission shaft 776. The configuration of the gears 775 is controlled by a synchronizer (or shifting) assembly (e.g., a second synchronizer 762B and a third synchronizer 762C), similarly as discussed with reference to the embodiment of FIG. 3 above. Although four gears 775 are shown and described, the system 700 and the clutchless transmission 770 can be configured to include any number of gears 775 arranged in any functional way to modulate power and/or speed when rotating the drive shaft 712.

The transmission output gears 775 are operably coupled to, engaged with and/or meshed with the drive shaft gears 711 to form gear sets. Specifically, the first gear 775A is operatively coupled to, engaged with, and/or meshed with the first drive shaft gear 711A. The second gear 775B is operatively coupled to, engaged with, and/or meshed with the second drive shaft gear 711B. The third gear 775C is operatively coupled to, engaged with, and/or meshed with the third drive shaft gear 711C. The fourth gear 775D is operatively coupled to, engaged with, and/or meshed with the fourth drive shaft gear 711D. Because the drive shaft gears 711 are fixedly coupled to (i.e., cannot rotate relative to) the drive shaft 712 and each of the transmission output gears 775 is coupled to a respective drive shaft gear 711, rotation of the wheels and/or the drive shaft 712 produces rotation of the transmission output gears 775, and vice-versa.

The internal combustion engine 750, and any of the engines described herein, can be any suitable engine that produces power for and/or absorbs power from the wheels and/or the motor 730. Although not shown, in some embodiments, a clutch can be disposed on the second transmission shaft 776 such that an engine shaft associated with the engine 750 can be disengaged from the second transmission shaft 776. Additionally, in some embodiments, a clutch can be disposed on the motor shaft 762 such that the electric motor 730 can be selectively disengaged from the first transmission shaft 774.

As shown, the electric motor 730 is operatively coupled to the first transmission shaft 774 by the electric motor shaft 732. Specifically, an electric motor gear 731 can be coupled to the electric motor shaft 732. The electric motor gear 731 is configured to be operatively coupled to, engaged with and/or meshed with the transmission input gear 781. When the first synchronizer 762A is engaged with the electric motor gear 731, the electric motor shaft 732 can be locked to the electric motor gear 731 such that the transmission input gear 781 rotates under the control and/or power of the electric motor 730 and/or the electric motor gear 731.

Depending on the configuration of the synchronizer assembly (i.e., the synchronizers 762A, 762B, and 762C), the electric motor 730 and/or the engine 750 can provide power and/or control the rotation of the drive shaft 712 through various gear sets. In some embodiments, the synchronizers 762 can be controlled in combination with the electric motor 730 and/or the engine 750 for passive speed matching similarly as described in reference to other systems described herein. For example, the engine 750 can control the rotation speed of the second transmission shaft 776 to match the rotation speed of the gear 775B or the gear 775D such that the third synchronizer 762C can lock one of the gears 77B, 77D into engagement with the first transmission shaft 776 when the speeds match. In some embodiments, rather than be fixedly coupled to the shaft 712, the drive gears 711 can be moved between a free spinning configuration and a locked configuration (where the gear is engaged with the shaft 712 and rotationally fixed) by a number of synchronizers. In such embodiments, the motor 730 can control the engine speed via the shaft 712. In embodiments that include an optional clutch on the first transmission shaft 776, the speeds of the gears do not need to match the speed of the first transmission shaft 776 to engage the gears with the first transmission shaft 776. Rather, the synchronizer 762C can first bring the first transmission shaft 776 up to speed and the clutch can then bring the engine up to the proper speed (similar to a traditional manual transmission vehicle). The transmission 770 is configured to torque fill similarly as described with reference to other systems herein.

Figure 34:
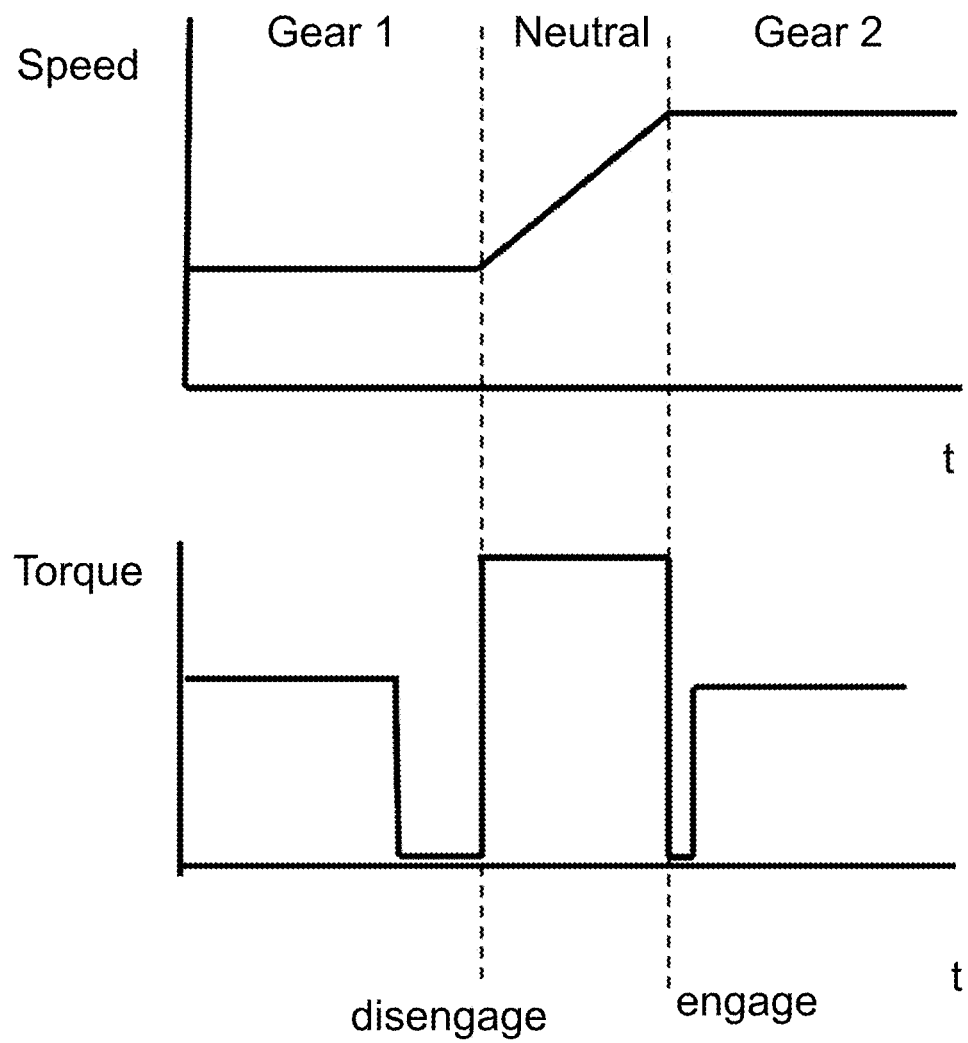
FIG. 34 is a plot representing speed and torque during a gear shifting sequence, according to an embodiment.

FIG. 34 is a plot representing speed and torque during a shifting process. For example, any of the powertrain system embodiments described herein can operate in a similar manner to the shifting process represented in FIG. 34. As shown, a vehicle can be operated in first gear for a period of time. When a user desires to increase the speed of the vehicle, the system can reduce the torque (e.g., zero the torque) across the first gear so that the system can shift out of first gear. For example, the dog teeth of a synchronizer can be unloaded for disengagement. The system can then operate in a speed matching phase in which torque is high such that the motor speed quickly increases. When the transmission shaft and the second gear are speed matched (or close enough to the proper speed for proper synchronizer engagement), the system can decrease the torque such that the motor will discontinue accelerating and engage the second gear at the new higher gear ratio. Although not shown, in some embodiments the motor may produce a negative torque (e.g., for motor braking) during a shifting process. Negative torque can cause the motor to change speed more quickly than zero torque. Additionally, in some embodiments, the torque across the synchronizer may not be reduced to zero during the engagement or disengagement phases, but may instead only be substantially reduced.

Figure 35:
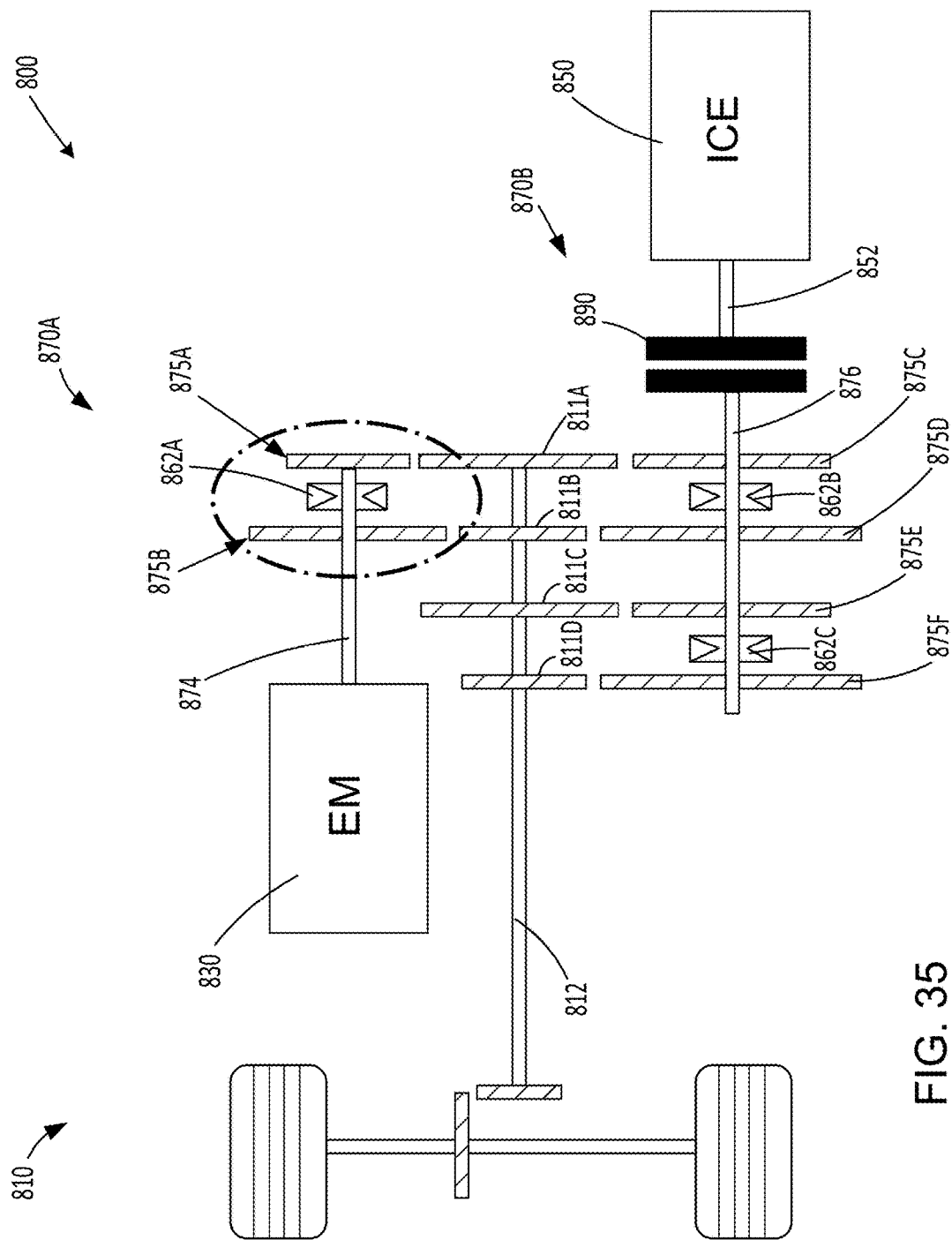
FIG. 35 is a schematic illustration of a powertrain system, according to an embodiment.

FIG. 35 is a schematic illustration of a powertrain system 800. The powertrain system 800 can be the same or similar in structure and/or function to any of the powertrain systems described herein, such as, for example, the powertrain systems 100, 300, 400, 600, or 700. For example, the system 800 can include two power sources and two transmission shafts. The system 800 can be included in a vehicle 810 including a drive shaft 812. The drive shaft 812 be coupled via a differential an axle. The drive shaft 812 also includes a first drive shaft gear 811A, a second drive shaft gear 811B, a third drive shaft gear 811C, and a fourth drive shaft gear 811D fixedly coupled to the drive shaft 812. The first drive shaft gear 811A, the second drive shaft gear 811B, the third drive shaft gear 811C, and the fourth drive shaft gear 811D can be positioned in any suitable location along the drive shaft 812.

The powertrain system 800 contains an electronic control unit (not shown), an electric motor 830, an internal combustion engine 850, and a dual-shaft transmission 870. The electric motor 830 is configured to rotate and/or receive rotation power from a first transmission shaft 874 (described below). The electric motor 830, and any of the electric motors described herein, can be any suitable electric motor that produces power for and/or absorbs power from the wheels of the vehicle and/or the engine 850.

The clutchless transmission 870 includes a first transmission subsystem 870A and a second transmission subsystem 870B. The first transmission subsystem 870A includes a first transmission shaft 874 and the second transmission subsystem 870B includes a second transmission shaft 876. The transmission 870 also includes transmission output gears 875 (e.g., a first gear 875A, a second gear 875B, a third gear 875C, a fourth gear 875D, a fifth gear 875E, and a sixth gear 875F). The first gear 875A, and the second gear 875B are included in the first transmission subsystem 870A and are coupled to the first transmission shaft 874. The third gear 875C, the fourth gear 875D, the fifth gear 875E, and the sixth gear 875F) are included in the second transmission subsystem 870B and are coupled to the second transmission shaft 876. Similarly as described with reference to other embodiments above, each of the gears 875 can each be moved between a "free running" configuration about above its respective first transmission shaft 874 or second transmission shaft 876, and a fixed configuration in which the gear 875 does not rotate relative to its respective first transmission shaft 874 or second transmission shaft 876. The configuration of the gears 875 is controlled by a synchronizer (or shifting) assembly (e.g., a first synchronizer 862A, a second synchronizer 862B, and a third synchronizer 862C), similarly as discussed with reference to the other embodiments described herein. Although six gears 875 are shown and described, the system 800 and the clutchless transmission 870 can be configured to include any number of gears 875 arranged in any functional way to modulate power and/or speed when rotating the drive shaft 812.

The transmission output gears 875 are operably coupled to, engaged with and/or meshed with the drive shaft gears 811 to form gear sets. Specifically, the first gear 875A and the third gear 875C are operatively coupled to, engaged with, and/or meshed with the first drive shaft gear 811A. The second gear 875B and fourth gear 875D are operatively coupled to, engaged with, and/or meshed with the second drive shaft gear 811B. The fifth gear 875E is operatively coupled to, engaged with, and/or meshed with the third drive shaft gear 811C. The sixth gear 875E are operatively coupled to, engaged with, and/or meshed with the fourth drive shaft gear 811D. Because the drive shaft gears 811 are fixedly coupled to (i.e., cannot rotate relative to) the drive shaft 812 and each of the transmission output gears 875 is coupled to a respective drive shaft gear 811, rotation of the wheels and/or the drive shaft 812 produces rotation of the transmission output gears 875, and vice-versa.

The internal combustion engine 850, and any of the engines described herein, can be any suitable engine that produces power for and/or absorbs power from the wheels and/or the motor 830. The engine 850 is configured to rotate and/or be rotated by an internal combustion engine shaft 852.

In some embodiments, as shown in FIG. 35, the second transmission subsystem 870B can optionally include a second clutch 890 such that the engine shaft 852 can be disengaged from the second transmission shaft 874.

Depending on the configuration of the synchronizer assembly (i.e., the synchronizers 862A, 862B, 862C, and 862D), the electric motor 830 and/or the engine 850 can provide power and/or control the rotation of the drive shaft 812 through various gear sets.

In some embodiments, an electric motor can be used to start an engine when a vehicle is in motion, similar to a push start or a bump start in a typical clutched manual transmission vehicle. For example, with respect to the system 300 described above, the powertrain system 300 can be configured such that the motion of the wheels 318, 319 and the drive shaft 312 causes the engine 350 to turn over (i.e., the crankshaft rotates and the pistons cycle). In some embodiments, the electric motor 330 can be used to start the engine 350 when the vehicle 310 accelerates from rest via a power path through the transmission 370. For example, the first synchronizer 362 can be engaged with the first electric motor gear 331. The third synchronizer 362C or the fifth synchronizer 362E can be translated to shift the powertrain system 300 into first gear or second gear, respectively, such that the drive shaft is rotating under the control of and power from the electric motor 330. One of the fourth synchronizer 362D and the sixth synchronizer 362F can be shifted into engagement with one of the second gear 375B, the fourth gear 375D, and the sixth gear 375F. The second synchronizer 362B can be shifted along the internal combustion engine shaft 352 to the right and into locking engagement with the first engine gear 354. The electric motor 330 can then be used to power the drive shaft 312 such that the vehicle 310 begins to move. As a result of the engagement between the drive shaft 312, the transmission 370, and the engine shaft 352, the internal combustion engine 350 can be turned over by the rotation of the internal combustion engine shaft 352 via a power path including the first transmission shaft 374 and the second transmission shaft 376. When the engine 350 is spinning at a sufficient speed to run, the electronic control unit 320 can initiate fuel injection and spark. In some embodiments, the engine 350 can include electronically controlled valves. In such embodiments, the valves can be in a first configuration when the engine 350 is "free wheeling" (e.g., when a crankshaft of the engine is rotating but the engine is not running) and in a second configuration when the engine is running. In some embodiments, during the "free wheeling" configuration, fuel is not injected into the engine 350 and/or a spark is not initiated such that the engine 350 is spinning but a combustion cycle does not occur.

In some embodiments, the systems described herein can include a sport mode. For example, the system 300 can include a sport mode. If the operator of the system 300 selects the sport mode, the electronic control unit 320 starts the engine 350 in advance of the engine 350 being needed to provide power to the drive shaft 312 and maintains the engine 350 idling at a high speed so that the engine 350 is ready to be speed matched and engaged with a transmission gear-set. In some embodiments, the engine can be maintained at a fixed speed (e.g., 3000 rpm). After the target gear to be engaged reaches the desired rotation speed of the shaft (and that corresponds to the fixed engine speed), the synchronizer can then be shifted. Accordingly, the system 300 can be said to be in a "passive speed matching" mode, where the engine speed is not changed, but rather the controller monitors the components and executes a shift at the time when the speeds are matched. In sport mode, the electronic control unit 320 is configured to respond more quickly to acceleration requests. However, the system 300 will have reduced fuel efficiency and increased emissions.

Although certain specific modes for the systems 100, 300, 400, 500, 600, 700, and/or 800 have been described, in other embodiments, the systems described herein can facilitate any number of different operational modes for a vehicle. For example, in some embodiments, the system 400 can be configured to operate in a "turbo boost" mode to enhance the performance of the vehicle, for those vehicles that include a turbocharged engine. In the turbo boost mode, when the vehicle is being moved by the first electric motor 430, the engine 450 can be operably disconnected from the vehicle drive shaft 412 (e.g., during the vehicle acceleration from a full stop), but can be operably coupled to the first electric motor 430. Further, the controller (i.e., the electronic control unit 420) can send a signal to place the engine 450 under load, which is absorbed by the first electric motor 430 (i.e., to charge the battery of the vehicle). By placing the engine under load, the exhaust gas produced will contain sufficient energy to accelerate (or "spool up") a turbine of a turbocharger of the turbocharged engine. Thus, when the system is transitioned into an "engine drive" configuration (via, for example, a slow or quick engagement of the a clutch between the engine 450 and the transmission 470), the engine turbocharger is already producing work to compress inlet air, and thus there is no or minimal "turbo lag" during vehicle acceleration. In some embodiments, rather than using the engine 450 to rotate the first electric motor shaft 432 to charge an energy storage device (e.g. a battery bank) associated with the first electric motor 430 while pre-spooling the turbocharger, the excess energy produced by the engine 450 when placed under load by the controller can be released from the system 400 as heat, can be used to spin up a flywheel, can be transmitted into a fluid, or can be used in any other suitable way.

Additionally, in some embodiments, the controller can accelerate the engine during an "electric motor only" configuration not only to accelerate a turbocharger, but also to produce a signature engine sound. In this manner, the driver will have the audible sensation of traditional engine acceleration while the vehicle is being accelerated by an electric motor. In some embodiments, the feature of producing a signature engine sound can be associated with a particular mode of the vehicle (e.g, a performance mode or a sport mode). Said another way, a driver can select a mode in which the vehicle will produce an engine sound while an electric motor accelerates the vehicle for the benefit of driver experience at the expense of vehicle fuel efficiency. For example, in some embodiments, a controller (e.g., any of the electronic control units described herein) can cause an engine to run in an idle state for the purpose of producing the sound associated with the engine, even if no load is being placed on the engine (i.e., the engine is not being used for power generation) and/or the vehicle is being accelerated solely or partially by an electric motor. In some embodiments, one or more sounds produced by the engine in this configuration can be similar to the sounds produced by a typical clutched manual transmission when a driver fully depresses the clutch pedal and then depresses the gas pedal. In some embodiments, a controller (e.g., any of the electronic control units described herein) can cause an engine speed to increase (i.e., rev) and decrease following a pattern of a typical vehicle acceleration with typical gear shifts. For example, the controller can cause the engine to run in an idle state, producing a first engine sound. The controller can then cause the engine speed to increase as the vehicle accelerates, producing a second engine sound, and then to quickly decrease during periods of gear shifting, producing a third engine sound, even if the engine is not under load (i.e. the engine is not being used for power generation) and the vehicle is being accelerated solely or partially by an electric motor. In some embodiments, the controller can cause the engine speed to briefly slow down such that an engine sound associated with gear shifting is produced at predetermined vehicle speeds (e.g., according to a predetermined pattern or at predetermined sensed vehicle speeds, such as as determined by a rotational speed sensor on the drive shaft) even if a gear shift is not necessary. For example, the controller can cause the engine speed to briefly decrease when the vehicle reaches and/or accelerates through 30 miles per hour, even if the transmission and the electric motor are configured to accelerate the vehicle from 0 miles per hour to 60 miles per hour without shifting gears.

In some embodiments, the electronic control unit 120, or any of the electronic control units described herein, can be configured to control the electric motor 130, or any of the electric motors described herein, to briefly output an increased amount of power after the powertrain system, such as the powertrain system 100, shifts into a higher gear. As a result, a vehicle including the powertrain system, such as the vehicle 110, can experience a "lurch" or quick acceleration similar to the feeling of increased power after shifting gears in some manual transmission vehicles, automated manual transmission vehicles, and double clutch transmission vehicles. As a result, drive experience may be improved. In some embodiments, a "lurch" can be produced automatically and/or mechanically when a new gear set is engaged. For example, a synchronizer can include dog teeth configured to engage a target gear when the speed of the target gear and the speed of a shaft associated with the synchronizer are similar but do not match. For example, a speed sensor or a blocker ring with a higher tolerance for speed differences can be used to achieve this engagement. As a result, at the moment that the dog teeth and the target gear engage, the driver of the vehicle may experience a short duration "lurch" sensation.

In some embodiments, any of the electric motors described herein (such as, for example, the electric motor 330), can be overdriven (i.e., caused to produce power beyond the rated current specification) for short periods of time. For example, if the system 300 is shifting between two gears and the electric motor 330 is being used for torque filling, the electric motor 330 can be run at a high power production level for a short period of time (e.g. a tenth of a second) without damaging the electric motor 330 because the electric motor 330 can be allowed to cool between shifting operations. Thus, the electric motor 330 can be used to maintain and/or accelerate a transmission output gear (e.g., the transmission output gear 375A) and/or a drive shaft (i.e., the drive shaft 312) at a particular speed or particular acceleration rate, respectively, without damaging the electric motor 330.

Although the systems described herein are described as controlling the positions of synchronizers based on speed sensors associated with an electronic control unit, such as, for example, the electronic control unit 120 or the electronic control unit 320, in some embodiments, rather than being shifted based on sensors, the synchronizers included with a system, such as any of the systems described herein, can operate automatically as a result of the mechanical structure of the synchronizers. Said another way, a synchronizer used in any of the systems described herein can be mechanically structured to automatically shift along a shaft and engage a target gear when the shaft and the target gear reach a sufficiently similar or substantially identical rotational speed. For example, a synchronizer can be disposed on a transmission shaft near a target gear. An actuator and the synchronizer can be configured and disposed such that the actuator applies a constant force on the synchronizer along the shaft in the direction of the target gear. The synchronizer can include a blocker ring (or any other suitable element that mechanically prevents engagement until the shaft and target gear speeds are matched) and/or one or more conical-shaped collars (or any other suitable frictional element associated with the synchronizer), each of which is coupled to and axially movable along the shaft. As the synchronizer is pushed by the actuator axially along the shaft toward engagement with the target gear, the blocker ring can prevent engagement between the synchronizer and the target gear until the shaft and the target gear have reached a sufficiently similar or substantially identical rotational speed. Said another way, the blocker ring prevents teeth associated with the synchronizer from grinding with teeth associated with the target gear. To reach a sufficiently similar or substantially identical rotational speed, the conical-shaped collar can gradually contact a mating conical opening of the target gear. In this manner, the friction between the synchronizer (which does not rotate relative to the shaft) and the target gear (which, until the synchronizer is fully engaged, rotates relative to the shaft) brings the shaft and the target gear to the same rotational speed. Said another way, the synchronizer "matches" the rotational speed of the shaft and the target gear to facilitate the selection of the target gear. When the rotational speeds are sufficiently similar or substantially identical, the blocker ring can allow for engagement between the synchronizer and the target gear such that the synchronizer is automatically pushed into engagement with the target gear. Although described as including both a blocker ring and one or more conical-shaped collars, in some embodiments the synchronizer can include only a blocker ring or one or more conical-shaped collars. For example, in an implementation with only a blocker ring, the speed matching can be entirely performed by an electric motor such that the blocker ring moves to allow for engagement between dog teeth of the synchronizer and the target gear when the speeds match. In an implementation with only one ore more conical-shaped collars, the conical-shaped collars can be used for frictional speed matching such that engagement occurs when sensors confirm that the target gear and the shaft speeds match. In some embodiments, neither a blocker ring nor a conical-shaped collar can be included. Sensors can be used to determine when the speeds are matched such that actuators can be controlled to shift the synchronizers into engagement with a target gear. In some embodiments, a synchronizer including a blocker ring can be used in combination with an electronic speed sensor such that when the electronic speed sensor determines that the speed of a shaft and a target gear match, the synchronizer can be shifted into engagement with the target gear and the blocker ring can automatically move out of a blocking configuration.

In some embodiments, the synchronizer can disengage from the target gear automatically. For example, an actuator can apply a constant force along the shaft away from the target gear. When the torque or "load" across the synchronizer is sufficiently reduced and/or has a magnitude of zero, the synchronizer can be disengaged from the selected gear automatically due to the constant force from the actuator having a larger magnitude than the force that pulls the synchronizer towards an engagement position when there is torque across the dog teeth. In this manner, the dog teeth (or other suitable engaging structures between the synchronizer and the engaged gear) can be "unloaded" to allow disengagement. In some embodiments, the torque can be sufficiently reduced or reduced to zero by increasing the torque on the output side of the synchronizer, such as with an electric motor (e.g. electric motor 330). In some embodiments, the torque can be sufficiently reduced or reduced to zero by reducing power to an engine or motor, such as, for example, engine 350 or electric motor 330. For example, a driver could release the throttle such that the engine 350 begins to act as a brake through, for example, friction, rather than provide power to the vehicle 310. As a result, the torque on the synchronizer could switch from positive to negative, reducing the force exerted by the dog teeth to maintain the synchronizer in engagement with the target gear. Thus, the actuator can automatically shift the synchronizer out of engagement with the target gear.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. For example, any of the electric motors described herein can be electrically coupled to any of other electric motors or engines described herein in a "limp home" mode in the event of a partial system failure.

Any of the systems described herein can have any suitable electric power supply that can be "charged" in accordance with any of the methods described herein. Such power supplies can include any suitable batteries, capacitors or the like.

Where schematics and/or embodiments described above indicate certain components arranged in certain orientations or positions, the arrangement of components may be modified. Similarly, where methods and/or events described above indicate certain events and/or procedures occurring in certain order, the ordering of certain events and/or procedures may be modified. While the embodiments have been particularly shown and described, it will be understood that various changes in form and details may be made.

Although various embodiments have been described as having particular features and/or combinations of components, other embodiments are possible having a combination of any features and/or components from any of embodiments as discussed above.

The invention claimed is:

1. An apparatus, comprising:
a drive shaft including a plurality of drive gears, the drive shaft configured to transmit power to a wheel of a vehicle;
a transmission including a first transmission shaft and a second transmission shaft, the first transmission shaft including a first transmission input gear and a first plurality of output gears, the second transmission shaft including a second transmission input gear and a second plurality of output gears, the first transmission shaft and the second transmission shaft being aligned such that the first plurality of output gears and the second plurality of output gears mesh with the plurality of drive gears of the drive shaft, the first transmission shaft including a first shifting element configured to selectively engage an output gear from the first plurality of output gears to adjust a ratio between a shaft rotation speed of the first transmission shaft and a shaft rotation speed of the drive shaft, the second transmission shaft including a second shifting element configured to selectively engage an output gear from the second plurality of output gears to adjust a ratio between a shaft rotation speed of the second transmission shaft and a shaft rotation speed of the drive shaft, the output gear from the first plurality of output gears operably coupled to a drive gear from the plurality of drive gears such that power is transmitted between the first transmission shaft and the drive shaft when the output gear from the first plurality of output gears is engaged with the first transmission shaft via the first shifting element; and
a motor shaft configured to be coupled to a motor, the motor shaft having a first motor gear and a second motor gear, the first motor gear operably coupled to the first transmission input gear, the motor shaft including a third shifting element configured to selectively engage the first motor gear to the motor shaft, the first motor gear configured to transmit power between the motor shaft and the first transmission shaft when the first motor gear is engaged to the motor shaft via the third shifting element,
an engine shaft configured to be coupled to an engine, the engine shaft having an engine gear, the engine gear operably coupled to the second transmission input gear and the second motor gear of the motor shaft, the engine shaft including a fourth shifting element configured to selectively engage the engine gear to the engine shaft, the engine gear configured to transmit power between the engine shaft and the second transmission shaft when the engine gear is engaged to the engine shaft via the fourth shifting element.

2. The apparatus of claim 1, wherein the engine gear is a first engine gear, the engine shaft further including a second engine gear, the first transmission shaft further including a third transmission input gear, the second engine gear operably coupled to the third transmission input gear, the fourth shifting element configured to selectively engage the second engine gear to the engine shaft, the second engine gear configured to transmit power between the engine shaft and the first transmission shaft when the second engine gear is engaged to the engine shaft via the fourth shifting element.

3. The apparatus of claim 2, wherein when the second engine gear is engaged with the engine shaft via the fourth shifting element and the first motor gear is engaged with the motor shaft via the third shifting element, the motor can transmit power to the first transmission shaft via the motor shaft and the engine can transmit power to the first transmission shaft via the engine shaft simultaneously.

4. The apparatus of claim 1, wherein the engine gear is a first engine gear, the engine shaft further including a second engine gear, the second engine gear operably engaged with the first motor gear, the second engine gear selectively engageable with the engine shaft, the second engine gear configured to transmit power between the engine shaft and the first transmission shaft when the second engine gear is engaged with the engine shaft.

5. The apparatus of claim 4, wherein the fourth shifting element is configured to selectively engage the second engine gear to the engine shaft.

6. The apparatus of claim 4, wherein the engine gear includes a fifth shifting element, wherein the fifth shifting element is configured to selectively engage the second engine gear to the engine shaft.

7. The apparatus of claim 4, wherein when the second engine gear is engaged with the engine shaft and the first motor gear is engaged with the motor shaft, the motor can transmit power to the first transmission shaft via the motor shaft and the engine can transmit power to the first transmission shaft via the engine shaft simultaneously.

8. The apparatus of claim 1, wherein the first transmission input gear is operably coupled to the first motor gear such that a rotation speed of the first transmission shaft is dependent on a rotation speed of the motor shaft when the first motor gear is engaged with the motor shaft and one or more of the first shifting element and the second shifting element are being shifted.

9. The apparatus of claim 1, wherein the second transmission input gear is operably coupled to the engine gear such that a rotation speed of the second transmission shaft is dependent on a rotation speed of the engine shaft when the engine gear is engaged with the engine shaft and one or more of the first shifting element and the second shifting element are being shifted.

10. The apparatus of claim 1, wherein the second transmission input gear is operably coupled to the engine shaft by a linkage devoid of a friction clutch.

11. The apparatus of claim 2, wherein the first transmission input gear is operably coupled to the engine shaft by a linkage devoid of a friction clutch.

12. The apparatus of claim 4, wherein the first transmission input gear is operably coupled to the engine shaft by a linkage devoid of a friction clutch.

13. The apparatus of claim 4, wherein a first idler gear couples the first motor gear and the second engine gear and a second idler gear couples the second motor gear and the first engine gear.

14. The apparatus of claim 1, wherein:
the transmission is a manual transmission; and
the first transmission input gear is operably coupled to the engine shaft by a linkage devoid of any one of a friction clutch or a torque converter.

15. The apparatus of claim 1, wherein the second transmission input gear is operably coupled to the engine shaft by a linkage devoid of a clutch, the apparatus further comprising:
a controller including a speed matching module configured to produce an engine control signal to adjust a rotation speed of the engine shaft such that a rotation speed of the second transmission shaft is matched to a rotation speed of a gear of the second plurality of output gears when the second shifting element is being shifted.

16. The apparatus of claim 1, wherein the second transmission input gear is operably coupled to the engine shaft by a linkage devoid of a clutch, the apparatus further comprising:
a controller including a speed matching module configured to produce a motor control signal to adjust a rotation speed of the motor shaft such that a rotation speed of the second transmission shaft is matched to a rotation speed of a gear of the second plurality of output gears when the second shifting element is being shifted.

17. The apparatus of claim 1, wherein the second transmission input gear is operably coupled to the engine shaft by a linkage devoid of a clutch, the fourth shifting element configured to selectively disengage the engine gear to interrupt power transmission between the engine shaft and the second transmission shaft, the apparatus further comprising:
a controller including a synchronizer module configured to produce a synchronizer control signal associated with a motor drive configuration, the fourth shifting element disengaged from the engine gear and the first motor gear transmitting power from the motor shaft to the first transmission shaft when in the motor drive configuration.

18. The apparatus of claim 17, wherein the controller includes a feedback module configured to receive a vehicle speed signal associated with a wheel speed, the synchronizer module configured to produce the synchronizer control signal when the wheel speed is zero.

19. The apparatus of claim 1, further comprising:
a controller including a speed matching module configured to produce a speed control signal to adjust at least one of a rotation speed of the engine shaft or a rotation speed of the motor shaft when the fourth shifting element is being shifted to engage the engine gear.

20. The apparatus of claim 1, further comprising a clutch coupled to the engine shaft and configured to disengage the engine shaft from at least one of the first transmission shaft and the second transmission shaft.

21. The apparatus of claim 1, wherein the first plurality of output gears and the second plurality of output gears mesh with the plurality of drive gears of the drive shaft such that the transmission includes a plurality of gear sets, each gear set including one gear of the first plurality of output gears, one gear of the second plurality of output gears, and one gear of the plurality of drive gears.

22. An apparatus, comprising:
a drive shaft including a plurality of drive gears, the drive shaft configured to transmit power to a wheel of a vehicle;
a transmission including a first transmission shaft and a second transmission shaft, the first transmission shaft including a first transmission input gear and a first plurality of output gears, the second transmission shaft including a second transmission input gear and a second plurality of output gears, the first transmission shaft and the second transmission shaft being aligned such that the first plurality of output gears and the second plurality of output gears mesh with the plurality of drive gears of the drive shaft, the first transmission shaft including a first shifting element configured to selectively engage an output gear from the first plurality of output gears to adjust a ratio between a shaft rotation speed of the first transmission shaft and a shaft rotation speed of the drive shaft, the second transmission shaft including a second shifting element configured to selectively engage an output gear from the second plurality of output gears to adjust a ratio between a shaft rotation speed of the second transmission shaft and a shaft rotation speed of the drive shaft, the output gear from the first plurality of output gears operably coupled to a drive gear from the plurality of drive gears such that power is transmitted between the first transmission shaft and the drive shaft when the output gear from the first plurality of output gears is engaged with the first transmission shaft via the first shifting element, the output gear from the second plurality of output gears operably coupled to a drive gear from the plurality of drive gears such that power is transmitted between the second transmission shaft and the drive shaft when the output gear from the second plurality of output gears is engaged with the second transmission shaft via the second shifting element; and the first transmission shaft configured to be selectively coupled to a motor, the motor configured to transmit power to the first transmission shaft such that the first transmission shaft rotates under the control of the motor when the first transmission shaft is operatively coupled to the motor, the second transmission shaft configured to be selectively coupled to an engine, the engine configured to transmit power to the second transmission shaft such that the second transmission shaft rotates under the control of the motor when the first transmission shaft is operatively coupled to the motor.

23. The apparatus of claim 22, wherein an engine shaft is coupled to the engine and a clutch is disposed between the second transmission shaft and the engine shaft, the clutch configured to control the selective coupling between the second transmission shaft and the engine shaft.

24. The apparatus of claim 22, wherein a motor shaft is coupled to the motor and a clutch is disposed between the first transmission shaft and the motor shaft, the clutch configured to control the selective coupling between the first transmission shaft and the motor shaft.

25. The apparatus of claim 22, wherein the rotation of the drive shaft is configured to be controlled by the electric motor via one of the gears of the first plurality of output gears while the second shifting element is being shifted.

26. The apparatus of claim 22, wherein the rotation of the drive shaft is configured to be controlled by the engine via one of the gears of the second plurality of output gears while the first shifting element is being shifted.

27. The apparatus of claim 22, wherein the first transmission shaft has a first end and a second end, the first transmission shaft defining a lumen extending from the first end to the second end, the second transmission shaft disposed within the lumen of the first transmission shaft such that the first transmission shaft is concentrically arranged relative to the second transmission shaft.

28. The apparatus of claim 27, wherein the plurality of drive gears includes a first plurality of drive gears and a second plurality of drive gears, wherein the first plurality of output gears is configured to mesh with the first plurality of drive gears and the second plurality of output gears is configured to mesh with the second plurality of drive gears.

29. The apparatus of claim 22, wherein the first plurality of output gears and the second plurality of output gears mesh with the plurality of drive gears of the drive shaft such that the transmission includes a plurality of gear sets, each gear set of the plurality of gear sets including one gear of the first plurality of output gears, one gear of the second plurality of output gears, and one gear of the plurality of drive gears.

30. The apparatus of claim 22, wherein the plurality of drive gears includes a first plurality of drive gears and a second plurality of drive gears, wherein the first plurality of output gears and the second plurality of output gears mesh with the first plurality of drive gears such that the transmission includes a plurality of gear sets, each gear set of the plurality of gear sets including one gear of the first plurality of output gears, one gear of the second plurality of output gears, and one gear of the first plurality of drive gears.

31. The apparatus of claim 30, wherein the second transmission shaft includes a third plurality of output gears, the second transmission shaft aligned with the drive shaft such that the third plurality of output gears configured to mesh with the second plurality of drive gears such that the transmission includes a second plurality of gear sets, each gear set of the second plurality of gear sets including one gear of the third plurality of output gears and one gear of the second plurality of drive gears.

32. The apparatus of claim 22, wherein the second transmission shaft is operably coupled to the engine by a linkage devoid of a friction clutch.

33. An apparatus, comprising:
a controller configured to be operably coupled to a motor, an engine, and a transmission, the transmission including a first transmission shaft and a second transmission shaft, the first transmission shaft including a first transmission input gear and a first plurality of output gears, the second transmission shaft including a second transmission input gear and a second plurality of output gears, the first transmission shaft and the second transmission shaft being aligned such that the first plurality of output gears and the second plurality of output gears mesh with the plurality of drive gears of the drive shaft, the first transmission shaft including a first shifting element configured to selectively engage an output gear from the first plurality of output gears to adjust a ratio between a shaft rotation speed of the first transmission shaft and a shaft rotation speed of the drive shaft, the second transmission shaft including a second shifting element configured to selectively engage an output gear from the second plurality of output gears to adjust a ratio between a shaft rotation speed of the second transmission shaft and a shaft rotation speed of the drive shaft, the output gear from the first plurality of output gears operably coupled to a drive gear from the plurality of drive gears such that power is transmitted between the first transmission shaft and the drive shaft when the output gear from the first plurality of output gears is engaged with the first transmission shaft via the first shifting element, the output gear from the second plurality of output gears operably coupled to a drive gear from the plurality of drive gears such that power is transmitted between the second transmission shaft and the drive shaft when the output gear from the second plurality of output gears is engaged with the second transmission shaft via the second shifting element, the motor including a motor shaft having a first motor gear and a second motor gear, the first motor gear operably coupled to the first transmission shaft, the motor shaft including a third shifting element configured to selectively engage the first motor gear to the motor shaft, the first motor gear configured to transmit power between the motor shaft and the first transmission shaft when the first motor gear is engaged to the motor shaft via the third shifting element, the engine including an engine shaft having an engine gear, the engine gear operably coupled to the second transmission input gear and the second motor gear of the motor shaft, the engine shaft including a fourth shifting element configured to selectively engage the engine gear to the engine shaft, the engine gear configured to transmit power between the engine shaft and the second transmission shaft when the engine gear is engaged to the engine shaft via the fourth shifting element, and
the controller implemented in at least one of a memory or a processor, the controller including a speed matching module configured to produce a control signal to adjust at least one of a speed of the engine shaft or a speed of the motor shaft when the second shifting element is being shifted.

34. The apparatus of claim 33, wherein the speed matching module is configured to produce the control signal to adjust at least one of the speed of the engine shaft or the speed of the motor shaft such that a speed of the second transmission shaft is matched to a speed of a corresponding gear from the second plurality of output gears when the second shifting element is being shifted.

35. The apparatus of claim 33, wherein:
the control signal is a first control signal, the speed matching module configured to produce a second control signal to adjust at least one of the speed of the engine shaft or the speed of the motor shaft such that the speed of the motor shaft is matched to the speed of the engine shaft when the fourth shifting element is being shifted to engage the engine gear.

36. The apparatus of claim 33, wherein the controller includes a synchronizer module configured to transmit a first shifting element control signal and a second shifting element control signal to the transmission, the first shifting element control signal associated with shifting of the first shifting element to engage a gear of the first plurality of output gears, the second shifting element control signal associated with shifting of the second shifting element to engage a gear of the second plurality of output gears.

37. The apparatus of claim 33, wherein, when the third shifting element engages the first motor gear, the first transmission shaft rotates under the control of the motor, and the engine is not operatively coupled to the first transmission shaft or the second transmission shaft, the controller is configured to cause the engine to produce an engine sound.

38. A method, comprising:
shifting a motor synchronizer to engage a motor gear coupled to a motor shaft such that the motor gear transmits power between the motor shaft and a first transmission shaft, the first transmission shaft including a plurality of output gears meshed with a first plurality of drive shaft gears of a drive shaft;
adjusting a speed of the motor shaft to match a speed of the gear of the first plurality of output gears to a speed of a corresponding gear from the plurality of drive shaft gears;
shifting, after the adjusting, a second transmission synchronizer to engage the gear of the first plurality of output gears to transmit motor power between the first transmission shaft and the drive shaft.

39. The method of 38, wherein:
the shifting of the motor synchronizer is performed when an engine synchronizer is engaged with a first engine gear to transmit engine power between an engine output shaft and a second transmission shaft and a first transmission synchronizer is engaged with a gear of a second plurality of output gears of the second transmission shaft to transmit engine power between the second transmission shaft and the drive shaft;
the adjusting of the speed of the motor shaft to match the speed of the gear of the first plurality of output gears is performed while engine power is continuously transmitted from the engine shaft to the drive shaft via the second transmission shaft; and
the shifting of the second transmission synchronizer occurs while engine power is continuously transmitted from the engine shaft to the drive shaft, further comprising:
shifting the engine synchronizer to interrupt engine power transmission between the engine output shaft and the second transmission shaft;
adjusting a speed of the engine output shaft to match a speed of the second engine gear to the speed of the engine shaft, the adjusting performed while motor power is continuously transmitted from the motor shaft to the drive shaft via the first transmission shaft; and
shifting, after the adjusting and while motor power is continuously transmitted from the motor shaft to the drive shaft, the engine synchronizer to engage the second engine gear such that engine power is transferred via the second engine gear and the first transmission shaft to the drive shaft.

40. The method of claim 38, wherein the shifting the motor synchronizer is performed when the wheel is stationary.

41. The method of claim 38, wherein at least one of the first transmission shaft and the second transmission shaft are operably coupled to the engine shaft by a linkage devoid of a clutch.

42. The apparatus of claim 38, wherein:
the transmission is a manual transmission; and
at least one of the first transmission shaft and the second transmission shaft are operably coupled to the engine shaft by a linkage devoid of any one of a clutch or a torque converter.

43. A non-transitory processor readable medium storing code representing instructions to be executed by a processor, the code comprising code to cause the processor to:
transmit, while engine power is continuously transmitted from an engine shaft to a drive shaft, a first shifting element control signal to cause a motor synchronizer to engage a motor gear coupled to a motor shaft such that the motor gear transmits power between the motor shaft and a first transmission shaft, the drive shaft configured to transmit power to a wheel of a vehicle;
transmit a speed matching signal to match a speed of the output gear from the first plurality of output gears to a speed of the first transmission shaft, the speed being matched while engine power is continuously transmitted from the engine shaft to the drive shaft via the second transmission shaft; and
transmit a second shifting element control signal, after the transmission of the speed matching signal and while engine power is continuously transmitted from the engine shaft to the drive shaft, to cause the transmission synchronizer to engage the output gear from the first plurality of output gears such that motor power is transferred via the first transmission shaft and the output gear from the first plurality of output gears to the drive shaft.

44. The non-transitory processor readable medium of claim 43, the processor configured to:
transmit the first shifting element control signal to interrupt engine power transmission between the engine shaft and the second transmission shaft, the second transmission shaft including a second plurality of output gears meshed with the plurality of output gears; and to
transmit a third shifting element control signal to cause the engine synchronizer to engage an engine gear to transmit engine power from the engine output shaft to the first transmission shaft of the transmission.

* * * * *